(12) United States Patent
Henkin et al.

(10) Patent No.: US 7,451,099 B2
(45) Date of Patent: *Nov. 11, 2008

(54) DYNAMIC DOCUMENT CONTEXT MARK-UP TECHNIQUE IMPLEMENTED OVER A COMPUTER NETWORK

(75) Inventors: Assaf Henkin, San Francisco, CA (US); Yoav Shaham, San Francisco, CA (US); Henit Vitos, San Francisco, CA (US); Benny Friedman, Sunnyvale, CA (US)

(73) Assignee: Kontera Technologies, Inc., San Francisco, CA (US)

( * ) Notice: Subject to any disclaimer, the term of this patent is extended or adjusted under 35 U.S.C. 154(b) by 1113 days.

This patent is subject to a terminal disclaimer.

(21) Appl. No.: 09/943,571

(22) Filed: Aug. 29, 2001

(65) Prior Publication Data

US 2002/0120505 A1 Aug. 29, 2002

Related U.S. Application Data

(60) Provisional application No. 60/229,452, filed on Aug. 30, 2000, provisional application No. 60/311,418, filed on Aug. 9, 2001.

(51) Int. Cl.
*G06Q 30/00* (2006.01)
(52) U.S. Cl. ............................. 705/14; 707/102; 703/3; 703/4
(58) Field of Classification Search ................... 705/14
See application file for complete search history.

(56) References Cited

U.S. PATENT DOCUMENTS 5,603,025 A 2/1997 Tabb et al.

(Continued)

FOREIGN PATENT DOCUMENTS

| WO | WO 9955066 A1 | 10/1999 |
|---|---|---|
| WO | 01/86390 A2 | 11/2001 |
| WO | WO 2005/003920 A2 | 1/2005 |

OTHER PUBLICATIONS

Notice of Allowance, mailed Jul. 25, 2007, U.S. Appl. No. 09/943,524, Henkin et al.

(Continued)

*Primary Examiner*—Yehdega Retta
*Assistant Examiner*—Namrata Boveja
(74) *Attorney, Agent, or Firm*—Dean E. Wolf; Weaver Austin Villeneuve & Sampson LLP

(57) ABSTRACT

A technique is disclosed for generating markup information to be displayed on a client computer system. The client system includes memory configured to store at least one update file which comprises keyword information relating to keywords suitable for markup. In one implementation, the update file is generated at a remote server system and downloaded to the client system. When a new document (e.g. a web page) is displayed on the client system to an end user, selected context associated from the document is analyzed for selected keywords. In a specific implementation, the selected keyword information is provided by an entity other than the end user. Using the selected keyword information, specific context in the document is selected to be marked up. According to a specific embodiment, the selection of the document context to be marked up may be performed at the client system. Markup operations are then implemented at the client system on at least a portion of the selected document context, thereby resulting in marked up document context which has a visual appearance that is different than the appearance of the initial parsed context. Additionally, a pop-up advertisement may be automatically displayed on the client system based upon the identified context in the document. When the user clicks on a portion of the marked up document context, the user may be redirected to a target URL which was not included as part of the initial parsed document context. Alternatively, a pop-up window or layer which includes a plurality of different links may be displayed to the user.

107 Claims, 45 Drawing Sheets

U.S. PATENT DOCUMENTS

| | | |
|---|---|---|
| 5,764,906 A | 6/1998 | Edelstein et al. |
| 5,903,889 A | 5/1999 | De La Huerga et al. |
| 5,995,943 A | 11/1999 | Bull et al. |
| 6,061,659 A | 5/2000 | Murray |
| 6,092,074 A | 7/2000 | Rodkin et al. |
| 6,098,065 A | 8/2000 | Skillen et al. |
| 6,122,647 A | 9/2000 | Horowitz et al. |
| 6,141,010 A | 10/2000 | Hoyle |
| 6,317,781 B1 | 11/2001 | De Boor et al. |
| 6,334,145 B1 | 12/2001 | Adams et al. |
| 6,434,657 B1 | 8/2002 | Brown |
| 6,507,837 B1 | 1/2003 | De La Huerga et al. |
| 6,516,321 B1 | 2/2003 | De La Huerga et al. |
| 6,578,078 B1 | 6/2003 | Smith et al. |
| 6,606,652 B1 | 8/2003 | Cohn et al. |
| 6,725,227 B1 | 4/2004 | Li |
| 6,742,163 B1 | 5/2004 | Ono et al. |
| 6,757,661 B1 | 6/2004 | Blaser et al. |
| 6,785,740 B1 | 8/2004 | Yoneda et al. |
| 6,848,077 B1 | 1/2005 | McBrearty et al. |
| 6,862,710 B1 | 3/2005 | Marchisio |
| 6,968,332 B1 * | 11/2005 | Milic-Frayling et al. ....... 707/3 |
| 7,110,993 B2 * | 9/2006 | Soulanille et al. .............. 707/3 |
| 7,257,585 B2 | 8/2007 | Stevenson et al. |
| 2002/0052925 A1 | 5/2002 | Kim et al. |
| 2002/0065136 A1 | 5/2002 | Day |
| 2002/0107735 A1 | 8/2002 | Henkin et al. |
| 2002/0123912 A1 | 9/2002 | Subramanian et al. |
| 2002/0143808 A1 | 10/2002 | Miller et al. |
| 2004/0059708 A1 | 3/2004 | Dean et al. |

OTHER PUBLICATIONS

Office Action, mailed Aug. 23, 2004, U.S. Appl. No. 09/943,524, Henkin et al., filed Aug. 29, 2001.

Office Action, mailed May 13, 2005, U.S. Appl. No. 09/943,524, Henkin et al., filed Aug. 29, 2001.

Office Action, mailed May 2, 2006, U.S. Appl. No. 09/943,524, Henkin et al., filed Aug. 29, 2001.

Office Action, mailed Nov. 21, 2005, U.S. Appl. No. 09/943,524, Henkin et al., filed Aug. 29, 2001.

Office Action, mailed Aug. 23, 2001, U.S. Appl. No. 09/943,524, Henkin et al., filed Aug. 29, 2001.

Office Action, mailed May 13, 2005, U.S. Appl. No. 09/943,524, Henkin et al., filed Aug. 29, 2001.

Office Action, mailed May 2, 2006, U.S. Appl. No. 09/943,524, Henkin et al., filed Aug. 29, 2001.

Office Action, mailed Nov. 21, 2005, U.S. Appl. No. 09/943,524, Henkin et al., filed Aug. 29, 2001.

Office Action mailed May 11, 2007, U.S. Appl. No. 10/977,352, Henkin et al., filed Oct. 28, 2004.

Lemay, Laura. "Teach Yourself Web Publishing with HTML 4 in 14 Days." © 1997 by Sams.net Publishing. Second Professional Reference Edition, pp. 637-651.

U.S. Final Office Action mailed Feb. 5, 2008, for Patent Application 10/977,352, Henkin et al., filed Oct. 28, 2004.

* cited by examiner

Fig. 8 — 800

| Category ID (802) | Category Type (804) | Max number of underlines (806) | Category Priority (808) | Category Name (812) | Restricted Site IDs (814) | Restriction Indicator (816) |
|---|---|---|---|---|---|---|

Fig. 9A — 900

| Key Phrase or Title ID (902) | Display String Type (904) | Threshold Value (906) | Match/ Display Properties (908) | Display String Text (912) | Alternate Display Strings (914) | Negative Words (916) | Parent Category ID (918) |
|---|---|---|---|---|---|---|---|

Fig. 10 — 1000

| Site ID (1002) | Site Name (1004) | Group ID (1006) |
|---|---|---|

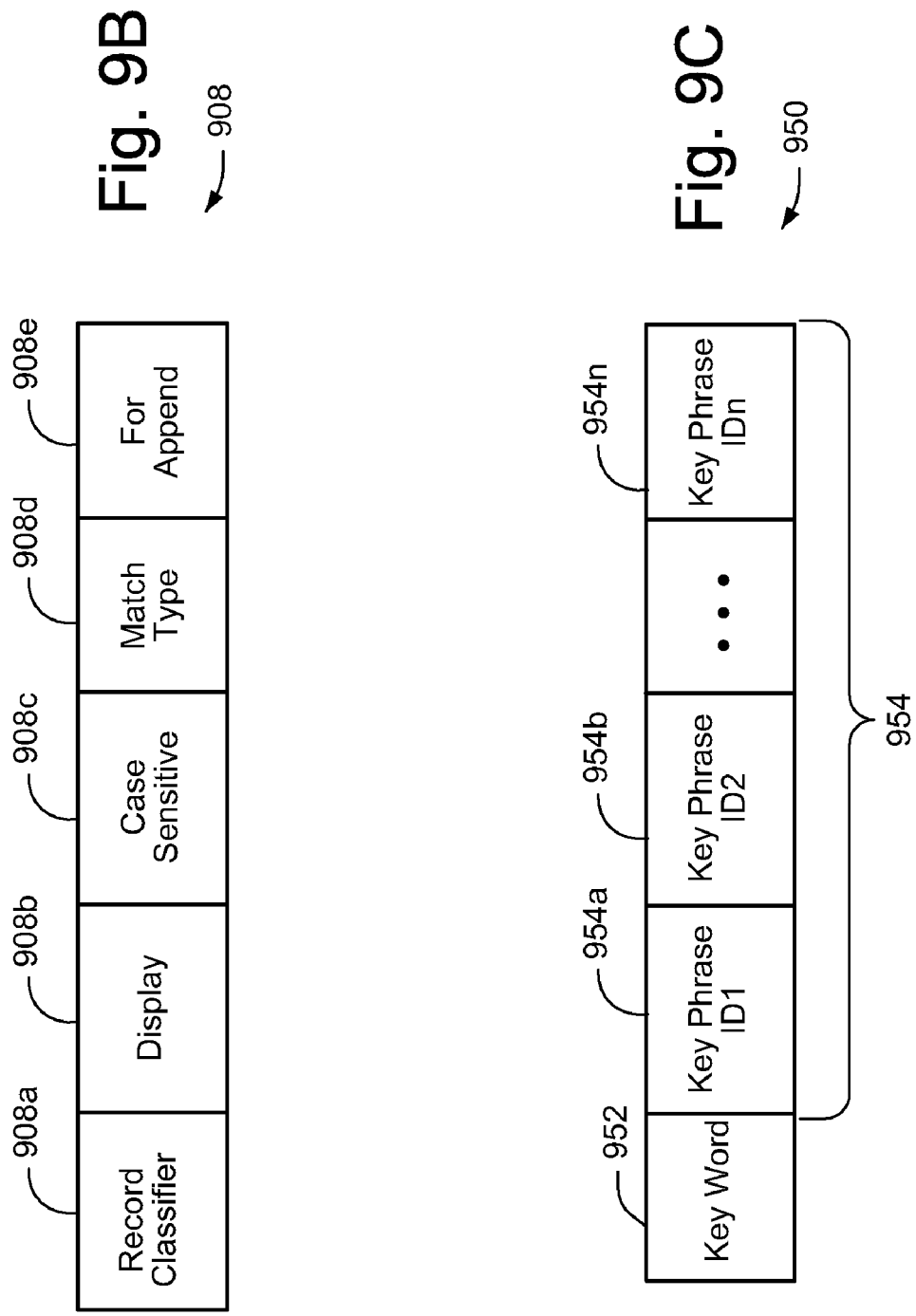

| I | 1 |
| --- | --- |
| used | 3 |
| my | 8 |
| credit | 11 |
| card | 18 |
| today | 23 |

| credit | card |
| --- | --- |
| x | x |

| credit | check |
| --- | --- |
| x |  |

| credit | card | APR |
| --- | --- | --- |
| x | x |  |

| 4000 | Exact | "credit card" | 100 | "check" | 9000 | ← 1772 |
| 4002 | Exact | "credit check" | 100 | | 9000 | ← 1774 |
| 4005 | Fuzzy | "credit card APR" | 60 | "used" | 9000 | ← 1776 |

| Category | Jan | Feb | Mar | Apr | May | June | July | Aug | Sept | Oct | Nov | Dec |
|---|---|---|---|---|---|---|---|---|---|---|---|---|
| Apparel & Beauty | 0.704 | 0.793 | 0.925 | 0.937 | 0.999 | 0.944 | 0.903 | 1.045 | 0.946 | 0.940 | 1.113 | 1.760 |
| Automotive | 0.905 | 0.937 | 1.098 | 1.008 | 1.116 | 1.089 | 1.014 | 1.091 | 0.988 | 0.970 | 0.905 | 0.868 |
| Computers & Electronics | 0.971 | 0.909 | 0.980 | 0.873 | 0.931 | 0.928 | 0.931 | 1.000 | 0.948 | 0.916 | 1.072 | 1.531 |
| Computers & Electronics: Internet | | | | | | | | | | | | |
| Directories & Search | | | | | | | | | | | | |
| Employment & Careers | | | | | | | | | | | | |
| Entertainment | 0.888 | 0.802 | 0.927 | 0.863 | 0.925 | 0.952 | 0.902 | 1.021 | 0.950 | 0.876 | 1.077 | 1.826 |
| Entertainment: Books | 0.888 | 0.802 | 0.927 | 0.863 | 0.925 | 0.952 | 0.902 | 1.021 | 0.950 | 0.876 | 1.077 | 1.826 |
| EntertainmentEnt & life | 0.888 | 0.802 | 0.927 | 0.863 | 0.925 | 0.952 | 0.902 | 1.021 | 0.950 | 0.876 | 1.077 | 1.826 |
| Entertainment: Magazines | 0.888 | 0.802 | 0.927 | 0.863 | 0.925 | 0.952 | 0.902 | 1.021 | 0.950 | 0.876 | 1.077 | 1.826 |
| Entertainment: Matchmaking | 0.888 | 0.802 | 0.927 | 0.863 | 0.925 | 0.952 | 0.902 | 1.021 | 0.950 | 0.876 | 1.077 | 1.826 |
| Entertainment: Music | 0.888 | 0.802 | 0.927 | 0.863 | 0.925 | 0.952 | 0.902 | 1.021 | 0.950 | 0.876 | 1.077 | 1.826 |
| Entertainment: Sweepstakes | | | | | | | | | | | | |
| Entertainment: Toys | 0.706 | 0.771 | 0.912 | 0.924 | 0.963 | 0.902 | 0.856 | 0.963 | 0.905 | 0.936 | 1.230 | 1.936 |
| Entertainment: Video | 0.888 | 0.802 | 0.927 | 0.863 | 0.925 | 0.952 | 0.902 | 1.021 | 0.950 | 0.876 | 1.077 | 1.826 |
| Health & Fitness | | | | | | | | | | | | |
| Home & Family: Family | | | | | | | | | | | | |
| Home & Family: Food | 0.953 | 0.903 | 1.002 | 0.970 | 1.030 | 1.015 | 1.030 | 1.019 | 0.989 | 0.977 | 1.001 | 1.113 |
| Home & Family: Home | 0.828 | 0.810 | 0.977 | 1.069 | 1.198 | 1.112 | 1.039 | 1.067 | 0.998 | 1.039 | 0.953 | 0.896 |
| Home & Family: Pets | 0.706 | 0.771 | 0.912 | 0.924 | 0.963 | 0.902 | 0.856 | 0.963 | 0.905 | 0.936 | 1.230 | 1.936 |
| Legal | | | | | | | | | | | | |
| News & Politics | | | | | | | | | | | | |
| Personal Finance & Banking | | | | | | | | | | | | |
| Shopping | 0.778 | 0.807 | 0.921 | 0.942 | 1.000 | 0.965 | 0.929 | 0.985 | 0.915 | 0.956 | 1.170 | 1.631 |
| Sports | | | | | | | | | | | | |
| Sports: Sportsgear | 0.888 | 0.802 | 0.927 | 0.863 | 0.925 | 0.952 | 0.902 | 1.021 | 0.950 | 0.876 | 1.077 | 1.826 |
| Telecom | | | | | | | | | | | | |
| Travel | | | | | | | | | | | | |

Fig. 24I eZula, Inc. – Campaign Manager – Home – Microsoft Internet Explorer ezManager BETA — July 18, 2001
Jonathan Knoll ezManager : Campaign Summary

Campaign Summary for Campaign #310: Your Campaign Name

| | |
|---|---|
| Campaign Manager: | Jonathan Knoll |
| Partner: | eZula |
| Publishers: | DD, Web3K, KaZaA, eAccel |
| Agency | The Agency |
| Advertiser | The Advertiser |
| Begin Date: | 7/19/2001 |
| End Date: | 7/26/2001 |
| Duration: | 7 days |
| CPC | 0.6 |
| Number of Clicks: | 10000 |
| Notes: | - Restricted Publishers – Restricted Sites (including advertiser's) |

Category Information

| | | |
|---|---|---|
| Category: | Calendars | View Keywords |
| Booked For: | DD, Web3K, KaZaA, eAccel | |
| Category: | Computing – Downloads - IM | View Keywords |
| Booked For: | Address, DD, eAccel, eZula, KaZaA, Web3K | |

Book Campaign

Your campaign has been booked!

Book Another Campaign

Keyword List

Calendar
april*
august*
december*
february*
january*
july*
june*
march*
may*
november*
october*
september*

Hide 3066
3067
3068

| Status | Campaigns | Last Modified | Active Publishers | Initial Upload |
|---|---|---|---|---|
| 0 | Affiliates_general_public | 2001-06-29 16:37:12 | | 2001-07-11 01:11:51 |
| 0 | BMG0605_public | 2001-06-29 16:37:44 | eZula, Address, DD, Juno, AllShack, Web3K, KaZaA, DigitalRoot, Imesh, WBug, LingoWare, Babylon, Goodsol, eAccel | 2001-07-19 01:03:09 |
| 0 | Webroot_1_public | 2001-06-29 16:38:09 | | 2001-07-03 15:32:44 |
| 0 | VirtualVegas0518_public | 2001-06-29 16:38:28 | eZula, Address, DD, Juno, AllShack, Web3K, KaZaA, DigitalRoot, Imesh, WBug, LingoWare, Babylon, Goodsol, eAccel | 2001-07-19 01:03:10 |
| 0 | Furniture_Find_public | 2001-06-29 16:38:59 | | |
| 0 | Consumer_Info_1_public | 2001-06-29 16:39:43 | eZula, Address, DD, Juno, AllShack, Web3K, KaZaA, DigitalRoot, Imesh, WBug, LingoWare, Babylon, Goodsol, eAccel | 2001-07-19 01:03:09 |
| 0 | Heartland0530_public | 2001-06-29 16:40:05 | | 2001-07-04 00:21:50 |
| 0 | Kazaa0620_public | 2001-06-29 16:40:27 | eZula, Address, DD, Juno, AllShack, Web3K, KaZaA, DigitalRoot, Imesh, WBug, LingoWare, Babylon, Goodsol, eAccel | 2001-07-11 01:05:45 |
| 0 | HomeGain0626_public | 2001-06-30 16:40:58 | Address, DD, eAccel | 2001-07-20 00:17:20 |
| 0 | Webroot0701 | 2001-06-30 16:52:48 | | 2001-07-10 00:20:49 |
| 0 | CreditCardSearchEngine0626 | 2001-07-02 20:43:11 | eZula, Address, DD, Juno, AllShack, Web3K, KaZaA, DigitalRoot, Imesh, WBug, LingoWare, Babylon, Goodsol, eAccel | 2001-07-13 00:34:22 |
| 0 | InvoiceDealers0706 | 2001-07-06 20:23:49 | eZula, Address, DD, Web3K, eAccel | 2001-07-20 00:19:13 |
| 0 | Short_Affiliates_General | 2001-07-06 20:25:34 | eZula, Address, DD, Juno, AllShack, Web3K, KaZaA, DigitalRoot, Imesh, WBug, LingoWare, Babylon, Goodsol, eAccel, NetCaptor | 2001-07-20 18:35:35 |

Status Indicator. Indicates the current status of the campaign. The Status be the following:
1. Locked
2. Editable & Uploadable
3. Commit Pending
4. Commit Pending II Campaign Name Date and time of last changes to the campaign.

The active Publishers for this Campaign. This means that the listed Publisher's client applications are currently running this Campaign.

Initial Upload and processing time. This is the time when the Campaign actually started.

Fig. 25A

Campaign name

Scroll through the Categories

Click for Category Properties

Click to manage keywords — 4015

View Categories Starting With: All A B C D E F G H I J K L M N O P Q R S T U V W X Y Z Non-Letter   Current Index: all Edit campaign: BMG0605_public

4016

4017

| Edit Category | Edit keyword of the category |
|---|---|
| Music – Styles Classical | Keywords |
| Music – Discount | Keywords |
| Music | Keywords |
| Music - Artists | Keywords |
| Music – Artists - Beatles | Keywords |
| Music – Artists - Enya | Keywords |
| Music – Styles Jazz | Keywords |
| Music – Artists - Madonna | Keywords |
| Music – Club | Keywords |
| Music – Styles Country | Keywords |
| Music – Styles Rock | Keywords |
| Music – Styles Rap Hip Hop | Keywords |
| Music – Styles Pop | Keywords |
| Music – Styles Soul | Keywords |
| Music – Styles Alternative | Keywords |

Move First | Previous | Next | Move Last | Records 1 to 15 of 18

Fig. 25C

DYNAMIC DOCUMENT CONTEXT MARK-UP TECHNIQUE IMPLEMENTED OVER A COMPUTER NETWORK

RELATED APPLICATION DATA

The present application claims priority under 35 U.S.C. § 119 to U.S. Provisional Application Ser. No. 60/229,452, naming Assaf et al. as inventors, and filed Aug. 30, 2000, the entirety of which is incorporated herein by reference in its entirety for all purposes.

The present application also claims priority under 35 U.S.C. § 119 to U.S. Provisional Application Ser. No. 60/311,418, naming Assaf et al. as inventors, and filed Aug. 9, 2001, the entirety of which is incorporated herein by reference in its entirety for all purposes.

BACKGROUND OF THE INVENTION

Despite the Internet's recent origin, this medium has rapidly become an important source of information for individuals and businesses. The popularity of the Internet as an information source is due, in part, to the vast amount of available information that can be downloaded by almost anyone having access to a computer and a modem. One of the Internet's strength lies in its open-ended nature since it is not supervised or controlled by any person or entity. These and other factors have caused an exponential increase in Internet usage and with it, an exponential increase in the volume of information available.

Moreover, the internet is especially conducive to conduct electronic commerce, and has already proven to provide substantial benefits to both businesses and consumers. Many web servers have been developed through which vendors can advertise and sell products directly to potential clients whom access their websites. To attract potential consumers to their websites, however, like any other business, requires target advertising. One of the most common and conventional advertising techniques applied on the internet is to provide an advertising banner on the web page of another website which directs the client to the advertiser's site when the banner is selected. Since it would not be financially prudent secure an advertising banner on every website, the advertiser generally selects websites which provide context or services related to the advertiser's business.

One problem, however, that many businesses are confronted with today is that they cannot proactively reach, serve, interact, sell or make relevant offers to consumers while the consumers are at web pages outside of their businesses' Web domain (website, toolbar, email, etc.). The most severe consequence of this problem occurs when a consumer has an interest in products, services or information that the business offers but the business is unaware and thus is unable to reach and serve this user. As a result, businesses miss revenue generating and/or cost savings opportunities.

Moreover, the key for a cost effective operation is determined by the efficiency of the flow of goods, services, along the value chain from suppliers, vendors, partners or manufacturers (herein referred to as "Suppliers") through the business, and to the business's customers or users. Today, a web domain is the primary online vehicle to serve a personalized, targeted flow of services and Information from the businesses to the users and customers. Businesses cannot take advantage of the World Wide Web as a platform on which they can reach and serve users with relevant Information, outside of their own Web domain.

SUMMARY OF THE INVENTION

According to various embodiments of the present invention, methods, systems, and computer program products are disclosed for generating markup information to be displayed on a client computer system. The client system includes memory configured to store at least one update file which comprises keyword information relating to keywords suitable for markup. In one implementation, the update file is generated at a remote server system and downloaded to the client system. After a new document (e.g. a web page) was downloaded to the user's machine, the browser that the user choose to parse the document and displayed on the client system to an end user and in addition to the preferences that users choose to have his browser act upon, selected context associated from the document is analyzed for selected keywords in the displayed document. In a specific implementation, the selected keyword information is provided by an entity other than the end user. Using the selected keyword information, specific context in the document is selected to be marked up. According to a specific embodiment, the selection of the document context to be marked up may be performed at the client system. Markup operations are then implemented at the client system on at least a portion of the selected document context, thereby resulting temporarily in marked up document context on the users PS which has a visual appearance that is different than the appearance of the document as it was retrieved context. According to a specific embodiment, a fuzzy search technique may be used for identifying selected keywords in the document context. Selection of the appropriate document context to be marked up may also be determined based upon other such as, for example, negative words, site restrictions, click behavior of the user, predetermined business rules, etc. According to a specific embodiment, when the user clicks on the markups. Alternatively, a pop-up window or layer which includes a plurality of different links may be displayed to the user.

Alternate embodiments of the present invention are directed to methods, systems, and computer program products for generating pop-up advertising information to be displayed on the client computer system. When a new document (e.g. a web page) is displayed on the client system to an end user, selected context associated from the document is analyzed for selected keywords. Specific context in the document may then be identified using the selected keyword information. Based upon the identified context in the document, a selected pop-up advertisement may be automatically displayed on the client system.

In another aspect of the present invention, methods, systems, and computer program products are provided for predicting the number of clicks a campaign may provide for specific publishers and for specific categorical information.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 8-10 illustrate specific embodiments of data structures which may be included in the campaign provider download component and/or update files which are downloaded to the client system and used for implementing various aspects of the present invention.

FIGS. 17A-E illustrate examples various data structures which may be used for implementing various aspects of the present invention.

FIG. 23 is an exemplary Table of season factors (S) for specific Categories which are applied when predicting the number of clicks for a Category in accordance with the present invention.

FIGS. 24A-24K show examples of browser windows which may be used for illustrating various aspects and features of the EZ Manager Application of the present invention.

FIGS. 25A-25J show examples of browser windows which may be used for illustrating various aspects and features of the EZ Gateway Application of the present invention.

DETAILED DESCRIPTION OF THE PREFERRED EMBODIMENTS

Overview of System Components

Figure 1:
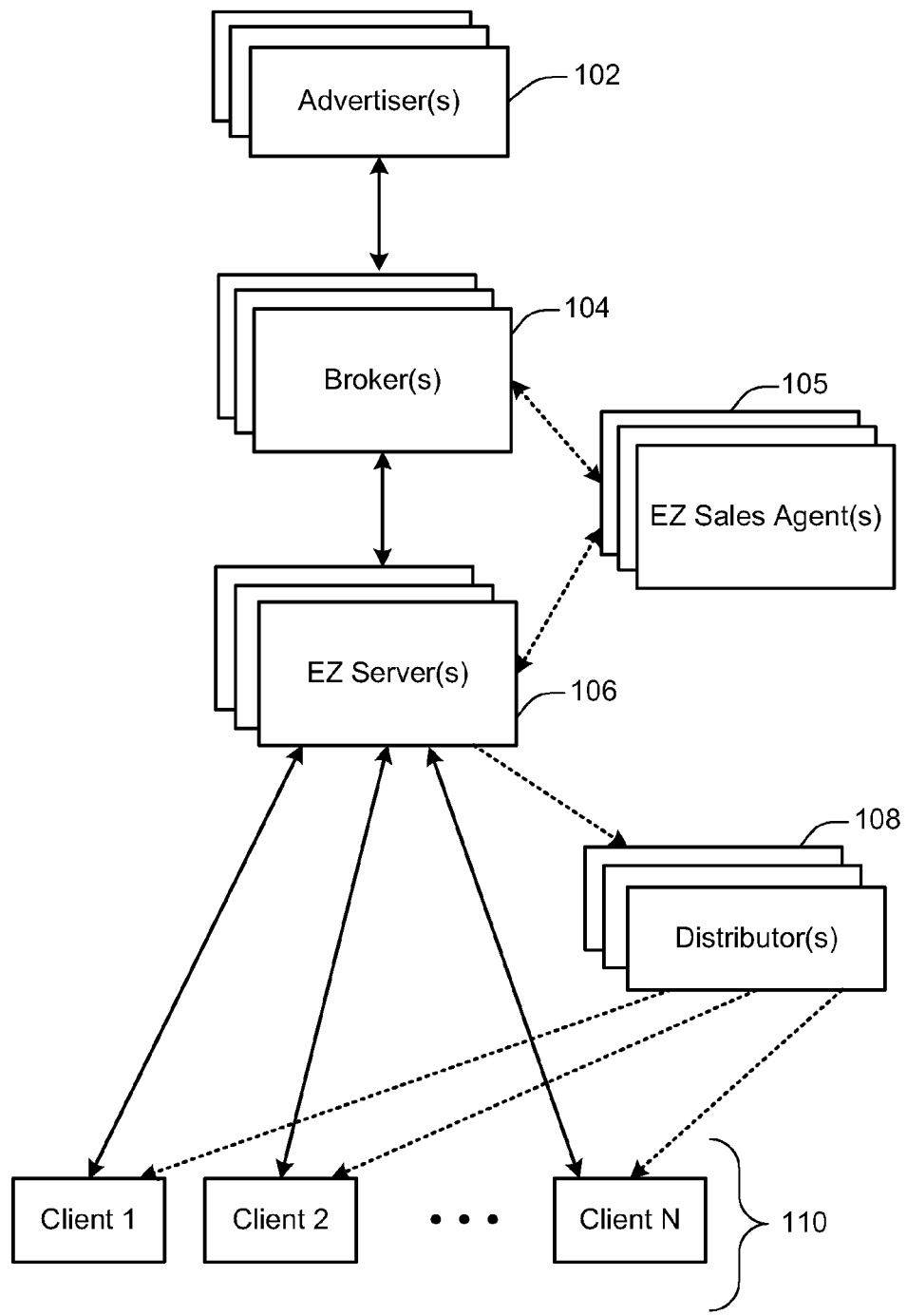
FIG. 1 shows a block diagram of an information distribution and context markup system 100 in accordance with a specific embodiment of the present invention.

This section describes an overview of various components which may be used for implementing various aspects of the present invention. It will be appreciated that the overview description provided in this section merely represents an example of specific embodiment of the functions and implementations of the various components. Additional embodiments are described in subsequent sections of this application.

According to a specific embodiment, the present invention includes a number of system components, including a server application, a client application and an extranet application.

According to a specific embodiment, the extranet application hosts secure and personal accounts for different business customers. A business customer representative may log in and manage the data and actions for the business' community. Data may be modified (added, changed or deleted), and actions that relate to this data may be modified as well. When completed, the modifications may then be saved, and the changes automatically posted to the server application system. The server application may then forward the modified data to the client application via one or more update files.

The client application includes a search engine which is configured to perform multiple types of identification and matches based on a given set of data and the textual context on a given document or web page after such web page is being parsed according to the user's preference. According to a specific embodiment, the search engine operates on the end user's machine, and utilizes local processing and memory resources, thereby making the present invention highly scalable. In one embodiment, the search engine resides on the user's machine as part of the client application. It uses data that is sent in the form of update files to the client application from the server application. The update files may be automatically downloaded to the client system on a periodic basis. The update files include indexed data for the search engine. This data may be divided into display names and keywords, as illustrated in the following example:

Display name: SONY DVD Player DV120

Keywords: SONY, DVD, Player, DV120

The search engine uses the display name and keywords in order to analyze the context of a selected document (e.g. web page) for the presence of selected keywords (which are specified in the update files).

According to a specific embodiment, the search engine is designed to support different business requirements. It may operate in a variety of search modes, including an exact search mode and a fuzzy search mode. The search engine may search the document text, WEB PAGE, title, Meta tags, or any other property of the selected document for selected key words or phrases. In one embodiment, a search is conducted by analyzing words in the text of a selected document to see if it includes specified keywords or phrases. If a match is found, the location and position of the identified keywords in the document text may be recorded and used subsequently for temporary markup analysis and implementation.

The client application may start running automatically when the user initiates a browser application. While a user surfs the Web, the client application performs advanced contextual analysis to make matches between keywords (specified in the update files) and the context on the web page being displayed on the user's system. Once a match is made, matched items (e.g. product names, keywords, phrases) are visually marked up (e.g. underlined, highlighted). The specific implementation, the end user may be allowed to configure the appearance of the marked up context.

In the example above, it is assumed that a match for "SONY DVD" has been identified in the current web page, and marked up in accordance with the technique of the present invention. When the user clicks on the marked up context, the user may either be directed to a new web page relating to SONY DVD Players, for example, or a pop-up layer may be displayed which includes different possible matches for the selected marked up context. One of these possible matches may be a URL for a web page relating to the SONY DVD Player DV120. If the user clicks on this item in the pop-up layer, he or she will be redirected to the corresponding web page.

According to a specific embodiment, the client application may also proactively initiate a Browser control (s) onto the current document. Such layers may be customized to match a business customer's brand, and may include additional information such as, for example, a summary of products, keywords and phrases, advertising banners and/or marketing messages. Moreover, such additional information may be selected based upon specific context which is found to be included in the current document. In one implementation, if the user clicks on the marked up objects on the page and/or on linked objects within the layer, another dynamic layer may automatically be displayed with more information and options. Alternatively, the user may be automatically directed to a specific web page, based upon the user's selection.

In one embodiment, the client application includes an agent which may be responsible for processing context contained within the current document or web page, and for performing markup of selected text or keywords. In one implementation, the agent passes elements from the parsed page to the search engine (which also resides in the client application). The search engine compares the page elements to a given set of data and passes relevant matches back to the agent. The agent receives this information from the search engine and performs markup of different textual objects on the page. The agent may also open a corner layer with more relevant information.

According to a specific embodiment, the client application may include a main application, and agents that are configured to open with each browser that the user opens. The agent waits for a download complete event and document complete event from the browser. Once the download complete event is fired, the agent extracts the text from the page without the HTML tags, the links, and the HTML table cells. The agent passes this to the search engine in the main application that is part of the client application. The search engine then uses a hash table mechanism in order to complete the search process. Once the search process is complete, the search engine passes results back to the main application, which in turn passes parameters back to the agent. The agent then marks up the textual objects which were identified in the current document.

Additionally, according to a specific embodiment, a global unique identifier (GUID) may be stored on each user's machine. For example, the GUID may be stored in the computers registry as part of unique application data. This GUID may be linked either directly or indirectly (e.g. via a cross-reference table) to other systems, for example, to enhance the service and personalization attributes available to the end user.

According to specific embodiments of the present invention, a technique is described that enables any targeted word, phrases, etc. on any parsed web page to be converted into a link of any designation. More particularly, this context-based technology provides any information distributor (e.g., an Advertiser) with a platform that proactively responds to the textual context on any given web page that their selected audience is viewing, anywhere on the Internet, by marking up pre-defined keywords or phrases on every Web page. In effect, targeted static HTML context, for example, can be converted into links that direct these users to specific WEB PAGEs and/or present relevant offers (banners, rich media).

Thus, in one embodiment, this application is particularly suitable for advertising applications since publishers, advertisers, and technical administrators could leverage the context that a user is viewing, in real time, and convert key phrases or words in the context, on any Web page. This presents a significant advertising opportunity since this targeted static HTML context could be applied to direct qualified traffic to the advertiser, based on the context, from all over the Web. Hence, this contextual analysis technology facilitates the delivery of a higher targeting and relevancy of promotions, significantly lower ad serving costs, higher click-through rates, and a dramatic increase of conversion rates and user 'buy' actions. Advertisers can more precisely target their audience with existing and additional services directly to pre-defined targets according to the context of the web.

Brief System Overview

Referring now to FIG. 1, a schematic block diagram of an information distribution and context markup system 100 is provided which illustrates one specific application implementing the contextual based platform of the present invention. In one specific embodiment, an Campaign Provider (e.g., an Ad Campaign Provider), such as EZULA, INC. of San Francisco, Calif., markets and bundles their context based platform (e.g., the CONTEXTPRO™) with their partner Distributor/Publisher's 108 application software, such as with the ISP's KAZAA, JUNO, AOL, etc. Thus, as will be described in greater detail below, when a $Client_1$-$Client_N$ 110 of the partner Distributor/Publishers 108 downloads the Distributor/Publisher's application software when activating an account, a Campaign Provider download component from the Ad Campaign Provider will also be installed together with the Distributor/Publisher's application software. Consequently, the Clients 110 can then access the EZ Servers 106 of the Ad Campaign Provider via the Internet. This implementation will be better described below.

In one example, an Information Distributor 102, such as an Advertiser (e.g., Wells Fargo Bank) and an Advertising Broker 104 (e.g., I-Traffic) negotiate the Campaign Details of an Information Distribution Campaign (e.g., an Ad Campaign). Briefly, as will be described in greater detail below, these negotiated Campaign Details may include the campaign name, appropriate super category and/or categories of the Advertiser's product field; the selected keywords; additional keywords specific for this campaign; the duration of the ad campaign, projected total number of clicks, the Cost Per Click (CPC), the desired publishers to run the campaign with their respective users, and web domains of the advertiser where Markups will not appear. Furthermore the WEB PAGEs to be linked, with the appropriate title which is the text message that appears on-hover of marked up text and in the pop-up layer of annotations for hyperlinks. For instance, in Well Fargo's Ad Campaign example, the keyword "bank" may be selected to be highlighted or marked-up for all the Clients 110 subscribing to JUNO, whom is a Distributor/Publisher partner of the Ad Campaign Provider. These Ad Campaign details are then uploaded into the EZ Servers 106 by either the Advertising Broker 104 or an EZ Sales Agent 105.

Briefly, an Advertising Broker 104, such as I-Traffic, or L90, is typically an entity that brokers an advertiser account with an Advertiser. The Sales Agent 105, in one specific embodiment, is an employee of the establishment providing the advertising services in accordance with the present invention. These Agents, thus, may service several accounts by one or more brokers.

This Campaign Data is then processed by the EZ Servers 106, as will be described in detail below, and distributed, via, the internet, to the downloaded Client Applications of the member Clients 110 of the Distributor/Publisher partners 108 (i.e., JUNO in this example) of the Ad Campaign Provider (i.e., EZULA) selected by the Advertiser (i.e., Wells Fargo). Accordingly, when one of the Clients 110 is surfing the Internet, regardless of what web page they are viewing, the Client Application scans the text of the web page, analyzes the context, and marks up keywords and/or phrases. Upon the presence of the selected keywords and/or phrases, these once static HTML text are is then converted to hyperlinks to the advertiser's site. In this example, the occurrence of the keyword "BANK" will be converted to a URL destination that Wells Fargo selects. Thus, the Client may click on the marked keyword or context in the dynamic layer. The Client's browser is then redirected to the new destination.

Briefly, while the Distributor/Publisher partners 108 have primarily been referred to as ISPs, it will be appreciated that any number of entities or device may distribute the Ad Campaign Providers Client Application. For example, these entities or devices may include MP3 Players (Jukebox software, Internet Radio), P2P & IM Clients (instant messaging, file swapping), Browser Companions (shopping bars, mileage points, form-fillers), Browsers, Online Games and Gambling providers, Distributed Application Providers (Download accelerators, Document Viewers, Plug-ins, Streaming, Skins, Audio players), PC/Internet software distributors (New PCs, Dialup Kits, Fax Software), PC manufacturers or independently by the user.

Figure 2:
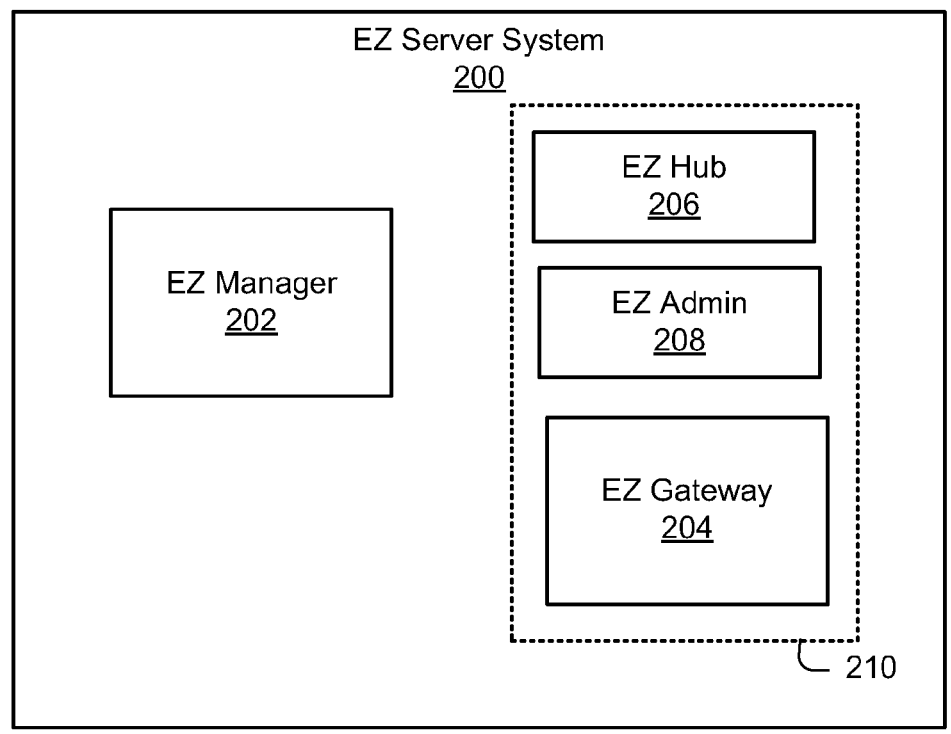
FIG. 2 shows a block diagram of an EZ server system 200 in accordance with a specific embodiment of the present invention.

Referring now to FIG. 2, a schematic block diagram illustrates various systems, subsystems and/or components of the integrated system architecture of the EZ Server System 200 in accordance with a specific embodiment of the present invention. As shown, the EZ Server System 200 includes a plurality of subsystems and other components for effecting a plurality of Ad Campaigns over a data network. A brief description of at least a portion of the plurality of subsystems of Server System 200 is presented below. For example, Server System 200 of FIG. 2 generally includes the two primary application components: an EZ Manager Component 202, and an EZ Gateway Complex Component 210. Briefly, the EZ Manager Component 202 is an advanced web-based application which enables advertising agencies and their sales executives or other advertising sales entities to: view the available inventory of the Ad Campaign Provider, in real time; plan and book new campaigns; manage ongoing campaigns (modify campaign properties such as CPC, duration, categories, keywords, URL, Title, etc.) and view detailed online reports. The EZ Gateway Complex Component 210, in one specific embodiment, is composed of a plurality of server applications which cooperate collectively to manage, process, update, and log all the Campaign Data and Client activity relating to each Ad Campaign.

As shown in FIG. 2, Server System 200 may include at least a portion of the above-described subsystems. Additionally, each subsystem may also comprise at least one server and/or other components. Preferably, the Application Servers are configured as web servers that have a load balancing mechanism in front of them. Preferably the load balance functionality is provided by a CISCO Local Director 430 appliance, which distributes connections across the Application Servers, creating a virtual connection from the Client to the Application Server. This technique enhances the performance of all servers in the cluster and facilitates real-time addition and removal of individual Application Servers from the cluster with no disruption of service. In front of the entire server farm resides a firewall appliance that protect the data and applications from unauthorized access. Preferably the firewall functionality is provided by a CISCO PIX 520 firewall appliance.

Each subsystem may be configured or designed to communicate with each other via a plurality of interfaces. According to a specific embodiment, the plurality of interfaces includes both synchronous and/or asynchronous interfaces. Many of the various system interfaces are configured to be asynchronous, wherein data is typically transferred in batch mode via staging (e.g. database) tables or flat files (e.g., separated value files). However, at least a portion of the system interfaces are configured as synchronous interfaces. Generally, a synchronous interface may be used where an immediate response from a server or component is required.

Referring back to the EZ Manager Component 202 of the EZ Server System 200, this web-based application allows the Advertising Agencies 102, Network Brokers 104, In-House Sales Agents 105, etc. to view the current inventory of Super Categories 302, Sub-Categories 304, and Keywords 306 (FIG. 3) available by the Ad Campaign Provider. Other viewable inventory, as will be apparent in one specific embodiment, includes the projected available clicks based on the appropriate Campaign Provider network segment(s). This application which is hosted by the Campaign Provider within their web farm, also enables the planning and booking of new campaigns by selecting the appropriate categories and keywords, and setting the appropriate relationship with the advertiser's online destinations; the viewing of online campaign performance reports; and the managing of active reports.

The EZ Gateway Complex 210 of the EZ Server System 200, in accordance with a specific embodiment, is composed of a plurality of server applications which include an EZ Hub 206, and EZ Admin 208 and an EZ Gateway 204. Briefly, the EZ Hub 206 is a server application that is responsible for communication, updates, data collection, reporting and monitoring of the Client Applications which are distributed to the Clients 110 of the Distributor/Publisher partners 108.

The EZ Gateway 204 is another server application that allows campaign managers, business analysts, system managers and technical personnel (engineers, system administrators, and programmers) to process and manage campaigns, analyze and enhance campaign performance, and control the data flow to the different types of distributed applications. Since these entities often require immediate, real time access to different elements within the platform, the EZ Gateway 204 enables them to complete several tasks with maximum efficiency and control.

For example, for processing and managing campaigns, the EZ Gateway application enables new campaigns to be tested for accuracy and conflicts, which are then processed through the system. As will be apparent, this application allows active campaigns to be modified (new categories and/or keywords) in order to achieve the campaign's objectives. Campaign analysis can also be performed where the server application analyzes data and creates reports on an ongoing basis. The EZ Admin Server automatically creates these reports and assist in analyzing the different aspects of the campaign in order to better understand the results and reach the campaign's objectives within the campaign's timeframe. After creating the reports, EZ Admin Server 208 places these reports on EZ Manager 202 for the sales entities to access.

In other specific implementations, the EZ Gateway 204 performs data management tasks as well. The Client Application that performs the contextual analysis that analyzes web pages in real time, then marks up textual objects on the page, uses several advanced algorithms that can be tweaked in order to better leverage the pages' context. EZ Gateway 204 allows engineers, system administrators and context editors access to this information using several web-based interfaces. The EZ Gateway 204 also performs category management tasks such as permitting the Ad Campaign Provider to enhance their ontology (the database of categories and keywords) on an ongoing basis, in real time.

Regarding the EZ Gateway component 204 of the EZ Gateway Complex 202, secure and reliable access to campaign application and configuration data from personal computers can performed via a web-based application hosted at the Ad Campaign Provider. By way of example, this server application permits a line-of-business manager to: upload new Campaign Data information (e.g., Display Strings, keywords, product names, promotional information, destination etc.); to manage the information and different application properties; view and print reports, and modify business rules.

As previously indicated, at least a smaller starter application (The Stub) is included in the bundle of software applications downloaded on the clients 110 personal computer when activating an account with the Distributor/Publisher 108. This Client Application is a client side application that is the core of Campaign Provider's contextual analysis engine. Briefly, as will be described in detail in the discussion of FIG. 5A, the Client Application 520 includes a Contextual Analysis Engine (CAE) 522, a Server Communication Component (SCC) 524 and a Cycling Analysis Component (CAC).

This Client Application 520 can be easily incorporated with other client applications that are distributed through multiple channels (update, online, CD, etc.). To improve efficiency, and to reduce the size of the stub that is bundled with the software that the publisher distributes, the present invention utilizes at least two primary smart download technologies (SDT) that can be downloaded through various direct and indirect distribution channels. The first is to provide an Active X component for the Distribution partner web-based application (HTML page or email). This technique provides the distribution partner a link to a custom page that initializes the ActiveX installation. This link may be placed within HTML pages, HTML emails, and text emails. Upon clicking the link, a small CAB file is installed, which in turn installs the Client Applications files. This download is completed in the background so that the Client may continue surfing the Internet without any visual interface.

In another implementation, the second Smart Download Technology technique is the application of Stub Technology that streamlines the distribution process of the Client Application within user installed base of other applications. Briefly, Stub Technology is a software component that installs the Client Applications files. This download is completed in the background so that the Client may continue surfing the Internet without a visual interface.

Thus, when the Client is on-line, the Stub fetches the appropriate Client Application and data files from the appropriate server that could be the nearest Context Delivery Network (CDN) server, such as an Akamai server or other server provided by the company and as will be discussed in greater detail below, creates an Ad Campaign Provider folder, registers DLLs, and sets registry values. In order to complete installation, the Stub requires that the Client will be online. However, the Stub can be executed while the Client is offline, and will then complete the installation once a valid connection is achieved. By default, if the terminal is not connected, or the connection was lost during the installation, the stub will attempt to complete the installation periodically (e.g., every 10 minutes) or after the next boot. Every such attempt requires to check if the user is online. If the connection ends before a complete installation, the installation will resume from the point that it stopped the next time that the user connects.

Figure 4:
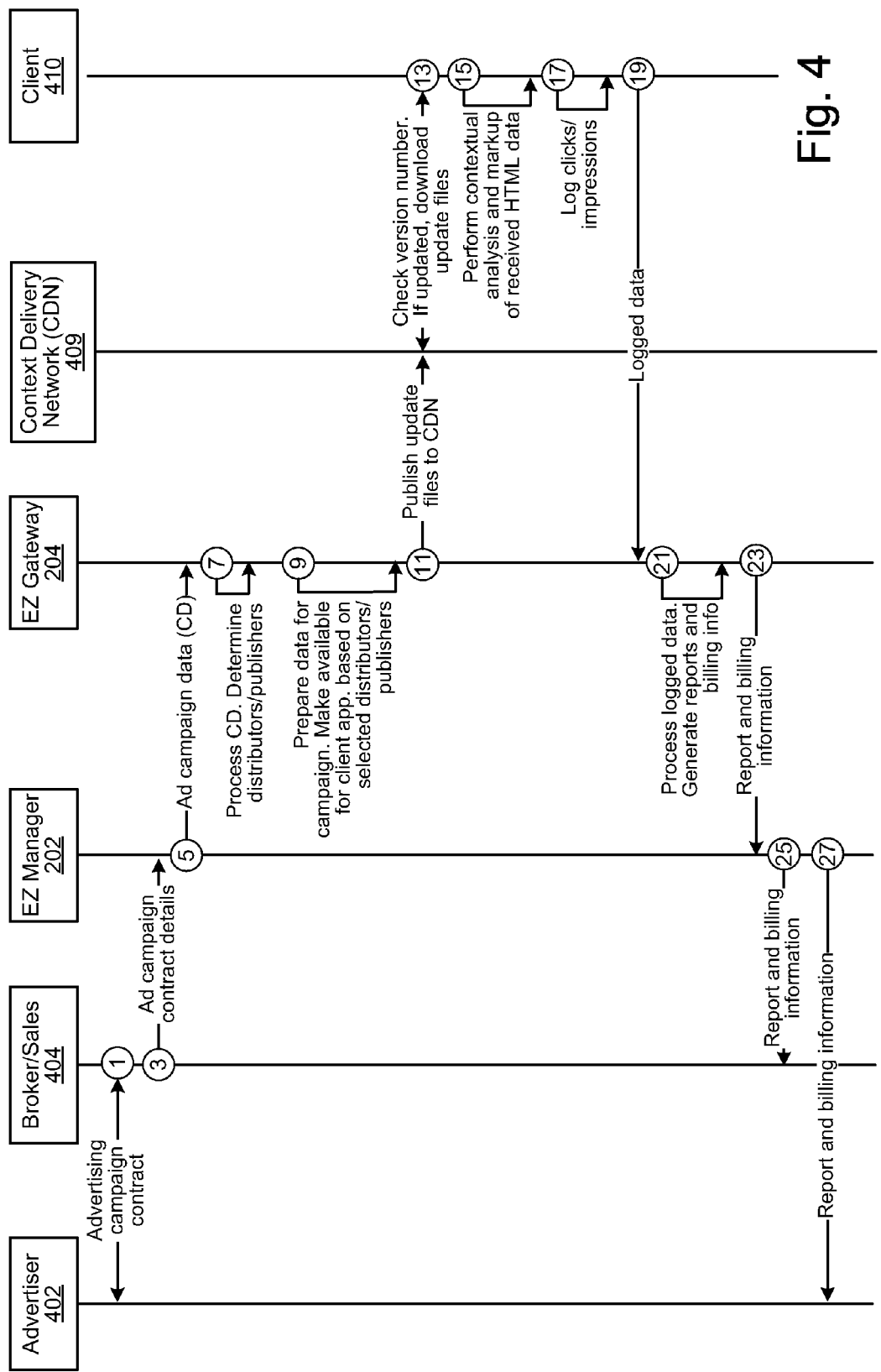
FIG. 4 shows a flow diagram illustrating how various components of the information distribution and context markup system interact with each other to implement the various aspects of the present invention, in accordance with a specific embodiment.

FIG. 4 best illustrates a detailed data flow diagram of various subsystem and component interactions during normal business operations for effecting electronic commerce in accordance with a specific embodiment of the present invention.

Beginning at (1) a Broker/Sales Agent 404 and an Advertiser 402 negotiate an advertising campaign contract. Briefly, as set forth in FIG. 1, the Broker 104 is typically an entity whom brokers an advertiser account with an Advertiser, such as I-Traffic, Or L90. The Sales Agent 105, in one specific embodiment, is an employee of the Ad Campaign Provider in accordance with the present invention. These Agents, thus, may service several accounts by one or more brokers. As will be described in greater detail below in FIGS. 24A-24L, such negotiated terms may include the appropriate super category and/or categories; the selected keywords; the length of the ad campaign, projected total number of clicks, the Cost Per Click (CPC), the desired publishers, the negative keywords; the popup titles and descriptions, the URLs to be linked, the restricted web pages; and the Match Type which is essentially the binary number that instructs the client application how to behave for this specific keyword.

At (3), the Broker/Sales Agent 404 accesses the EZ Manager 202 component of the EZ Server System 200 through a personal computer via Internet or the like. In one specific implementation, the Broker 104 or Sales Agent 105 (FIG. 1) inputs these ad campaign contract details into the personal computer, and uploads the Campaign Data (CD) to the EZ Manager 202. In another specific implementation, the Advertiser may have access to the EZ Manager 202 and be permitted to directly input the ad campaign contract details themselves. Once the Campaign Data, is entered into the web application of EZ Manager 202, it is stored in the EZ Server System database for processing.

At (5) the Campaign Data, which as set forth above includes the contract details (i.e., number of clicks, campaign length, desired publishers, etc.), is sent from the EZ Manager 202 to the EZ Gateway 204 component of the EZ Gateway Complex of EZ Server System 200. In one specific example, this Campaign Data is transferred as a set of files containing any new relationships between new or existing campaigns and publishers. Typically, for every campaign added or modified, up to 3 files are uploaded in one specific embodiment. These include a "Keywords and titles" file; an optional "Categories" file; and an optional "Sites" file.

Once the files are uploaded to the EZ Gateway 204 component, the Campaign Data is read processed via EZ Admin Server 208 to the database of the relevant tables at (7). Initially, the EZ Gateway 204 determines the relationship between the new or modified campaigns of the Advertiser 402 (or 102 in FIG. 1) and the respective Distributors/Publishers 108 (FIG. 1). For example, every Distributor/Publisher 108 (e.g., AOL®, JUNO) that has a new campaign should be updated. Further, every Distributor/Publisher that was removed from a campaign should be updated, and every Distributor/Publisher that is associated with a campaign that was modified should be updated. In one configuration, this relationship determination process of the Campaign Data may be may be automatically or manually implemented.

Referring now to (9), the Campaign Data is prepared for publication to the Clients 410 of the selected Distributors/Publishers 108 determined at (7) for the respective campaigns. All new or modified campaigns are assigned a new version number for the selected publishers to allow clients 410 from their respective publisher's to be informed of updated campaign information to be downloaded. While this data preparation is preferably performed when an new campaign is instituted or an existing one is modified, in one specific embodiment, this publication update sequence may be automatically performed periodically (e.g., every night) by the EZ Gateway 204 as well.

In one specific implementation, when the Campaign Data is being added or modified for a Distributor/Publisher, a major or a minor change is selected. A major update includes the whole data set, and a minor update is an incremental data update that adds, deletes or modifies part of the data.

The new update files are then generated at (9) for the relevant Distributor/Publishers. In one specific implementation, all the campaigns that are associated to a particular Distributor/Publisher are consolidated in one table (e.g., a snapshot table) or set of Campaign Update Files for that Distributor/Publisher. If a Major update occurs, a new set of Major Campaign Update Files is generated to replace old Campaign Update Files. In contrast, if a Minor update occurs, the new Campaign Update Files are compared to the old Campaign Update Files generated in the previous version. Minor update files are then generated accordingly.

Briefly, the processed data files or tables for updating contain a plurality of Display Strings and Keyword Data for each Distributor/Publisher selected by the Advertiser for that campaign. By way of example, and as will be described in greater detail in the discussion of FIGS. 8-10, the display strings may include a Category Display String (FIG. 8), a Key Phrase Display String and, or Title Display String (FIG. 9) and a Site Display String (FIG. 10).

Once the files have been processed at (9), the table or tables of updated data files are distributed to a Context Delivery Network (CDN) 409 at (11) for updating by the designated Clients 410 of the Distributor/Publisher partners. Briefly, these CDNs 409, such as Akamai, Mirror-Image, etc. provide a wide area network of geographically optimized web servers. Hence, a member Client 410 of one or more Distributor/Publisher partners will have access to the updated files from the closest CDN 409 server.

Accordingly, at (13), the Client Application (or the Client 410) periodically checks and compares a version number assigned to the Campaign Update Files stored at the CDN 409 with the version number of the Campaign Update Files table resident on their personal computer. If the version numbers do not match, the Client Application submits a request to download the new Campaign Update Files. When the request for download is received (13) at the CDN 409, the Client Application of Client 410 accesses the CDN 409 to retrieve the updated or new Campaign Update Files, which will include any new campaigns, and/or campaigns which have been modified for the Distributor/Publisher partners of which the Client is associated with. As an example, this periodic check is performed every hour.

At (15), once the Client 410 begins accessing web pages, the Client Application performs a contextual analysis and markup of the downloaded HTML data from each web page using the updated Campaign Update Files. Briefly, the Client Application scans the page, analyzes the context, and marks up the Advertiser or information provider selected keywords or context and/or places dynamic layers on the page. In other words, the textual objects, terms phrases, etc. selected for highlighting by the Advertiser 402 in the campaign will be turned in to hyperlinks.

Should the Client elect, at (17) they can then click on the marked keywords or context impressions in the dynamic layer which will then redirect the Client's browser to the Advertiser's destination. In one embodiment, click-on options may include direct hyperlinks to specific web pages or multiple sites; pop-up layers with dynamically served banners; and pop-up layers with promotional information and multiple destination links. This analysis technique, of course, will be discussed in much greater detail below.

When the User redirects the browser to an Advertiser's web page from one of the marked keywords, the redirection is logged. This is commenced at (19) where the logged data is transmitted from the Client Application of the Client 410 to the EZ Hub 206.

At (21) the EZ Admin Server 208 processes the logged data for updating in the reports and billing information. This process involves preparing reports based on the raw data in log format that is gathered on EZ Hub 206 and placing these reports in the appropriate location on EZ Manager 202 for the appropriate entities to view. This logged data, for example, includes the Number of Clicks, the keyword that were highlighted etc.

Once the logged data is processed by the EZ Admin Server 208, the Report and Billing Information is forwarded to the EZ Manager 202 at (23) where this information may be accessed by the Broker/Sales Agent 404 or the Advertiser 402. This is performed at (25) by the Broker/Sales Agent 404 and at (27) by the Advertiser 402. The Advertiser 402 may then request that the Broker/Sales Agent 404 adjust or modify the Ad Campaign Data based upon the Report Information if desired.

After a Broker 104 and/or Sales Agent 105 has negotiated the Campaign Details of Ad Campaign with an Advertiser 102, the Campaign can be booked using a personal computer to access the EZ Manager component 202 of the EZ Server System 200 (FIG. 2). The EZ Manager, briefly, is a core tool for creating campaigns and designing their ontology. This web-based application allows Advertisers 102 (agencies, networks, in house sales agents, etc.), through their Brokers 104 and/or EZ Sales Agents 105, to: view the current inventory of categories, keywords, and projected available clicks based on the appropriate network segment(s); plan and book new Ad Campaigns by selecting the appropriate categories and keywords, and set the appropriate relationship with the Advertiser's online destinations; view online Ad Campaign performance reports; modify ongoing campaigns, and view activity reports.

For the ease of description, the EZ Sales Agent 105 will be the party described as entering the Campaign data into its EZ Manager Application. It will be appreciated, however, that the Broker 104 or even the Advertiser may be granted access.

The Server Application

EZ Manager Application

Figure 24A:
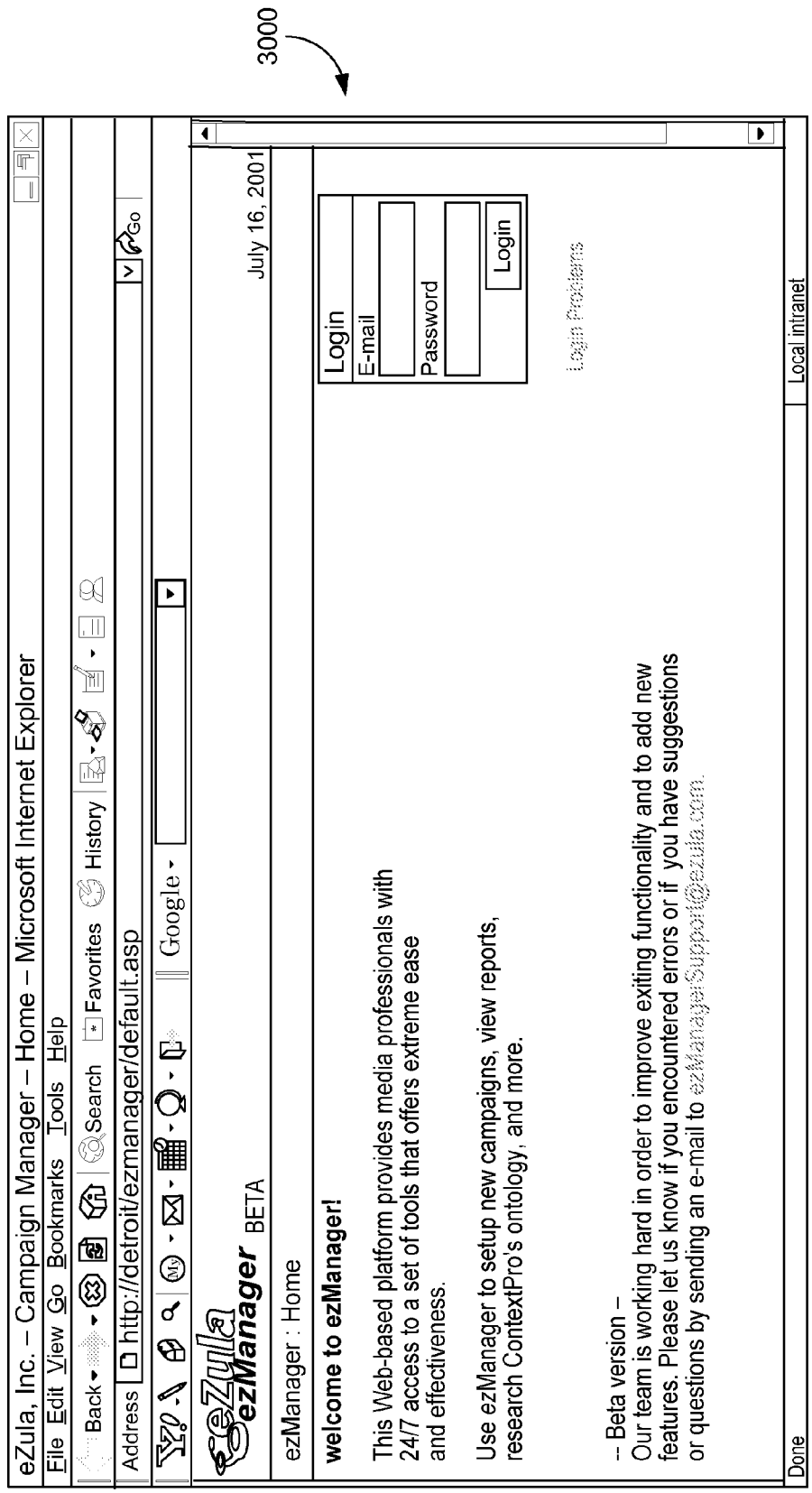

Referring now to FIG. 24A, the EZ Sales Agent 105 logs into the EZ Manager component 202 of the EZ Server System 200 at a Login page 3000 using conventional LOGIN techniques. In one specific embodiment, the EZ Manager requires a user account to login with an e-mail address and a password. Once LOGIN is complete, and the e-mail address and password are verified, the application redirects the User to the Main Menu page 3001 shown in FIG. 24B. This is the access menu to the various applications of the EZ Manager web application, and is used to: Plan a Campaign: Access Reports: Administrate Pop-Up Advertisements: Administrate Campaigns; Manage Inventory: and/or Add a New Advertiser. As shown, this is performed by selecting one of the corresponding links: Plan a Campaign 3002; Access Reports 3003; Administrate Pop-Up Advertisements 3004; Administrate Campaigns 3005; Manage Inventory 3006; and Add a New Advertiser 3007.

Figure 24B:
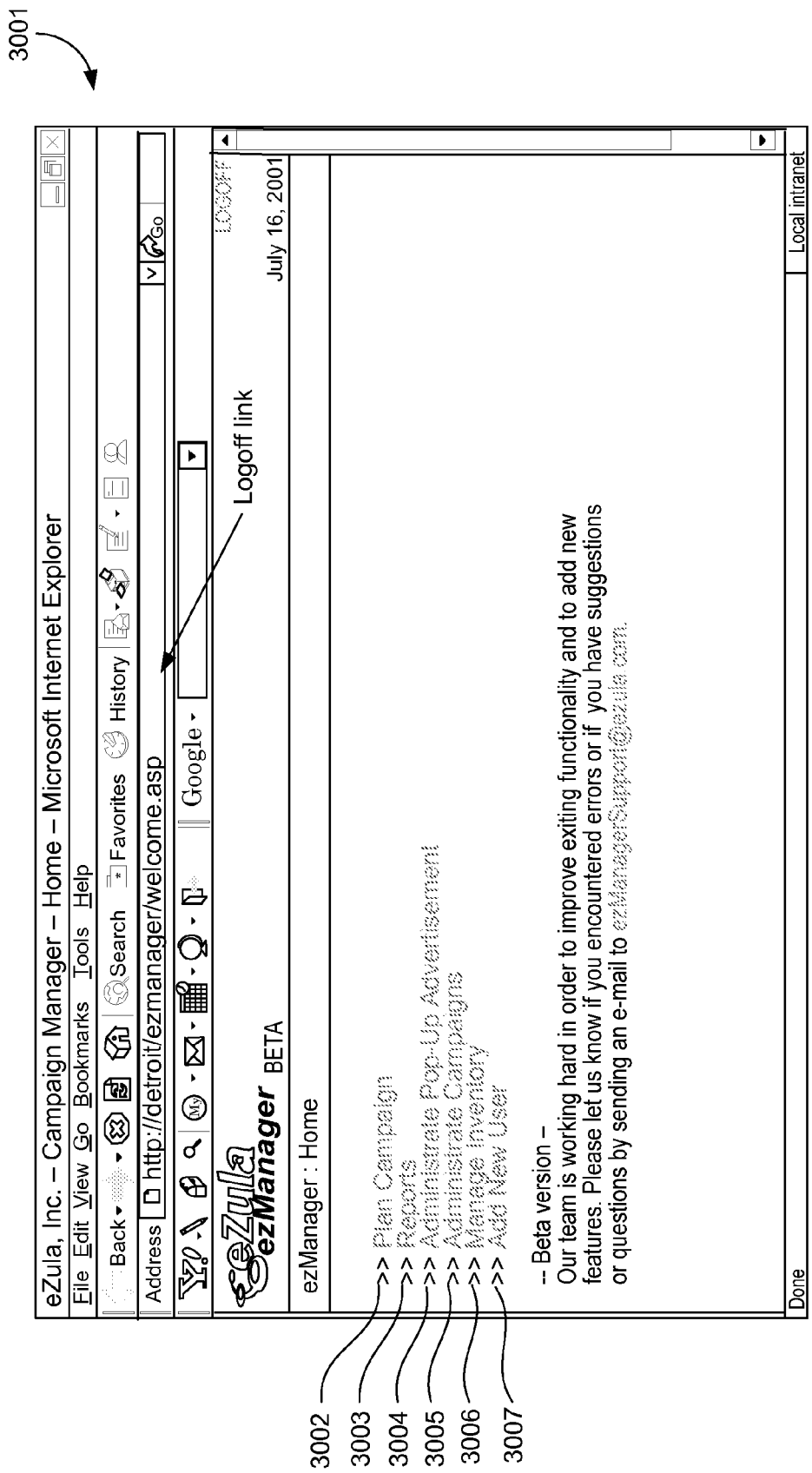
Figure 24C:
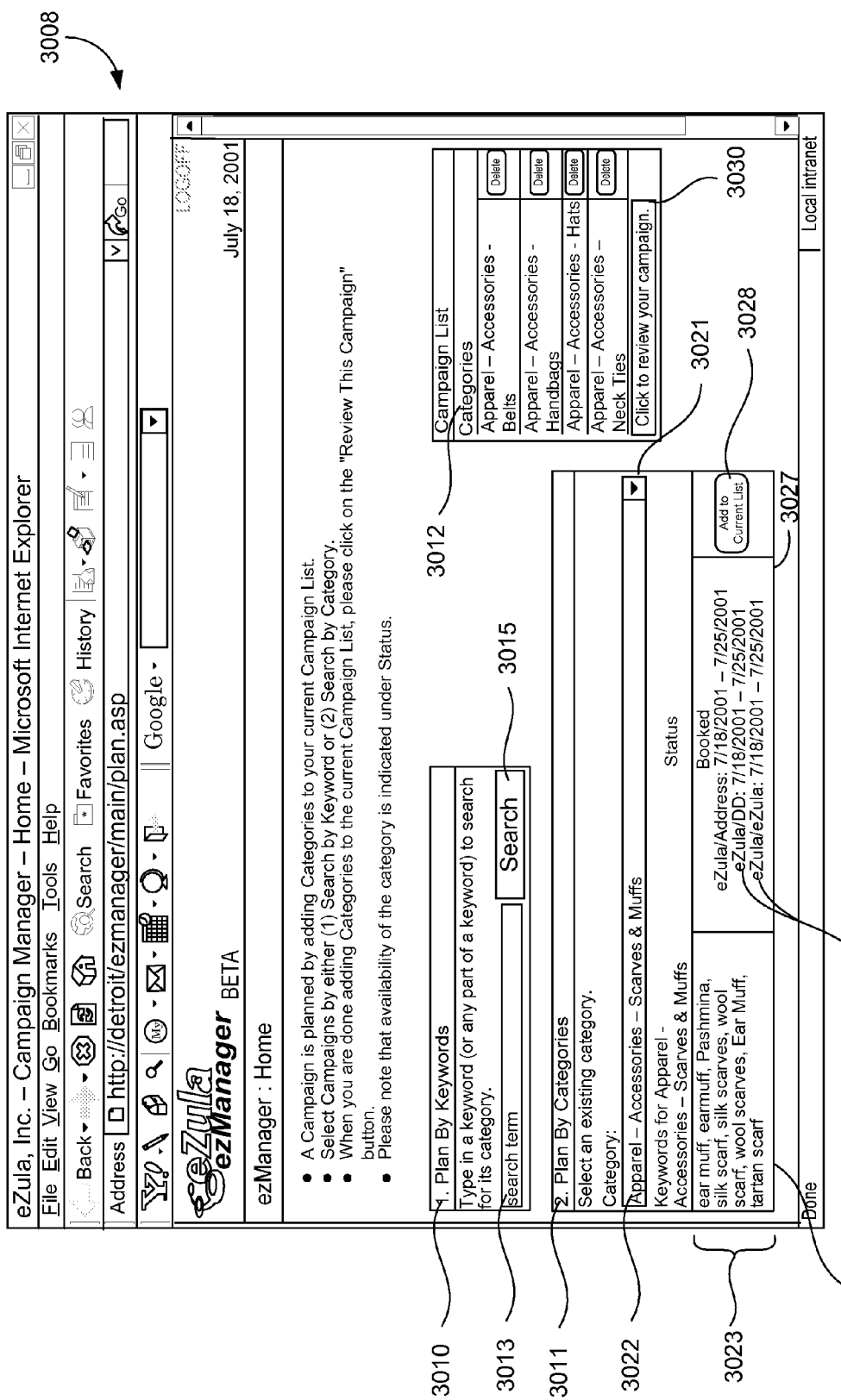
Figure 24D:
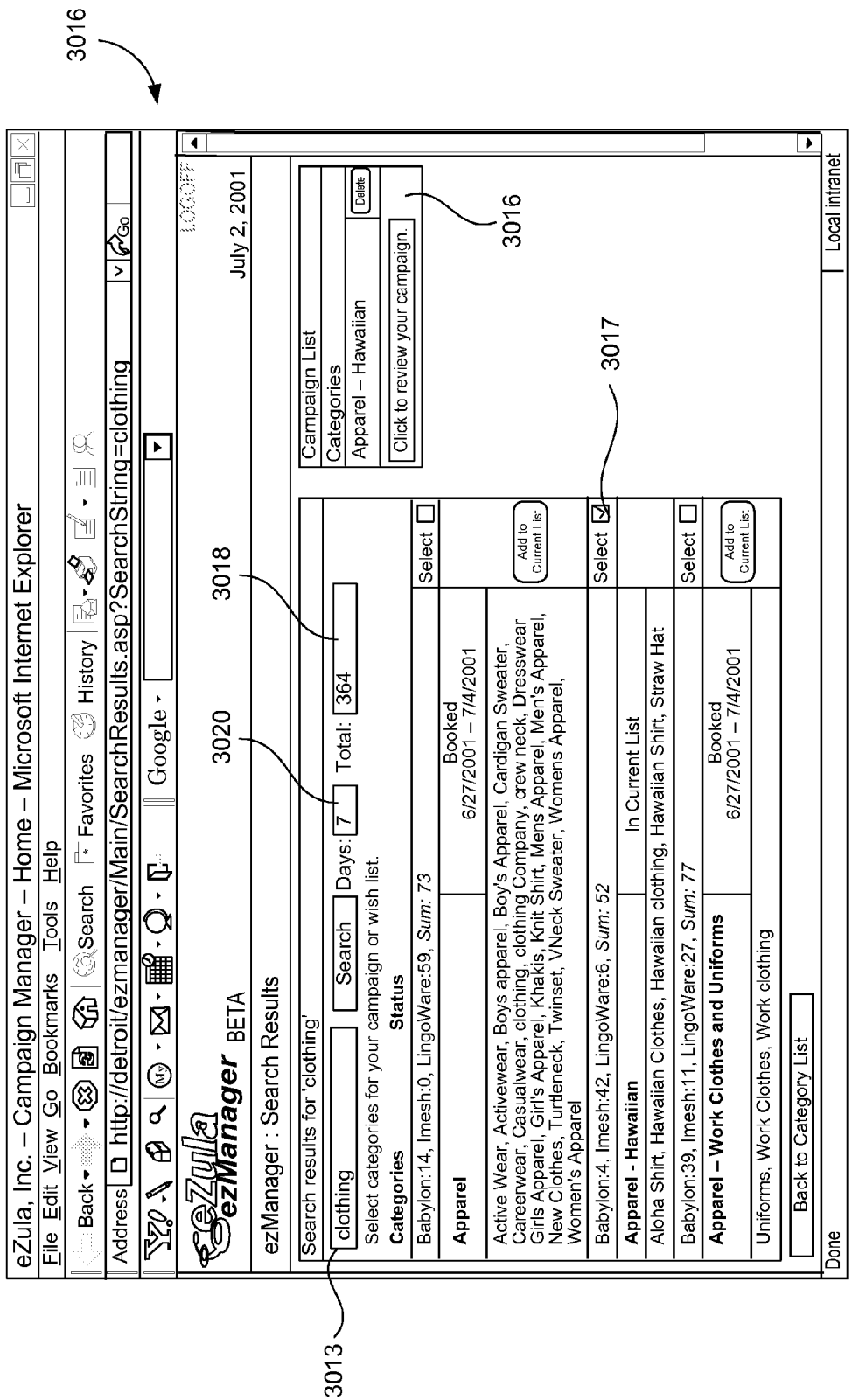
Figure 24E:
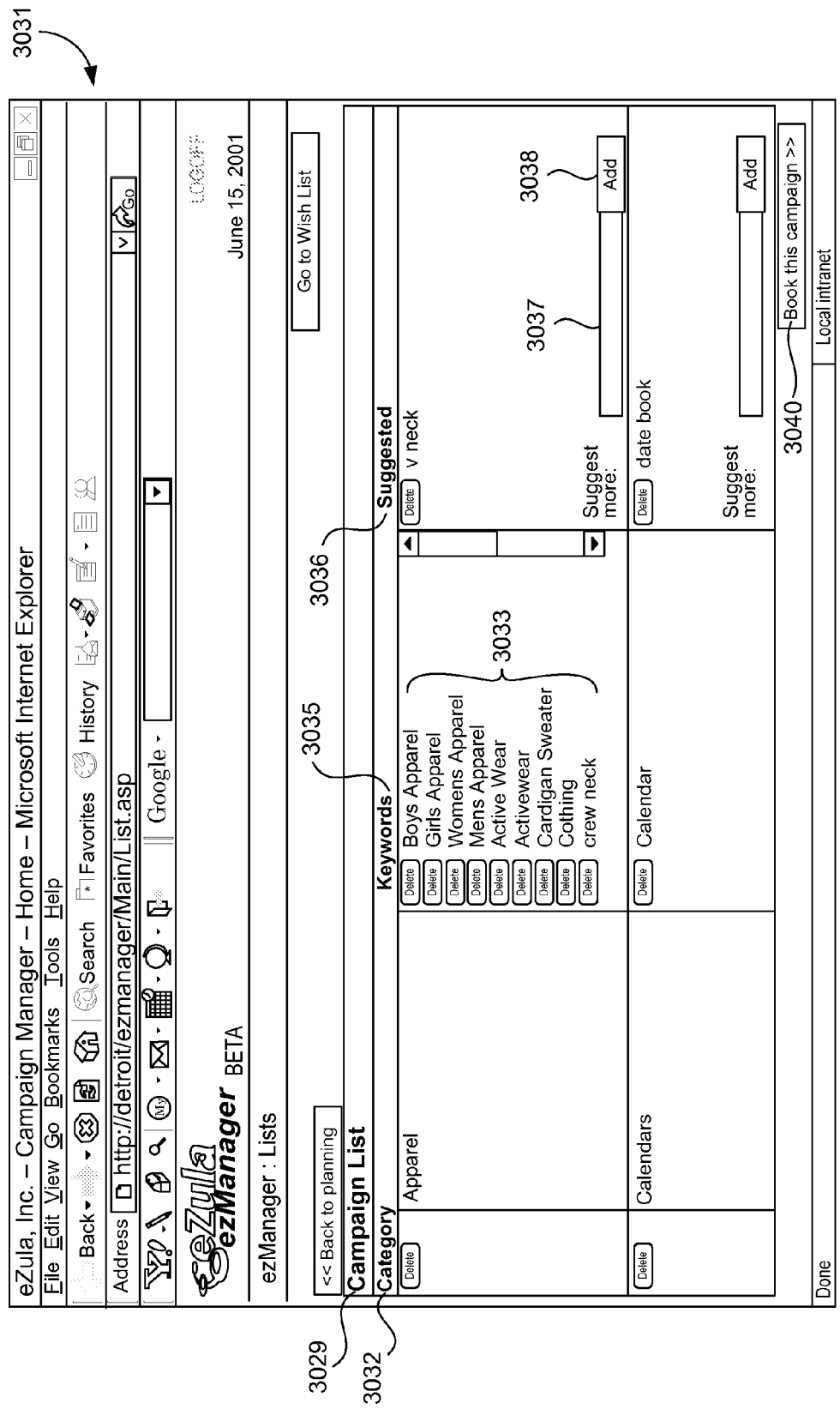
Figure 24F:
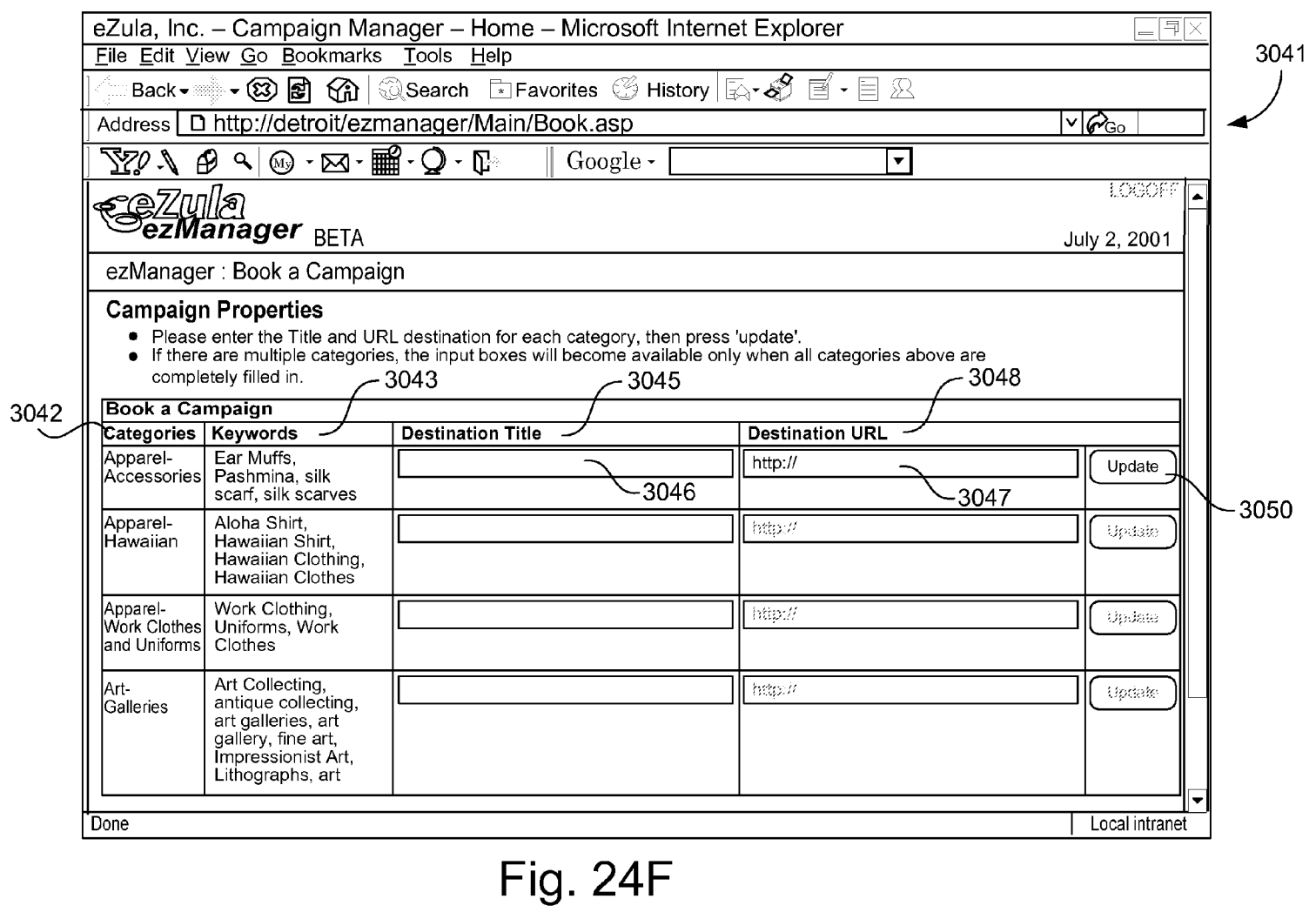

By way of example, to book a new campaign, the Sales Agent 105 initially selects the "Plan Campaign" button 3002 shown in the screen shot of FIG. 24B. The EZ Manager web application will then redirect the Sales Agent 105 to the main booking page 3008 shown in the screen shot of FIG. 24C.

This page contains a "Plan By Keywords" box 3010 which enables the Agent to plan an Ad Campaign through a keyword search, and a "Plan By Categories" box 3011 which enables the Agent to plan an Ad Campaign through a Category search. A "Campaign List" Box 3012 is also included which indicates the selected categories. In this example, the Super Category "Apparel" has been selected along with the Categories "Accessories" which contain the Sub Categories "Belts", "Handbags", "Hats" and "Neckties".

Initially, a campaign may be planned by a keyword (i.e., the "Plan By Keywords" box 3010) or planned by a Category (i.e., the "Plan By Categories" box 3011) to identify the keywords and/or categories that are associated to the keywords. To commence a keyword search, for instance, the selected keyword may be typed into the search box 3013 of the "Plan By Keywords" box 3010. Subsequently, the "Search" button 3015 will be selected to execute the search, and redirect the Sales Agent 105 to the Search Results page 3016 shown in the screen shot of FIG. 24D which will be described below.

A search of a keyword in search box 3013 yields both exact search term matches, and text string matches. For example, a search of the keyword "Clothing" in search box 3013 yields the Super Category "Apparel" containing the exact keyword "clothing" in the description. The Apparel Sub Categories "Hawaiian" and "Work Clothes and Uniforms", in this example, also yielded the keyword text strings "Hawaiian clothing" and "Work clothing", respectively. Exact keyword matches may be highlighted in one color (e.g., pink), while Text Strings matches may be highlighted in another color (e.g., yellow).

In one specific implementation, the participating Distributor/Publishers 108 are also listed with the predicted number of clicks per day per publisher for each of these categories. Should a selecting Sales Agent 105 click on one of the "Select" checkbox 3017, the estimated or predicted number of clicks of the Agent's selected categories will be calculated in the "Total" Box 3018 for the selected number of days in the "Days" box 3020. For instance, in a seven (7) day period, there is predicted to be about 384 clicks. An algorithm that predicts the number of clicks per publisher for each selected keyword in a selected Category will be discussed in detail below.

The "Campaign List" Box 3012 of the previous page is again provided in the Search Results page 3016 which contains any previously selected categories.

Figure 3:
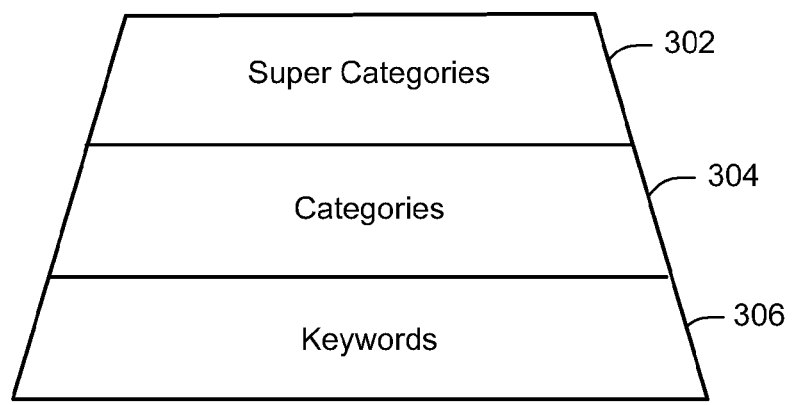
FIG. 3 is a schematic diagram of the context hierarchy in accordance with a specific embodiment of the present invention.

Briefly, the contextual inventory is organized and categorized into Super Categories 302, Sub-Categories 304, and Keywords 306, as shown in FIG. 3. In accordance with one specific embodiment, this organizational tree is applied to organize the Keywords and/or phrases under their appropriate product Categories. As will be apparent in the detailed description of the EZ Manager Component 202, this technique is necessary to facilitate searching of Keywords and/or phrases and the corresponding Contextual Categories 302 they are under. Further, this categorizations allows the Ad Campaign Provider to provide the Advertisers 102 with pre-configured keyword sets that apply to their business. Consequently, the Ad Campaigns can be activated more quickly. Another benefit of such term categorization is that the Ad Campaign Provider is better able to project and manage inventory, and to implement and service the Ad Campaign. By managing the delivery of the specific, sub-category keywords and the more general super-category keywords, the effectiveness of the Ad Campaign can be maximized by the Ad Campaign Provider.

In one implementation, the hierarchy of the Super-Category 302 is designed to provide Keywords that can apply to multiple Categories at a highest level and for very specific Keywords at a lower level. For example, a Credit Card company may be offered Keywords in the "Personal Finance" Super-Category, such as Keyword "credit", and then be offered Keywords in the Sub-Categories "Personal Finance—Credit Cards" and "Personal Finance—Credit Cards—Low Rate", such as the Keywords "credit card" and "low rate credit card", respectively. This is but one organizational example, and it will be appreciated that the such categorization be adjusted according to need.

The second campaign planning technique, according to one specific implementation is to search through the entire list of categories, to search for those keywords and/or categories which seem to best apply. These may be accessed by clicking on the window button 3021 which will list the available categories (not shown) of the "Plan By Categories" box 3011. Referring back to FIG. 24C, once a category has been selected such as "Apparel—Accessories—Scarves & Muffs" in the category box 3022 of the "Plan By Categories" box 3011, a list of keywords 3023 contained within that selected category is be displayed in the Keyword Box 3025). In this example, the keywords 3023"ear muff, earmuff, Pashimina, silk scarf . . . " are displayed. Adjacent the Keyword Box 3025 is a Status Box 3027 which indicates the current booking status of the category selected. As an example, this Apparel category for "Scarves and Muffs" is booked by the one or more publishers 108 indicated. At the right most end of the of the "Plan By Categories" Box 3011 is an "Add to the Current List" Button 3028 which, when executed, will add that category to the "Campaign List" Box 3012.

Referring back to FIG. 24C, when the Sales Agent 105 has finished adding categories, use the "Click to review your campaign" button 3030 may be executed which redirects the Sales Agent 105 to the category modification page 3031. This second page of the booking process, as best viewed in FIG. 24E, contains the list of categories the Agent has selected for the Advertiser's 102 campaign. This category modification page 3031 is essentially provided to enable modification of the associated keywords for the selected categories before campaign processing. In one specific embodiment, the Sales Agent 105 can decide whether to remove certain keywords from the selected categories, or suggest new keywords to be included in your campaign.

For example, in the Category "Apparel" listed in the "Category" Column 3032 of the "Campaign List" Box 3029, the Associated Keywords "Boys Apparel", "Girls Apparel"... and "Crew Neck" 3033 are listed in the "Keywords" Column 3035. Adjacent this column is a "Suggested" Keyword Column 3036, which, in this example, contains the suggested keyword "V Neck".

When keywords are added, in "Add" Box 3037, or removed, by the "Delete" Buttons 3038, only the campaign the selecting Agent 105 is currently booking will be affected. Once the modifications are completed or if no modifications are necessary, the "Book this Campaign" Button 3040 can be selected to continue on to the Campaign Properties page 3041 shown in FIG. 24F.

As shown in these specific implementations, the Campaign Properties page 3041 illustrates the selected categories in the "Categories" column 3042 together with the corresponding selected keywords in the "Keywords" column 3043. The next adjacent column (i.e., the "Destination Title" column 3045) will allow the selecting Sales Agent 105 to enter a title in the "Destination Title" Box 3046 and a URL in the "Destination URL" Box 3047 in the "Destination URL" column 3048 for the corresponding keywords and categories. This URL, of course, is the destination a client will be directed to when they click on the highlighted or marked-up keyword.

Figure 24G:
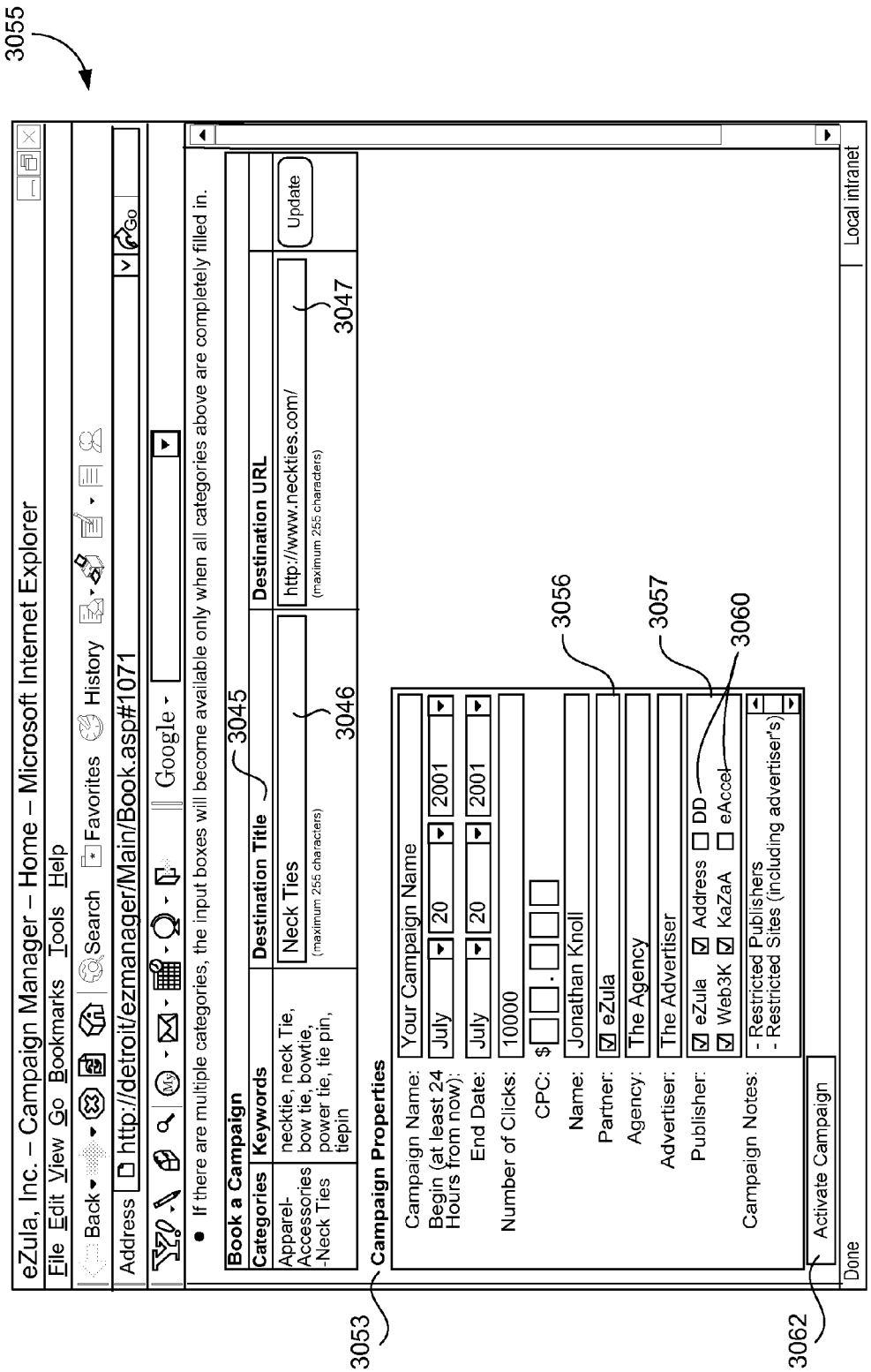

Upon entering the proper title and URL information, the selecting Sales Agent 105 can update the campaign for the selected category by executing the corresponding "update" Button 3050. The EZ Manager web application will then advance to the next set of fields for Title and URL information input. In one example, as shown in the screen shot of FIG. 24G, the title "Neck Ties" has been input in the "Destination Title" Box 3046 and the URL "www.neckties.com" in the "Destination URL" Box 3047. Upon updating all the listed set of fields, the "Campaign Properties" Box 3053 will become active as shown in FIG. 24G.

This detail page 3055 allows the selecting Sales Agent 105 to then configure and enter the finer details of the campaign properties such as the dates of the Campaign, the Number Of Clicks, the Cost Per Click, etc. In one specific embodiment, the Sales Agent 105 may be permitted to run the Ad Campaign for one or all of the Distributor/Publisher Partners 108 of the Ad Campaign Provider, and will have access to certain partners and their respective publishers. Upon selecting a Partner in the "Partner" Box 3056, all of their respective Publishers 108 which campaigns can be booked will be appear or be highlighted in the "Publisher" Box 3057 of the "Campaign Properties" Box 3053. In this example, for the Partner "eZula", their respective publishers include "eZula, Address, DD, Web3K, KaZaA the eAccel".

In the event that the selecting Sales Agent 105 does not desire to run the Ad Campaign on all of a Campaign Provider's Publishers, the Publisher's corresponding Selection Box 3060 can be "unchecked." In one example, should all the Partner's Publishers be un-checked in the "Publisher" Box 3057, the corresponding Selection Box 3061 of the "Partner" Box 3056 will become un-checked. Conversely, if one of a Campaign Provider's Publishers is highlighted or checked first in the Selection box 3060 of the "Publisher" Box 3057, the corresponding Selection box 3061 of the Partner in the "Partner" Box 3056 will automatically become highlighted or checked as well.

Once all the required fields have been properly filled, the selecting Sales Agent 105 may activate the Ad Campaign by executing the "Activate Campaign" Button 3062. The EZ Manager web application then redirects the Sales Agent to the Final Confirmation page 3063 shown in FIG. 24H. This is the Final Confirmation page 3063 before the Ad Campaign is booked. If the "OK" button 3065 is executed, the Ad Campaign will be booked, and pressing the "back" button will not allow you to make changes to the campaign. To modify the Ad Campaign, the user would now have to go back to the "Main Menu" of FIG. 24B, and select the "Administrate Campaigns" option.

Figure 24H:
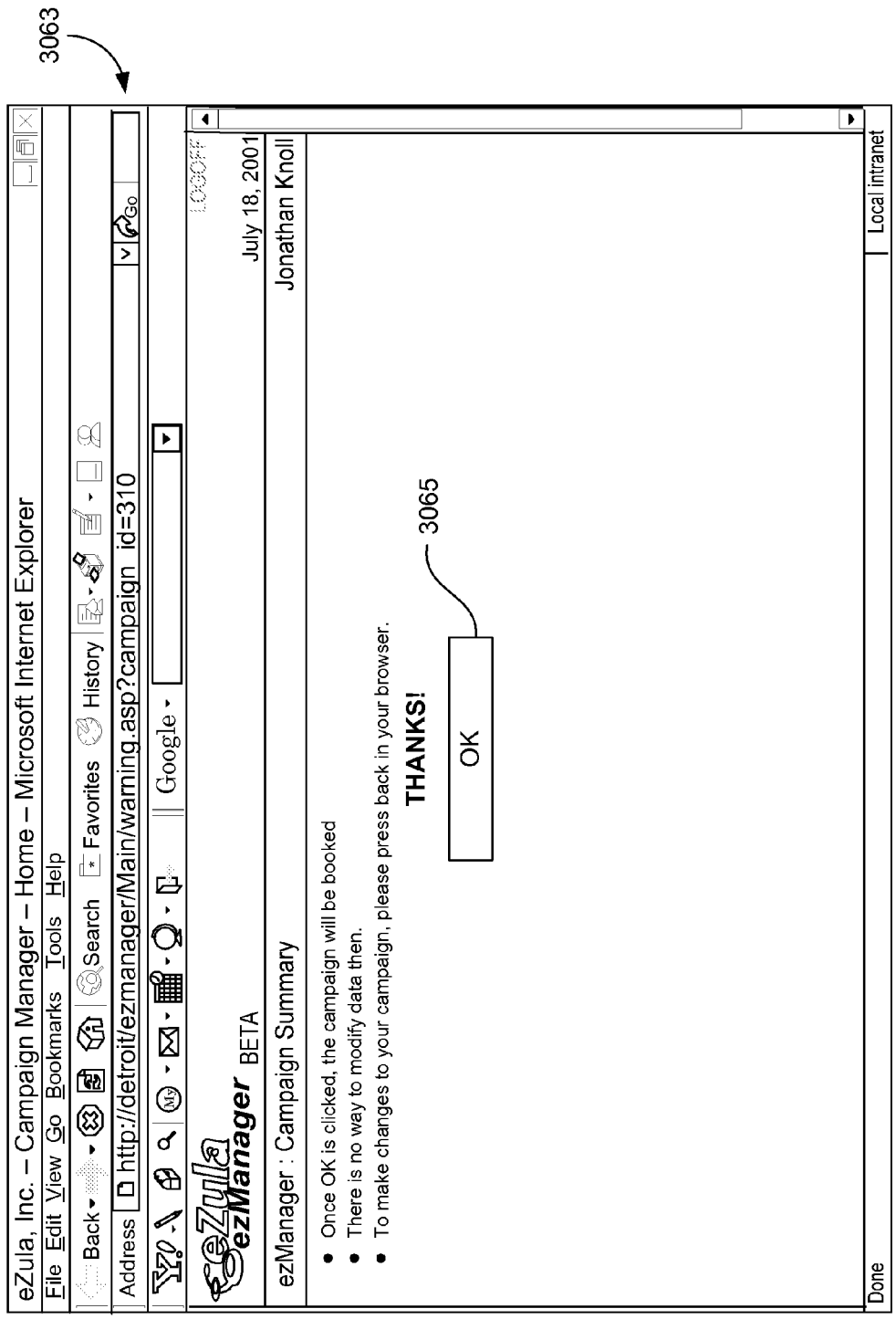

Referring now to the screen shot of FIG. 24I, after the "OK" Button 3065 in Final Confirmation page 3063 of FIG. 24H is presented, a summary of the campaign is generated in the "Campaign Summary" page 3066. This page provides the selecting Sales Agent 105 with a complete summary of the campaign they just booked or modified for the Advertiser 102. In the "Category Information" Box 3067, the keywords corresponding to the selected Category may be viewed by selecting the "View Keywords" Button 3068.

While a campaign may have already been running for another publisher for this entire category, the category may be booked again if: the dates of the campaign the selecting Sales Agent 105 is booking does not conflict with previously booked dates, or the Distributors/Publishers 108 the selecting Sales Agent 105 plans to book a campaign for are not already booked for the dates of the campaign.

Accordingly, the available dates are one of the key factors in selecting a campaign so as not to conflict with the dates of other active campaigns. In the event of a conflict of selected dates with selected publisher(s) in the selected category, the EZ Manager web application will inform (and prevent) the selecting Sales Agent 105 from booking categories for publishers where conflicts do exist.

Figure 24J:
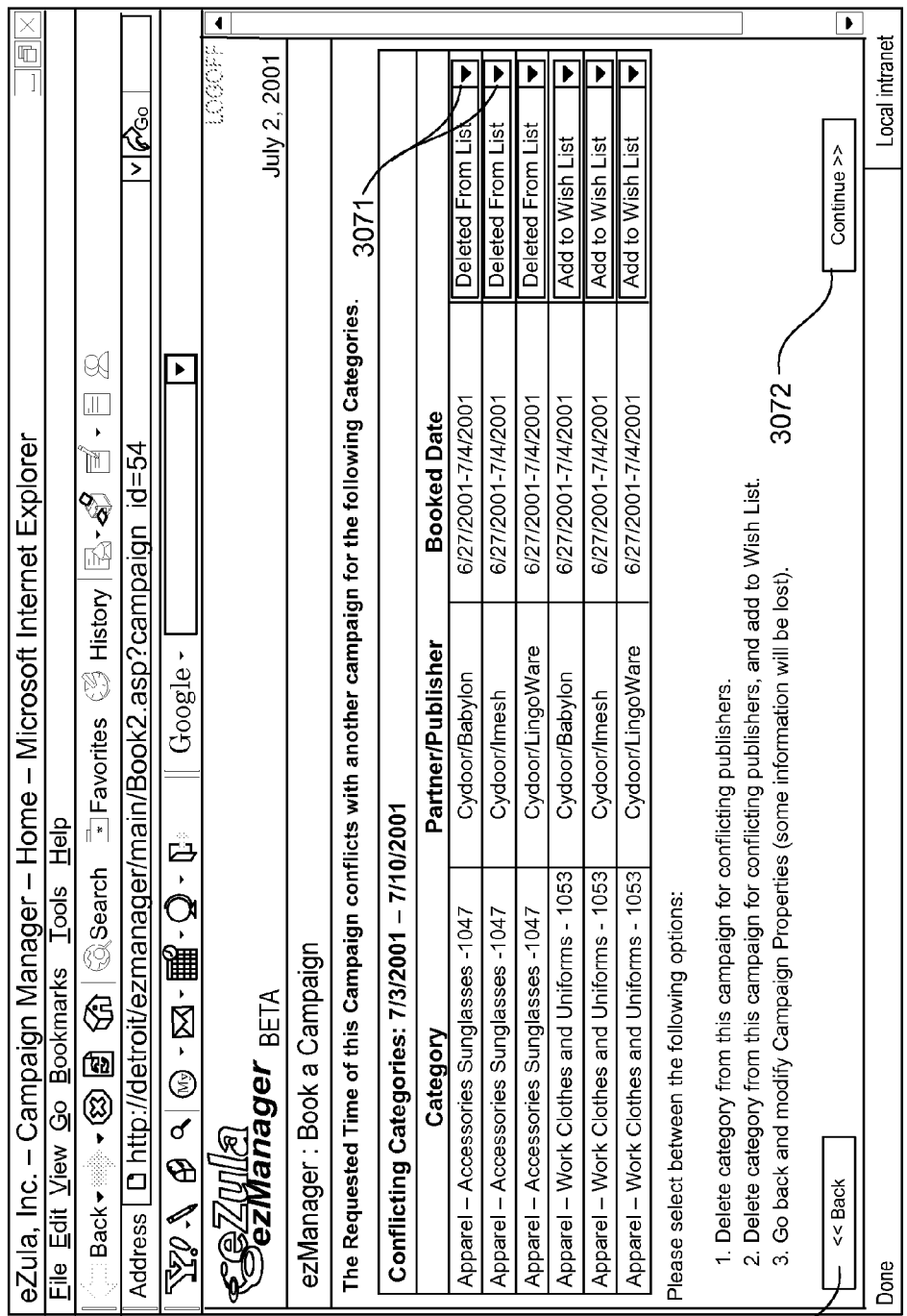

In the example of FIG. 24J, for the Super Category "Apparel" and the Sub-Categories "Accessories Sunglasses" and "Work Clothes and Uniforms", a conflict with the selected Partner Publishers is listed for the selected dates. The list of conflicts can be ordered by category, and describing which publishers are creating conflicts. In one specific implementation, the selecting Sales Agent 105 has the option to: use the Back Button 3070 to return to the previous menus and change the dates of the campaign; or select one or more of the "Delete From List" buttons 3071 to remove the conflicting category or categories from the campaign. Once the "Delete From List" buttons 3071 have been selected, the selecting Sales Agent 105 selects the "Continue" Button 3072 to only remove the categories from the campaign for the conflicting publishers only. In the event that the selected category conflicts with all publishers, the entire category will be removed from the campaign completely.

Figure 24K:
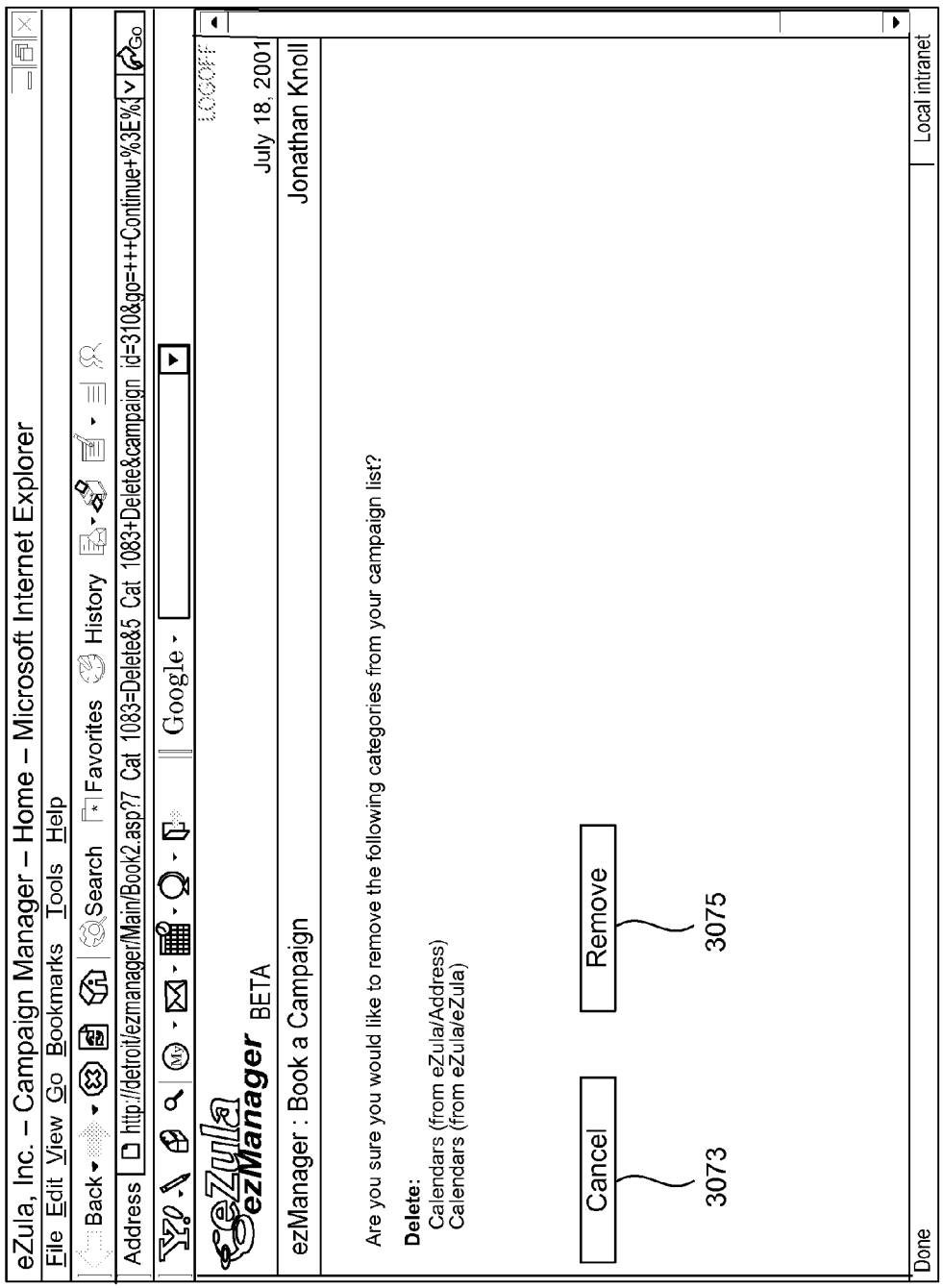

This selection then redirects the selecting Sales Agent 105 to the screen shot of FIG. 24K. The Agent is then queried whether to select the "Cancel" button 3073 which will return them back to the previous menu, or to select the "Remove" Button 3075 which will redirect the Agent to the Final Confirmation page 3063 of FIG. 24H.

As indicated above, one important tool a Sales Agent 105 and/or Advertising Broker 108 is the click prediction algorithms which are applied to predict the number of clicks an Advertiser 102 can expect per day in the category from a respective Distributor/Publisher 108. This resource enables an Advertiser 108 to better assess the value of their Ad Campaign is a selected Category, and for a selected Distributor/Publisher partner 108.

These click prediction algorithms essentially attempt to normalize the predicted (or current) daily number of clicks, for a category, per a publisher based upon the measured historical data for the daily number of clicks, for that category, and for per publisher. Accordingly, as the historical data increases over time, the click prediction algorithms will deviate less and less, and thus become more accurate.

As set forth below, in general, the Predicted Daily Clicks (PDC) for an Entire Ad Campaign of an Advertiser would be the summation of the predicted number of clicks per category from each selected Distributor/Publisher 108. In other words, the PDC is the summation of the summation of the predicted number of clicks per category of the selected Distributor/Publisher 108, or $$PDC = \sum_{pubj}\sum_{Cat_i} Predict(Cat_{ij})$$

where Predict($Cat_{ij}$)=the Daily Predicted Number of Clicks per Category per publisher.

In one specific embodiment, this click prediction applies a normalization algorithm to normalize the predicted daily number of clicks, for a category, per a publisher based upon the measured historical data for the same. It has been found that the actual measured use in part depends on a number of variables which are factored into the algorithm. For example, it has been observed that new Users have a greater tendency to use the Client Application than Users whom have had the Client Application installed in their system for some time. This greater use has been measured consistently between about 10% to about 100% more, and more particularly about 25% more. To factor this variance into the predicted daily number of clicks, for a category, per a publisher, the follow normalization algorithm has been developed as follows:

$$Predict(Cat_{ij}) = HC_d(Cat_{ij}) \cdot \frac{(k-1)U^{new}_{present} + U_{present}}{(k-1)U^{new}_{past} + U_{past}}$$

where $HC_d(Cat_{ij})$=the Normalized Historical Data for the Highest Click number measured per Category, per Publisher;
k=the New User Factor;
$U_{present}$=the current day total number of Users having the Client Application for the particular Publisher;
$U_{past}$=the past total number of Users having the Client Application for the particular Publisher the day of the $HC_d(Cat_{ij})$ calculation;
$U_{(new/present)}$=the current new number of Users for the particular Publisher out of $U_{present}$; and
$U_{(new/past)}$=the past new number of Users for the particular Publisher out of $U_{past}$.

Accordingly, the Predict($Cat_{ij}$) algorithm accounts for current day use by normalizing the data against the historical data for use.

As mentioned above, $HC_d(Cat_{ij})$ is the normalized historical data on the daily number of clicks per category that have been measured (by the EZ Gateway Complex 210 as will be discussed) for a particular publisher. This formula, in one specific implementation, centers around a three to five day period surrounding the day in which the Maximum measured number of clicks, (Max(clicks$_d(Cat_{ij})$)), were measured in the selected category for that Publisher 108. By way of example, $$HC_d(Cat_{ij}) = \frac{1}{2}\text{Max}(clicks_d(Cat_{ij})) + \frac{1}{2}\left(\frac{\text{Max}_{-1} + \text{Max}_{+1}}{2}\right)$$

when both $$\text{Max}_{-1}, \text{Max}_{+1} > \frac{1}{2}\text{Max}$$

where Max(clicks$_d$(Cat$_{ij}$))=the Maximum measured number of clicks in the selected category for that Publisher;
clicks$_d$=the Raw Historical Data;
Max$_{-1}$=the Maximum measured number of clicks in the selected category for that Publisher the day before Max was measured; and
Max$_{+1}$=the Maximum measured number of clicks in the selected category for that Publisher the day after Max was measured.

This equation essentially sums one-half of the Max click data and one-half of the average of the Max$_{-1}$ and the Max$_{+1}$ click data.

If either Max$_{-1}$ or Max$_{+1}$ is not greater than ½Max, and both $$\text{Max}_{-2}, \text{Max}_{+2} > \frac{1}{2}\text{Max}$$

where Max$_{-2}$=the Maximum measured number of clicks in the selected category for that Publisher two days before Max was measured;
Max$_{+2}$=the Maximum measured number of clicks in the selected category for that Publisher two day after Max was measured,
then $$HC_d(Cat_{ij}) = \frac{1}{2}\text{Max}(clicks_d(Cat_{ij})) + \frac{1}{2}\left(\frac{\text{Max}_{-2} + \text{Max}_{+2}}{2}\right)$$

If either Max$_{-1}$ or Max$_{+1}$, or Max$_{-2}$ or Max$_{+2}$ is not greater than ½Max, but at least one of Max$_{-1}$, Max$_{+1}$, Max$_{-2}$ or Max$_{+2}$, is greater than ½Max, then either:

$$HC_d(Cat_{ij}) = \frac{1}{2}\text{Max}(clicks_d(Cat_{ij})) + \frac{1}{2}\left(\frac{\text{Max}_{\pm 1/2} + \text{Max}_{\pm 2/1}}{2}\right)$$

else, $$HC_d(Cat_{ij}) = \frac{1}{2}\text{Max}(clicks_d(Cat_{ij})) + \frac{1}{2}\left(\frac{\text{Max}_x + \text{Max}_x}{2}\right)$$

where x=1, −1, 2 or −2 days.

When none of Max$_{-1}$, Max$_{+1}$, Max$_{-2}$ or Max$_{+2}$ is greater than ½Max, then $HC_d(Cat_{ij})$=Max.

In the situation where no historical data is present in a selected category for a selected Publisher, the data from another publisher can be applied to predict the number of clicks, and then normalized to the number of Users for the original selected Publisher.

These calculations can be performed daily for current updates. As previously indicated, The Client Application logs the data where a Client has been, and when they click on the marked-text. This logged data is then directed to the EZ Admin Component 208 of the Server System 200 for data processing. Thus, for every category the predicted daily clicks number per publisher can be calculated in a batch program nightly.

By way of example, in one selected category for one Publisher, suppose $\text{Max}(\text{clicks}_d(\text{Cat}_{ij}))=40$ clicks; $\text{Max}_{-1}=21$ clicks and $\text{Max}_{+1}=25$ clicks, using:

$$HC_d(Cat_{ij}) = \frac{1}{2}\text{Max}(clicks_d(Cat_{ij})) + \frac{1}{2}\left(\frac{\text{Max}_{-1} + \text{Max}_{+1}}{2}\right)$$

then $HC_d(Cat_{ij})=31.5$. Furthermore, suppose for this Publisher: Upresent=200 Users; Upast=150 Users; U(new/present)=15 New Users; and U(new/past)=5 new Users. Applying a new use factor of 0.25 (i.e., 25%), in the above-mentioned algorithm:

$$Predict(Cat_{ij}) = HC_d(Cat_{ij}) \cdot \frac{(k-1)U_{present}^{new} + U_{present}}{(k-1)U_{past}^{new} + U_{past}}$$

then $Predict(Cat_{ij})$ is predicted to be 40.65 clicks per day for one selected category for one Publisher.

In accordance with another specific embodiment, two other sets of adjustments to the Predicted Click Number Predict($Cat_{ij}$) are desirable to farther refine the click prediction. The first set of adjustments are "Batch Adjustments" which essentially are applied to adjust the Predict($Cat_{ij}$), and the second set of adjustments are "Runtime Adjustments" which are applied to adjust the total number of click in a campaign based on the user selection in runtime.

The two "Batch Adjustments, by way of example, include a "Last Used" Factor (L) and a Seasonal Factor (S). Regarding the "Last Used" Factor (L), it has been observed that repeat Users whom have already viewed or seen the highlighted Keywords will generally not "click-on" the Keyword again. As the Users "tire" from viewing the highlighted Keywords again, the Predict($Cat_{ij}$) needs to be factored down to compensate. For example, if a category had been used less then 14 days ago, the "Last Used" Factor (L) to be multiplied to the Predict($Cat_{ij}$) is 0.9. In contrast, if the category had been used between 14 and 28 days ago, L is designated a factor of 0.95. Otherwise no factor may be used.

Turning now to the Table of FIG. 23, an example of Seasonal Factors (S) are illustrated for each month for a plurality of Categories. Again, using historical data, seasonal variations have been observed depending upon the Category. For example, the Automotive Category, it has been observed that the interest in this sector tends to increase in the summer months, have a factor of over 1, and tends to decrease in the winter months, having a factor of under 1. Using the table to find the historical factor ($S_{past}$) and the current factor ($S_{present}$), the value Predict($Cat_{ij}$) can be multiplied by the ratio $S_{present}/S_{past}$ to determine the Seasonal Factor (S). Accordingly, depending upon the season of the campaign, this factor compensates for the seasonality.

The "Runtime Adjustments", as mentioned above, are adjustments made based on the length of the Ad Campaign and categories selected. One runtime adjustment is a "Category Competition Adjustment Factor (C)" which is applied to adjust when there is Keyword or Category competition within a Category or Super Category. When Keyword belong to the same Category, or when Categories belong to the same Super Category, it is observed that these Keywords and Categories compete with one another for clicks. Hence, when there are common Keywords in the same Category, for instance, the predicted click performance might be less the predicted. Again, using the historical factor ($C_{past}$) and the current factor ($C_{present}$), the value Predict($Cat_{ij}$) can be multiplied by the ratio $C_{present}/C_{past}$ to determine the a Category Competition Adjustment Factor (C).

Another "Runtime Adjustment", is applied when the Total Number of Clicks ($T_C$) are predicted from the entire length of an Ad Campaign in a selected Category for a selected Publisher. Depending upon the length of the campaign, there are generally considered two forces which oppose one another, based upon length of the campaign: the "Diminishing reaction" force and the "Rapid Growth in User Base" force. Regarding the latter force, in longer Ad Campaigns, more clicks are generally observed at the beginning period of an Ad Campaign and then the amount of clicks per day diminishes progressively. Thus, the "Diminishing reaction" force takes this into account.

Briefly, the "beginning period" of an Ad Campaign is considered about 10 days of the campaign run length This period may vary of course.

In the opposing "Rapid Growth in User Base" force however, the growth rate of the User Base of the Client Application is taken into account as well.

Accordingly, based on the duration of the Ad Campaign, the Total Predicted Number of Clicks in the selected Category for the selected Publisher, for the duration of an entire Ad campaign is adjusted as follows:

$$T_C=(D_C(\text{Predict}(Cat_{ij})),$$

when $D_C<10$, where $D_C$ is equal to the duration of the Ad Campaign in Days, and Predict($Cat_{ij}$), of course, is the predicted number of clicks in a selected Category for a selected Publisher with the above-mentioned factors and adjustments taken into account.

When $D_C>=10$, then $T_C$ will be determined by the following equation:

$$T_C=10(\text{Predict}(Cat_{ij}))+\text{Predict}(Cat_{ij})(D_C-10)(1-\frac{1}{2}k(D_C-10)),$$

where k=a Daily Click Reduction Factor.

In one embodiment, k=about −½% which essentially means that the "Growth of the User Base" force, at this time, has a greater significance than "Diminishing Reaction" force. As the growth of the Client Application matures in time and use, k=about 1%.

The above-mentioned Factors and Adjustments are just some of the considerations that can be taken into account when predicting the number of clicks for an Ad Campaign. It will be appreciated that many other factors and adjustments can be added, subtracted and/or mixed and matched depending upon the circumstances. Moreover, as the historical data for each Super Category, Category, Keyword and/or Factors and Adjustments are recorded and developed, the click predictions will become more refined and accurate.

EZ Gateway Application

Referring back to FIG. 2, the Gateway Complex 210 includes the EZ Gateway component 204 that is an extranet system provided for Administrators of the Ad Campaign Provider, and/or for specific Publishers which allows them to manage that flows to the Client Applications. This interface Application provides access to all the current Ad Campaigns, and enables the Administrator to: add or delete Publishers from an Ad Campaign; manage the data of an Ad Campaign; and set of change the basic rules and restriction for an Ad Campaign, Publishers, Categories, and Keywords (Display Strings) for the campaign.

Upon logging into the EZ Gateway Application, the Administrator is directed to the Main Page 4000, shown in FIG. 25A, which opens by default. In the "Campaign" column 4001, all the active and inactive Ad Campaigns are listed in order of date in which the campaign was created. A "Status" column 4002 is provided which indicates the current Status of the Ad Campaign. Briefly, "Locked" Status Indicator indicates that the campaign is locked to receive any new information at this time and this will be the case until the data and information that was already added will be processed. "Editable & Uploadable" indicates that the campaign is open to any type of management activity. The Status Indicator "Commit Pending" and "Commit Pending II" indicate that the campaign has some changes and new data/information and that these changes are now pending processing on the server.

A "Last Modified" column 4003 indicates the date and time of the last modification to the corresponding Ad Campaign, while a "Initial Upload" column 4005 indicates the date the corresponding Ad Campaign commenced, along with the processing time which is the time that the new campaign was processed and the data went to the CDN server for the client application to update with. This is the official time that the campaign has begun. Finally, an "Active Publisher" column 4006 indicates all the active Publishers 108 that are currently running the corresponding Ad Campaign.

Figure 25B:
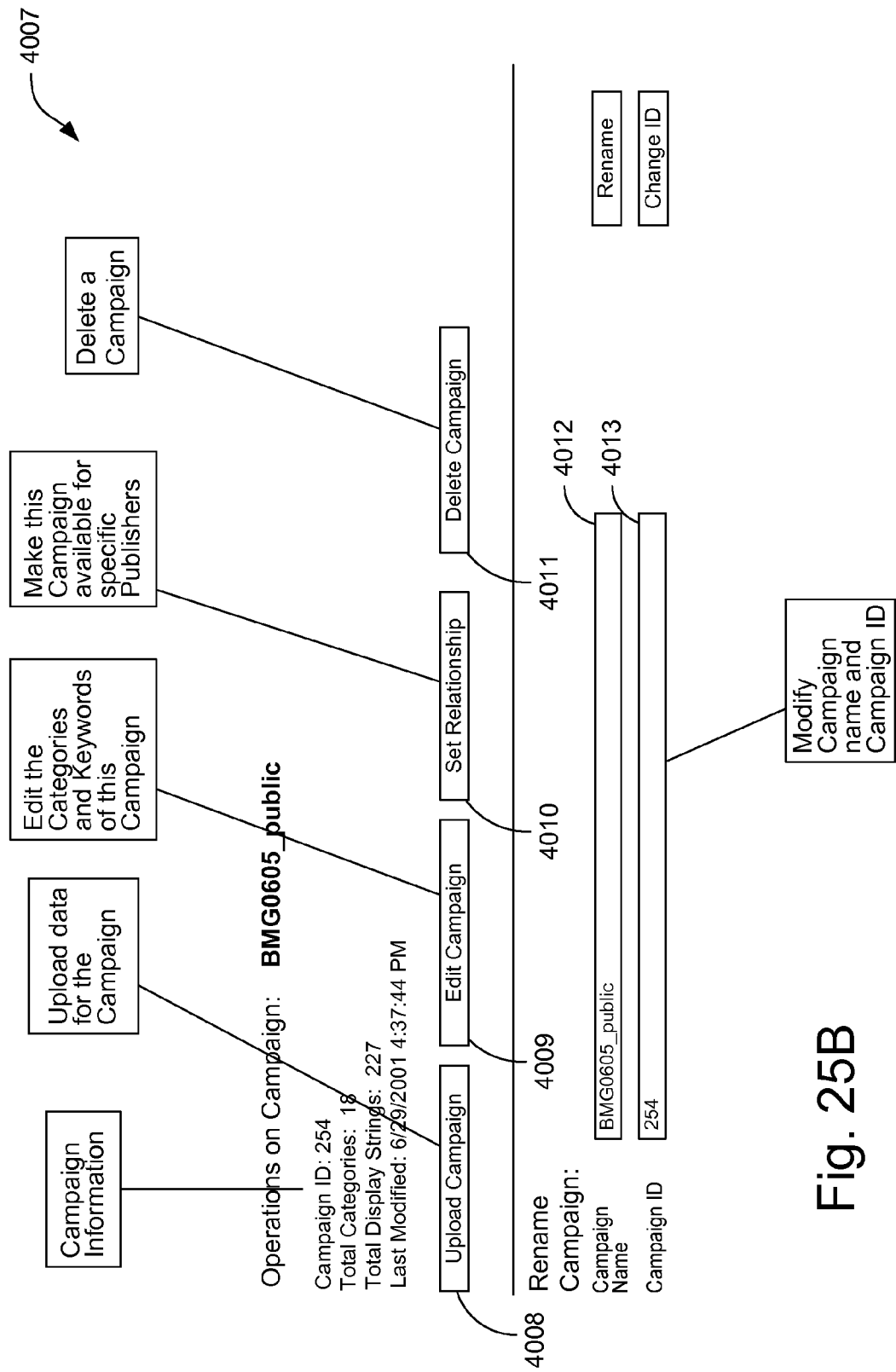

Upon selecting an Ad Campaign in the "Campaign" column 4001 of the Main Page 4000, the EZ Gateway Application will direct the Administrator to the "Campaign Properties" page 4007 of FIG. 25B. Four Main Function Buttons are provided in this page 4007: an "Update Campaign" Button 4008; an "Edit Campaign" Button 4009; a "Set Relationship" Button 4010; and a "Delete Campaign" Button 4011. These function buttons are self explanatory, and will be described in greater detail below as well.

Below the Main Function Buttons 4008-4011 are two text field boxes 4012, 4013 which allow the Administrator to change the Campaign Name (e.g., BMG0605_public) and the Campaign ID (e.g., 254). The Campaign ID is assigned to an Ad Campaign to distinguish this campaign from all other campaigns.

When an Administrator edits an existing Ad Campaign, the "Edit Campaign" Button 4009 is selected which directs the EZ Gateway Application to the "Edit Campaign" page 4015 of FIG. 25C. This page 4015 allows that Administrator to scroll through the Super Categories and Sub-Categories for the selected Ad Campaign (BMG0605_public in this example). In the "Edit Category" column 4016, a corresponding Category may be selected which enables the Administrator to manage the properties of the selected Category. Similarly, the "Edit Keywords" column 4017, corresponding to the respective Category, allows the Administrator to manage the keywords and their properties per category.

Figure 25D:
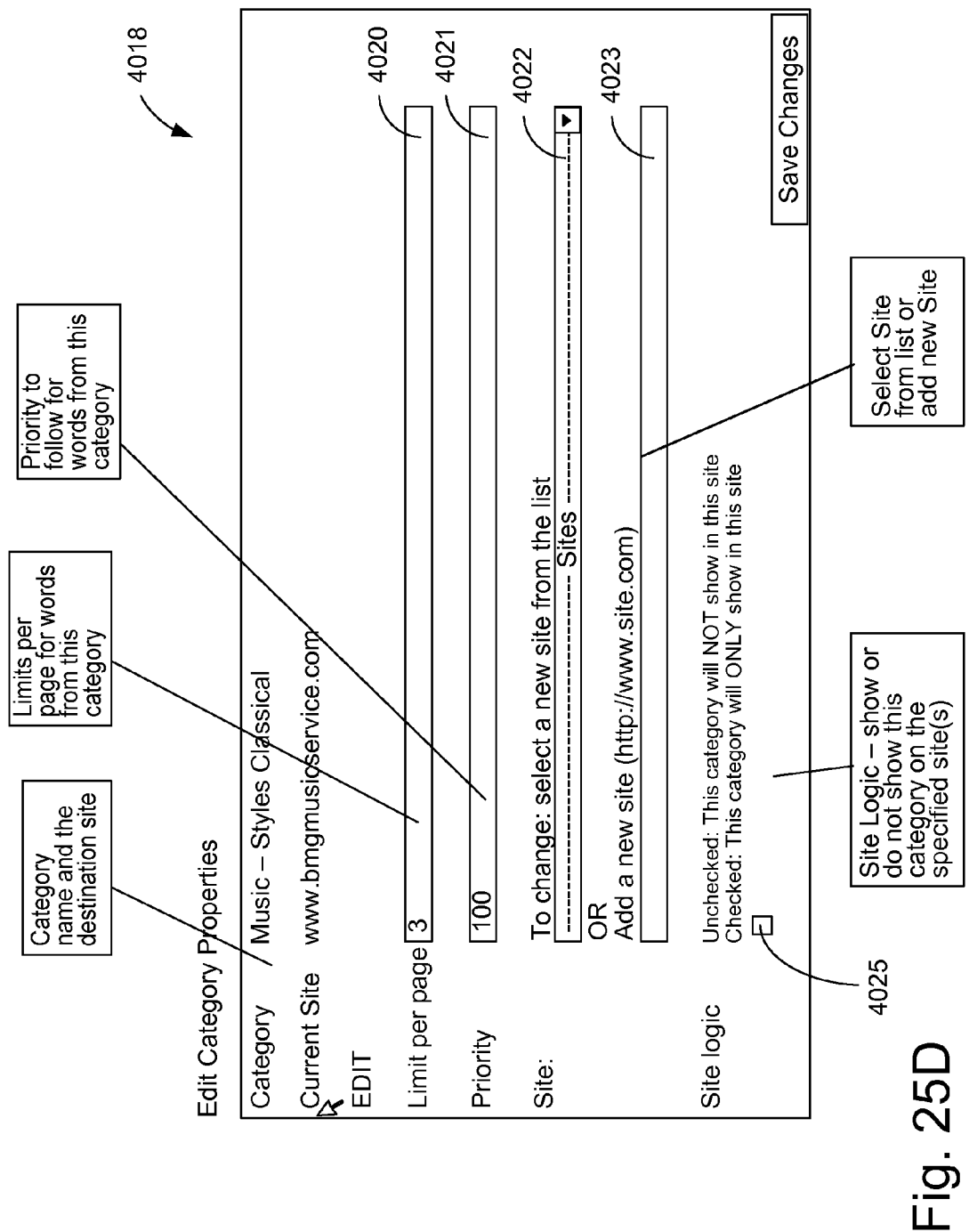

Clicking on one of the Categories in the "Edit Category" column 4016 of the Edit Campaign" page 4015 directs the EZ Gateway Application to the "Category Properties" page 4018 of FIG. 25D. As mentioned, this screen page enables the Administrator to manage the properties of each category of an Ad Campaign. In a "Limit Per Page" box 4020, an Administrator can limit the number times that Keywords (the same or different) are highlighted in this particular Category per page. Thus, in this example, should one web page contain thirteen (13) occurrences of the same and/or different Keywords from a single Category, only the first three (3) occurrences of the Keywords from that Category will be highlighted. This Keyword occurrence limit is implemented so that not too many of the same Category Keywords will be highlighted which in effect would diminish their effectiveness. These three (3) highlighted occurrences can also be spread apart, such as a the beginning, the middle and the end of the page.

The highlighting priority of the Keywords from this Category may be managed from the "Priority" box 4021. Briefly, as explained in greater detail above, setting the priority of the Keywords in the corresponding Category, potential highlighted Keywords on a web page can be sorted in the order of the priority. Those Keywords in the Category with the higher priority (100 being the highest and 1 being the lowest) will be highlighted first. The priority, in part may be determined by the Cost Per Click of the keyword.

Another use for the priority, which again will be explain in detail below, is to designate the cycle type or Context markup Mode of the Category. For example, if the priority is set to 1, then this Category will be part of the highlights in cycle type "MARKUP ALL1" only, and not in cycle type "MARKUP HIGH PRIORITY". In contrast, if the priority is set to 100, then the Category will be part of the highlights in any case, as described in detail above.

In the "Select a New Site" box 4022 or the "Add a New Site" box 4023 of the "Category Properties" page 4018, positive or negative restrictions for selected web pages can be set for the selected Categories. This interface enables the Administrator to customize the specific Keywords contained in the corresponding Category to only highlight in one or more listed web pages, or in the alternative, to not be highlighted in a the selected Category. For example, by checking the "Site Logic" box 4025, the Keywords from the "Music—Styles Classical" Category will not be highlighted when the Client is at the selected web page, while Unchecking the box 4025 is applied when these Keywords are designated to ONLY highlight when the Client is at the listed web pages.

Figure 25E:
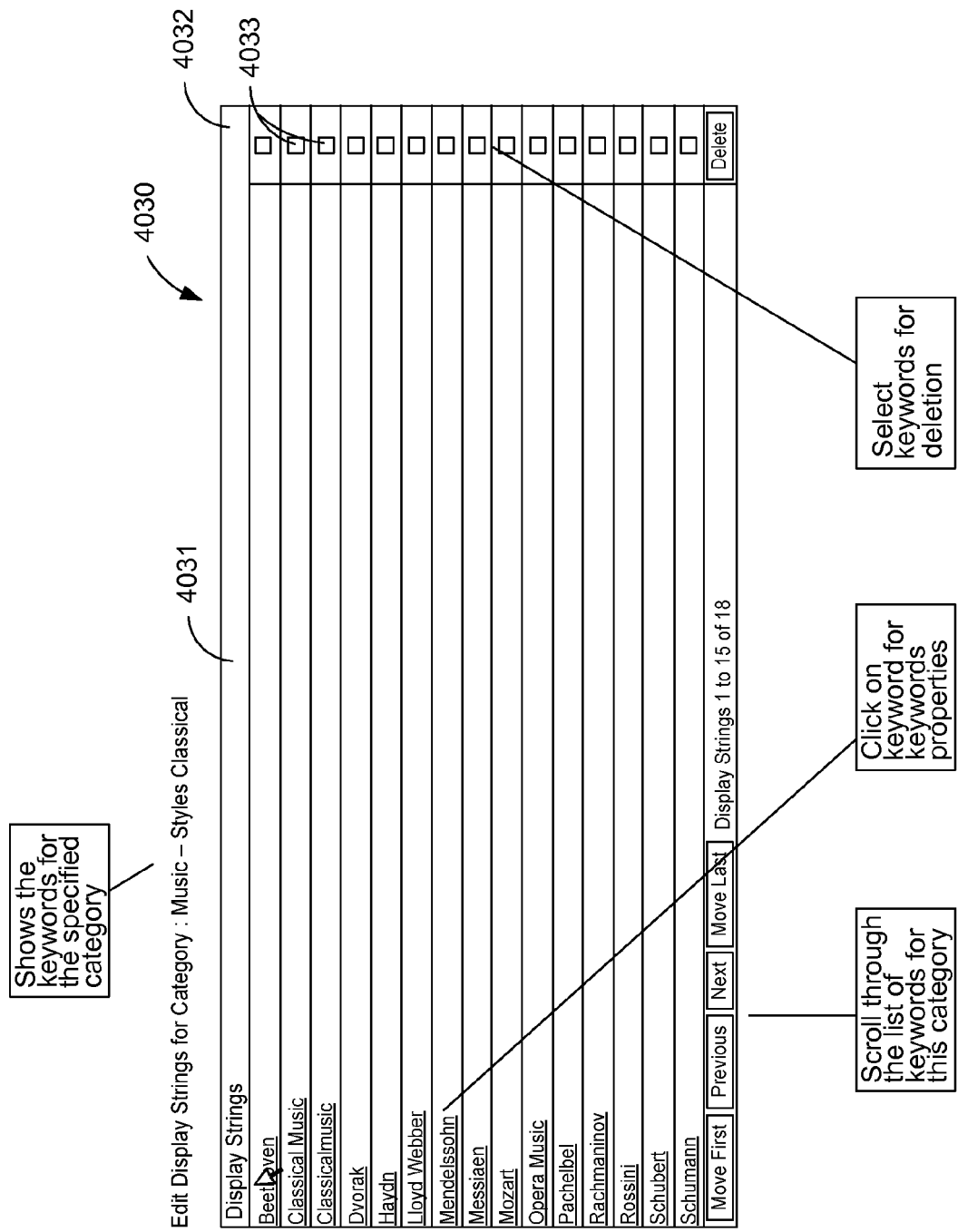

Referring back to the Edit Campaign" page 4015 of FIG. 25C, clicking on one of the Keywords or Display Strings in the "Keywords Category" column 4017 directs the Administrator to the "Display Strings" page 4030 of FIG. 25E. For the selected Category, which in this example is "Music—Styles Classical", the corresponding Keywords are listed in the "Display Strings" column 4031. A "Delete" column 4032 is provided with check boxes 4033 to delete the corresponding display strings.

Figure 25F:
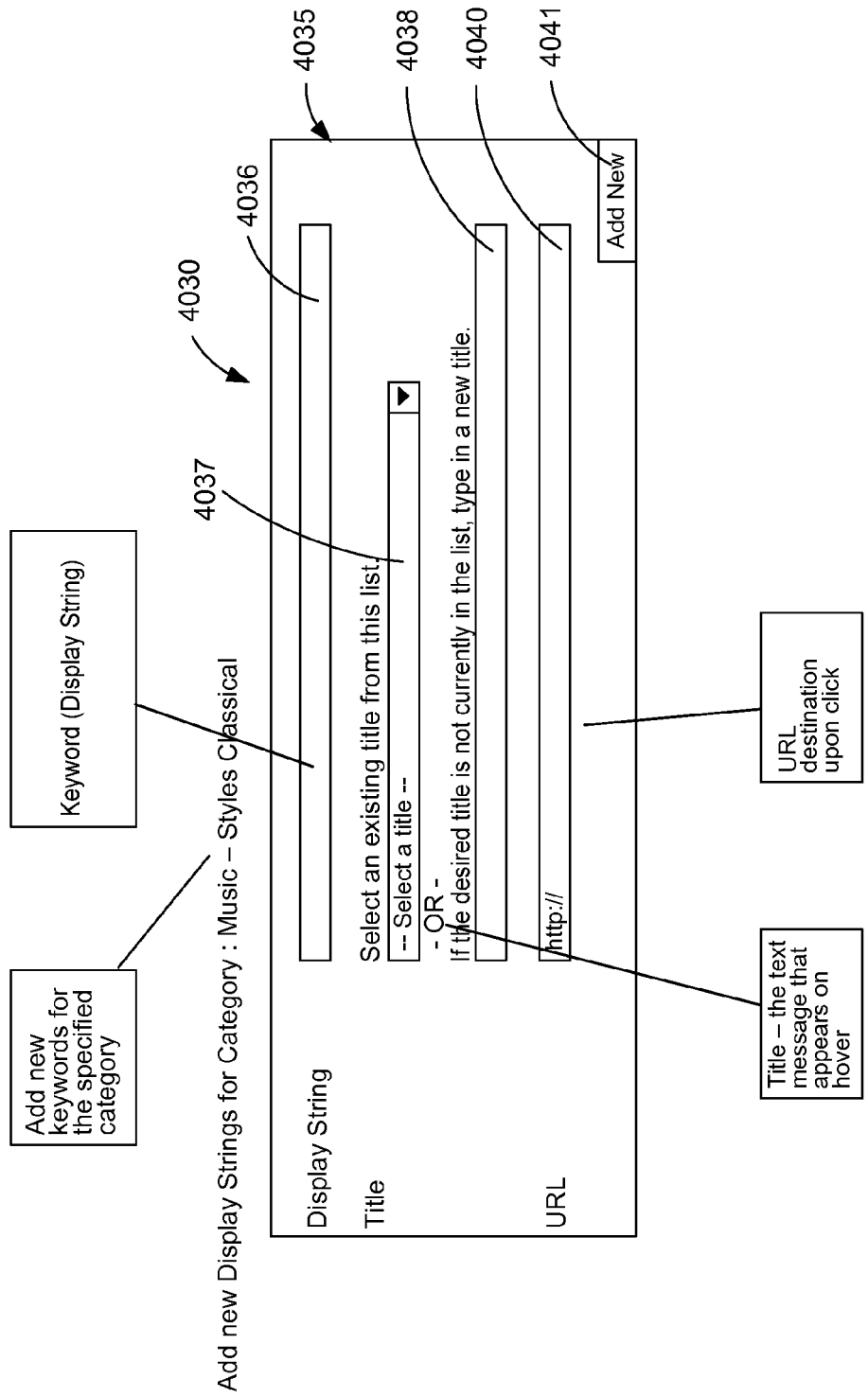

Continuing to scroll to the bottom of this Display Strings" page 4030 is an "Add Keyword" box 4035, shown in FIG. 25F. This component allows the Administrator to add any Keyword or Display String in the "Display Strings" box 4036 for the corresponding Category of the Ad Campaign. A desired Title for the Display String can be selected from an existing title in the "Existing Title" Box 4037, or in a new Title may be input in the "New Title" box 4038. The URL destination may be managed in the "URL" box 4040. Upon completion, the "Add New" button 4041 is executed.

Figure 25G:
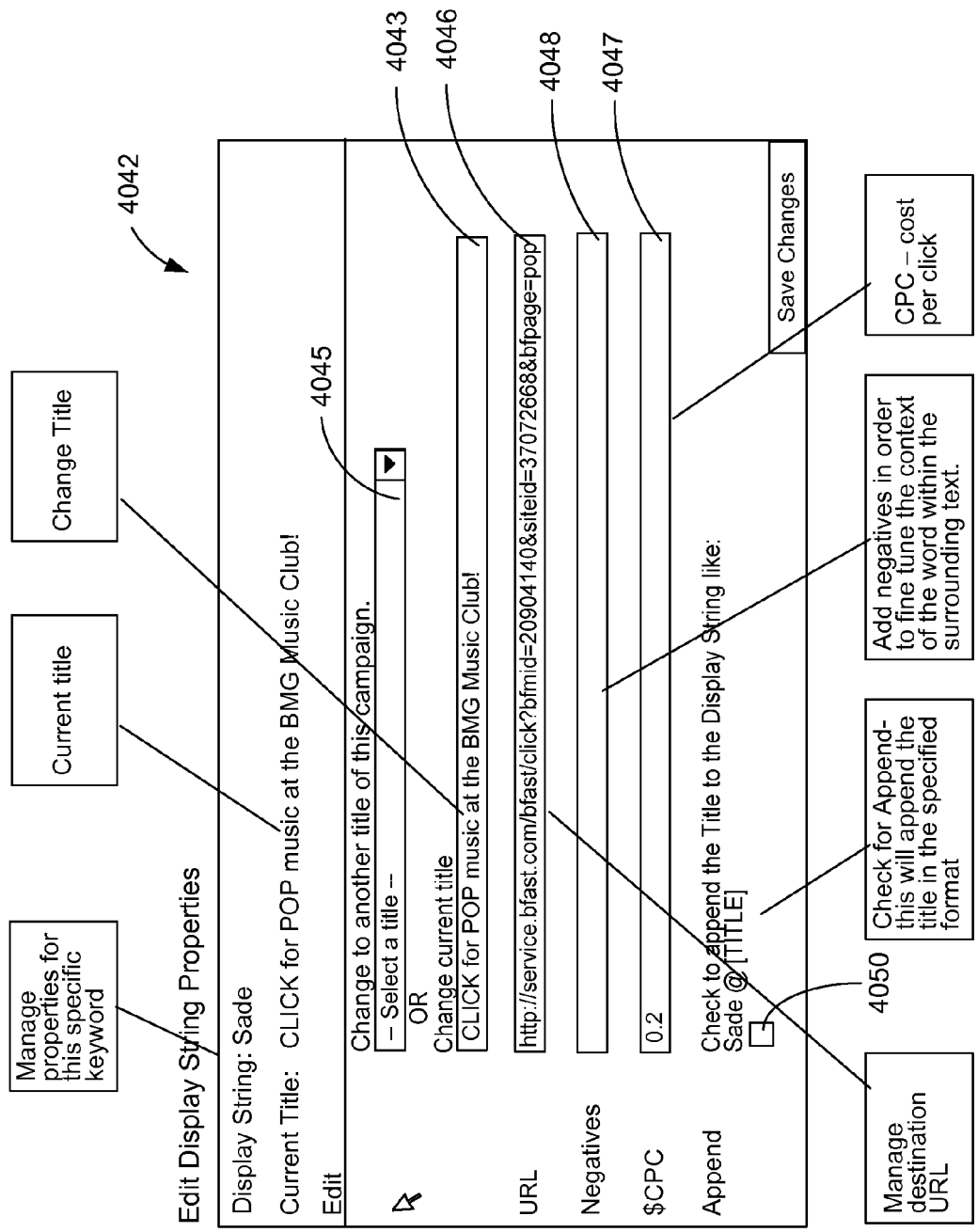

As mentioned, the "Display Strings" page 4030 of FIG. 25E enables the Administrator to manage the properties of each Keyword. Clicking one of the Keywords listed in the "Display Strings" column 4031 directs the Administrator to an "Edit Display Strings Properties" page 4042 of FIG. 25G. For example, the Current Title "CLICK for POP music at the BMG Music Club!" for the Display String "Sade" can be changed in the "Change Current Title" box 4043, or in the changed to another existing title for this Campaign in the corresponding box 4045. The URL destination may be managed in the "URL" box 4046, while the Cost Per Click can be changed from the "$CPC" box 4047.

Regarding the "Negatives" box 4048, briefly, this input allows the Administrator to fine tune the context of the selected Keyword within its surrounding text. For example, if the display string "credit card" has the following negative keywords associated with it: "bad, APR, free", then in the following sentence "credit card" will not be highlighted: "Combat your bad credit and get a credit card with free APR" since the negative keywords surround the display string and thus indicate that the display string does not appear in the right context on this page.

Lastly, selecting the "Append" box 4050 appends the current, selected or changed Title to the Display String. For example, if the Title were changed to "BMG.com", selecting the "Append" box 4050 would further alter the new Title to be "Sade@BMG.com".

Figure 25H:
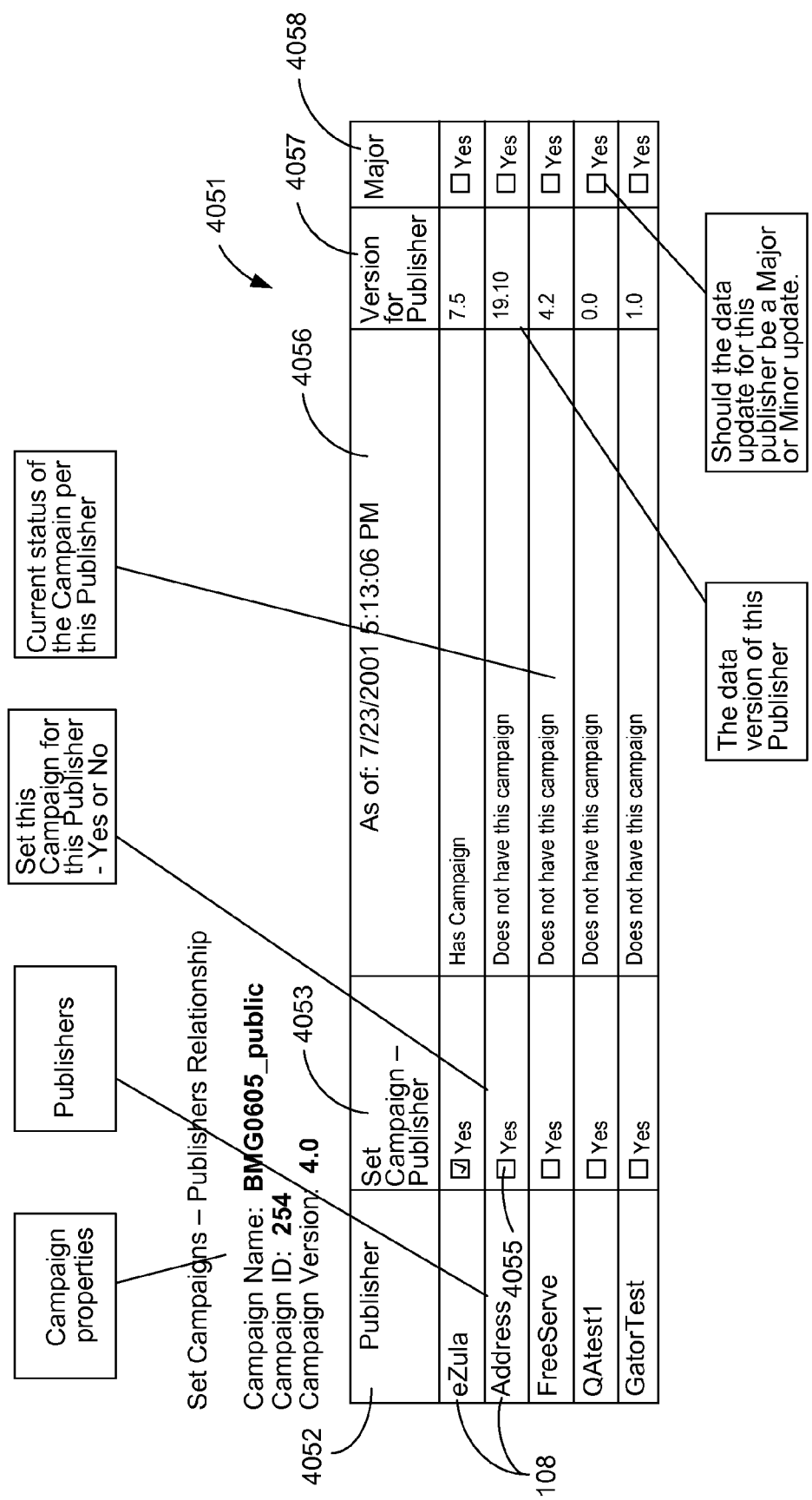

Referring back to the "Edit Campaign" page 4015 of FIG. 25C, when an Administrator desires to add, change or delete Publishing partners of the Ad Campaign Provider for this existing Ad Campaign, the "Set Relationship" Button 4010. The EZ Gateway Application then directs the Administrator to the "Set Campaigns—Publishers Relationship" page 4051 of FIG. 25H. Essentially, this interface allows the Administrator to manage the relationship of the selected Ad Campaign (BMG0605_public in this example) with existing Publishers 108 listed in the "Publisher" column 4052.

Adjacent the "Publisher" column 4052 is the "Set Publisher" column 4053 which enables the Administrator to "set" or "reset" the selected Ad Campaign for the corresponding Publisher. By "Checking or "Unchecking" the "Yes" box 4055, the corresponding Publisher 108 will be added or deleted from this Ad Campaign. "Status" column 4056 indicates the whether the corresponding Publisher 108 is running this Ad Campaign, while the "Version" column 4057 indicates the data version for the corresponding Publisher. This version number is the version for this specific publisher and is not unique for this campaign. The campaign has another version number which is indicated in FIG. 25B.

In the "Major" column 4058, the Administrator can indicate whether this data update for the corresponding Publisher 108 should be a "Major" or a "Minor" update. These definitions of the "Major" and "Minor" change to the Ad Campaign are mentioned above.

Listed above the table is pertinent Ad Campaign information including the Campaign Name and the Campaign ID. Also included is the Campaign Version number which indicates the version of that data for this specific campaign.

Figure 25I:
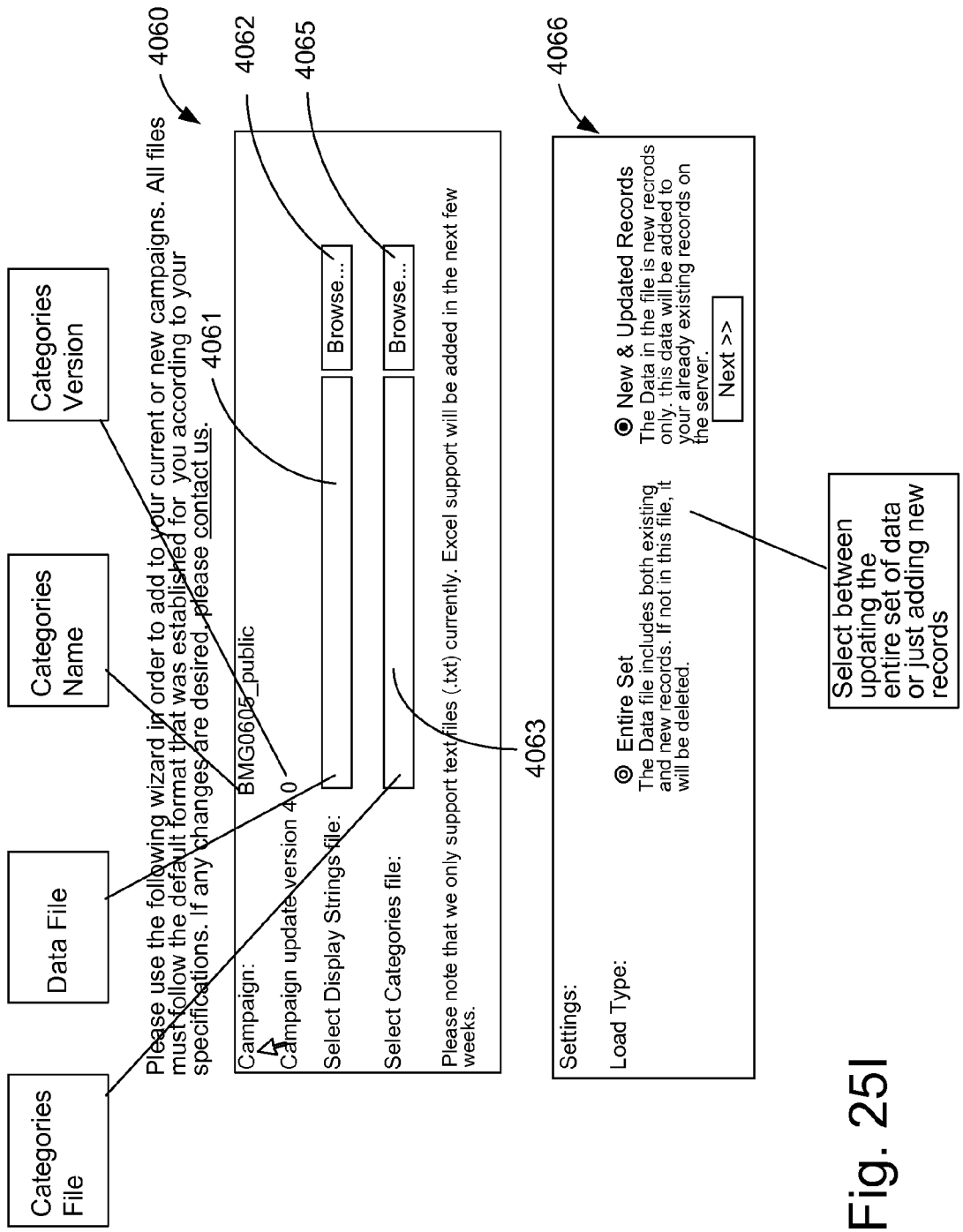

Once the selected Ad Campaign has been edited or modified, referring back to the "Edit Campaign" page 4015 of FIG. 25C, The instructions and modified information will reside in the database until the time of processing the changes arrives. At that time EZ Admin Server with the database will process the modified data and prepare it for an update. Clicking button 4008 on page 4007 directs the Administrator to the "Upload Data" page 4060 of FIG. 25I which enables them to upload new or updated date corresponding to the selected Ad Campaign. The "Select Display Strings file" box 4061 is provided to update the general data files containing the categories, keywords, titles, URLs, CPC, Match types, and negative keywords data which were added or updated generally in the "Display Strings" page 4030 of FIG. 25E, the "Add Keyword" box 4035 of FIG. 25F, and/or the "Edit Display Strings Properties" page 4042 of FIG. 25G. By clicking on the top "Browse" button 4062, the corresponding general data file can be selected. Regarding the "Select Categories file" box 4063, the category data files can be updated. These files contain the special parameters of a category such as those that have been added or updated in the "Category Properties" page 4018 of FIG. 25D. Again, by clicking on the bottom "Browse" button 4065, the corresponding category data file can be selected. In the "Setting" box 4066 below, the Administrator can replace the "Entire Set" of records with the updated the selected general data file and/or the selected category data file, or can add these files to the already existing files for the corresponding Ad Campaign. In essence this is making a choice between a major or minor update.

Figure 25J:
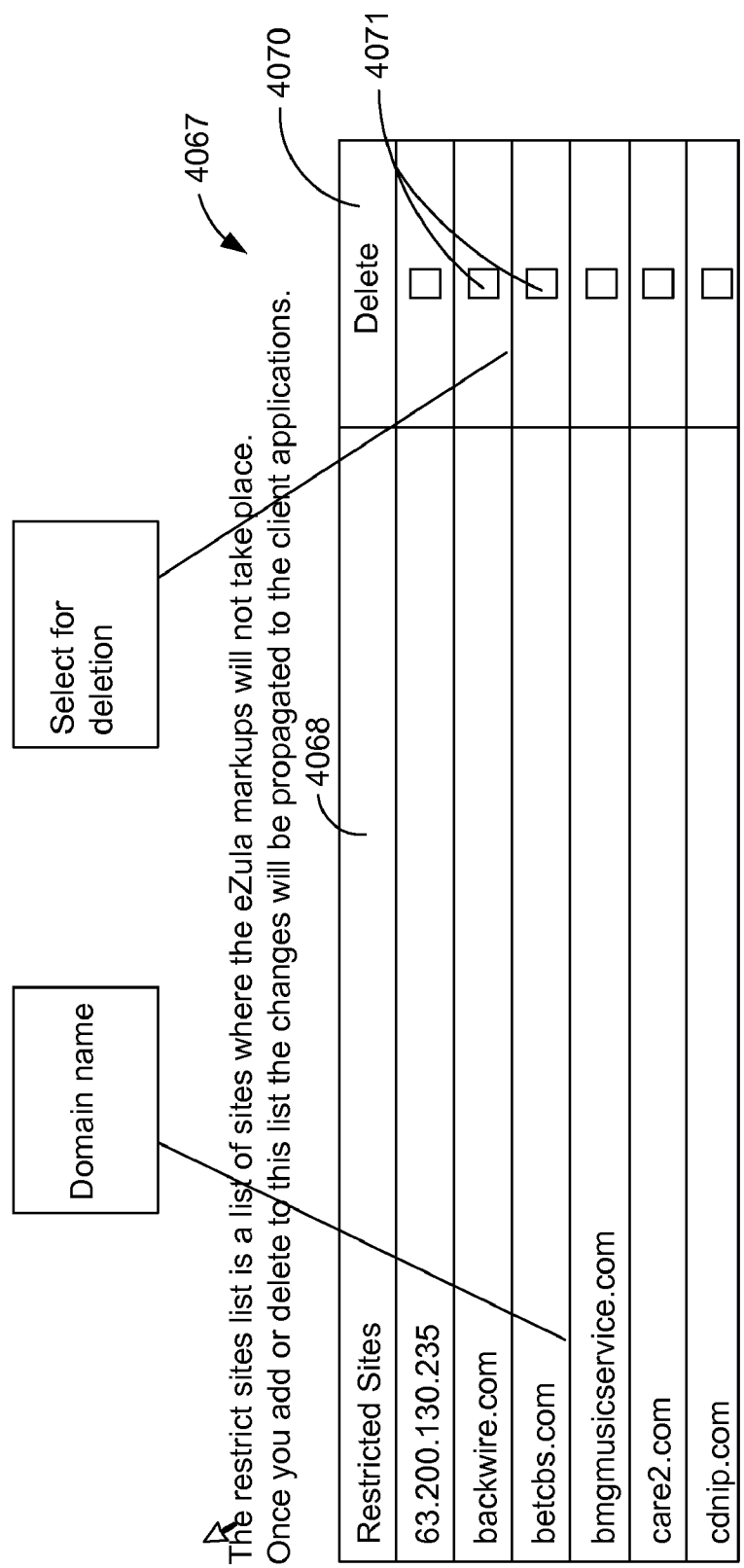

Referring now to FIG. 25J, a "Restricted Sites" page 4067 is provided which sets a global restriction of the listed sites for all Publishers. This page is access through the link on the top left side of page 4000. By adding a web site to the list of the "Restricted Sites" column 4068, the Ad Campaign Provider's mark-ups will not occur, globally, for any Publisher, and for any Ad Campaign on the users PCs. A "Delete" column 4070 is provided with check boxes 4071 to un-restrict previously restricted web pages.

The Client Application

Figure 5A:
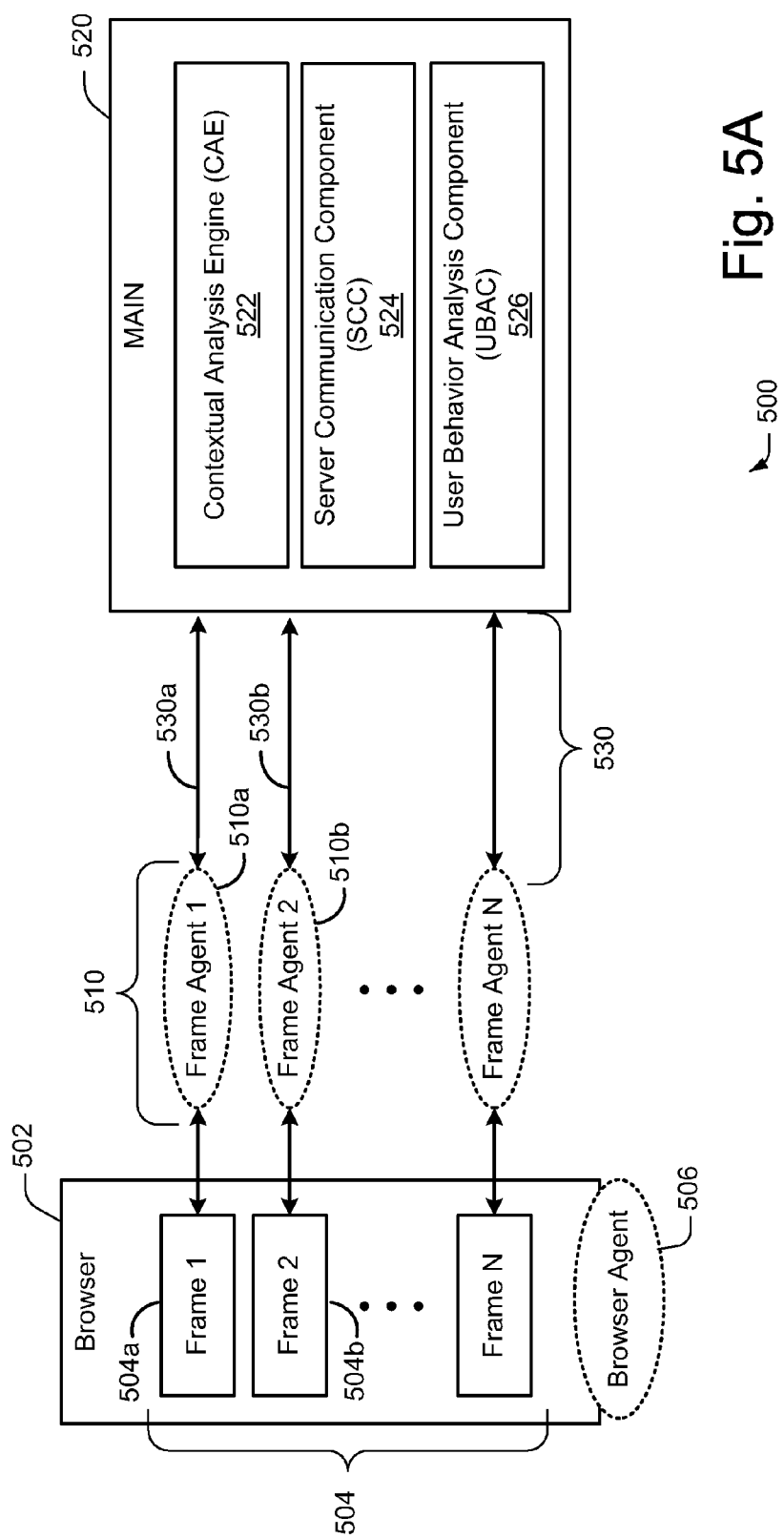
FIG. 5A shows a portion of a client system 500 which has been configured to implement the technique of the present invention in accordance with a specific embodiment.

Referring now to FIG. 5A, a portion of a client system 500 is shown which has been configured to implement the technique of the present invention in accordance with a specific embodiment. As shown in the example of FIG. 5A, the client system 500 may include a browser application 502 which displays a browser window on the display of the client system. The browser window may include a plurality of frames 504, wherein each frame may be used to display text and/or graphics to the end user. As described in greater detail below, one aspect of the present invention provides the ability for selected text (specified by the campaign provider and/or advertiser) to be temporarily dynamically highlighted and/or marked-up on the user's computer system. Moreover, according to at least one embodiment, the dynamic mark-up and/or highlighting of information in the browser window may be performed automatically and transparently from the perspective of the end user.

According to a specific embodiment, the campaign provider download component which is downloaded to the client system 500 may include a plurality of files and/or other components which may be executed on the client system in order to implement various aspects of the present invention. As shown, for example, in FIG. 5A, the campaign provider download component (herein referred to as the "download component") may include a MAIN application 520, a browser agent 506, and a plurality of frame agents 510. In a specific implementation, the MAIN application 520 may be configured to initiate at startup. The MAIN application may automatically load the browser agent 506 when the browser application is initiated, for example, by raising a hook for attaching the browser agent to the browser application. In one implementation, the browser agent may be configured as a plug-in which is automatically loaded each time the browser application is initiated. Various functions of the browser agent may include, for example, registration for even notification (e.g. quit, begin navigate, document complete, etc.), initiation of frame agents, etc. According to one implementation, both the browser and frame agents may be implemented as objects in a DLL file.

As shown in the embodiment of FIG. 5A, the MAIN application 520 may include a plurality of components for performing various aspects relating to the textual mark-up technique of the present invention. For example, the MAIN application 520 may include a Contextual Analysis Engine (CAE) 522 for performing search analysis of keywords and/or data string text. A more detailed description of the search analysis procedure which may be implemented by the Contextual Analysis Engine is provided below, with reference to FIGS. 16A and 16B of the drawings.

Additionally, as shown in FIG. 5A, the MAIN application 520 may also include additional components such as, for example, a Server Communication Component (SCC) 524, and a User Behavior Analysis Component (UBAC) 526. Functions of the Server Communication Component 524 may include, for example, data updates, automatic retrieval and updates of download components and update files, maintaining and transmitting customer tracking information to the EZ server complex, etc. Such tracking information may include, for example, information about the end user's activity such as page views, keywords clicked, markups viewed, pop-ups viewed, etc. The User Behavior Analysis Component 526 may be used to monitor the end user's click behavior in order to dynamically adjust the quantity of markup context in the document displayed on the user's computer system. In this way, the technique of the present invention is able to react differently to different types of users in terms of the keywords which are highlighted or marked up. For example, for users which click relatively frequently, fewer keywords may be highlighted or marked up, whereas, for users which click less frequently, a greater number of keywords may be highlighted or marked up.

It will be appreciated that the technique of the present invention may be used to implement a variety of different audio, visual and/or textual markups of document context displayed on the end user's computer system. For example, plain text may be marked up or highlighted.

According to a specific embodiment, the marked up text may also have associated with it additional caption information (e.g. tool tip captions) which provide additional information relating to the marked up context portion(s). Additionally, one or more pop-up windows may be configured to be automatically displayed to the user based upon the contextual information contained in the document window. For reference purposes, each or any of the above-described document display markups may be commonly referred to as "marked up document context" or "document context markup".

As shown in FIG. 5A, the client system 500 may also be configured to include one or more frame agents 510. In a specific implementation, a separate frame agent (e.g. 510a, 510b, etc.) may be instantiated for each respective frame (e.g. 504a, 5054b, etc.) in the browser window 502. In the embodiment of FIG. 5A, each frame agent may also be configured to instantiate a respective search pipe 530 for communicating with MAIN application 520.

Figure 5B:
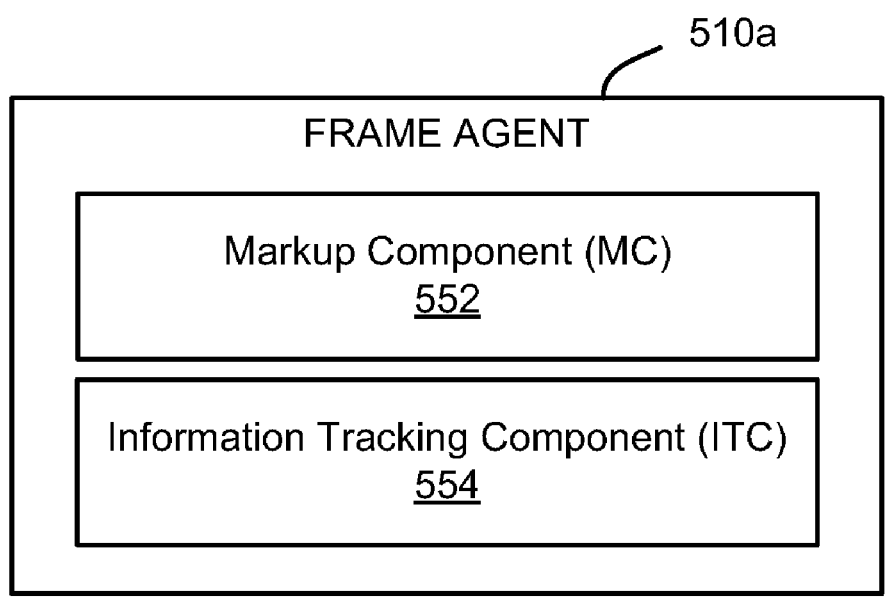
FIG. 5B shows a block diagram of a frame agent 510a in accordance with a specific embodiment of the present invention.

FIG. 5B shows a block diagram of a frame agent 510a in accordance with a specific embodiment of the present invention. In one implementation, the browser agent 506 may be responsible for instantiating the frame agent 510a. As shown in FIG. 5B, the frame agent 510a may include a plurality of components including, for example, a Markup Component (MC) 552, an Information Tracking Component (ITC) 554, etc. In one implementation, the Markup Component 552 may be responsible for determining and implementing markups of document context. For example, the Markup Component 552 may be responsible for determining which keywords are to be marked up in a selected browser frame, and may also be responsible for performing implementing markup of the identified keywords. A more detailed description of a markup procedure performed by the Markup Component 552 is provided below with reference to FIG. 19 of the drawings.

The Information Tracking Component 554 may be used to manage and log user tracking information such as, for example, number of page views, type of page views, markup information (e.g. identity of keywords which were marked up, quantity of markups, etc.), user ID, popup ads information (impressions and clicks), etc.

Figure 6:
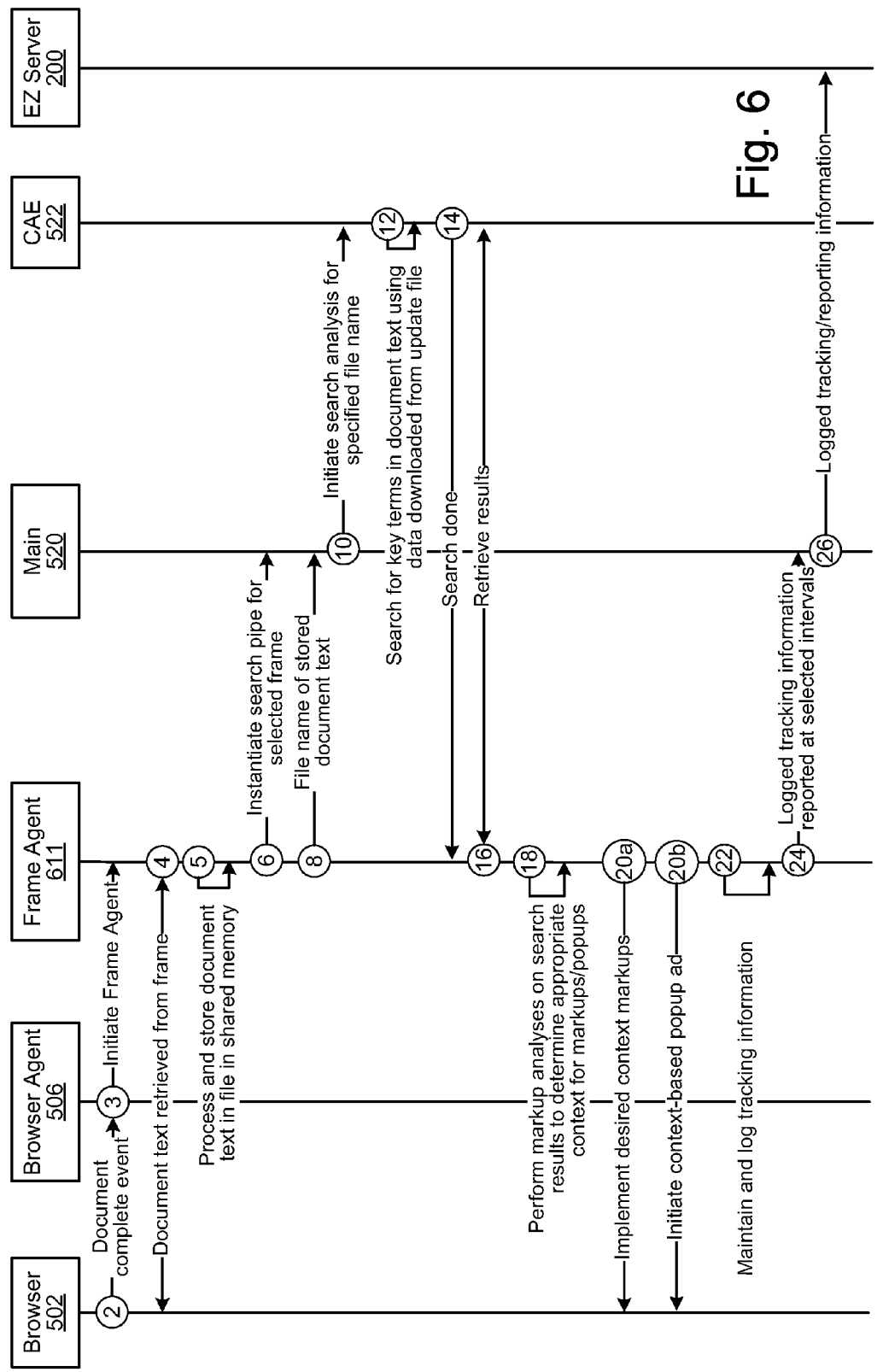
FIG. 6 shows a flow diagram illustrating how various components of the client system interact with each other to implement the various aspects of the present invention, in accordance with a specific embodiment.

FIG. 6 shows a flow diagram illustrating how various components of the client system interact with each other to implement the various aspects of the present invention, in accordance with a specific embodiment. The flow diagram of FIG. 6 will now be described in greater detail with reference to the various components illustrated in FIGS. 5A and 5B of the drawings.

Initially, it is assumed at (2) of FIG. 6 that a document complete event has occurred for a document such as, for example, an identified frame in a browser window. Typically, the document complete event indicates that the identified document has finished downloading all its data. The browser 502 notifies (2) the browser agent 506 of the document complete event for the identified document. Upon receiving the document complete event, the browser agent initiates (3) a frame agent for the identified document (e.g. frame) which, according to a specific example, may be identified using a frame ID). The frame agent 611 then retrieves (4) the document context from the identified frame, processes (5) the retrieved context, and stores (5) the processed document context in a specific file in the shared memory. According to a specific implementation, processing of the document context may include, for example, parsing the document context out of the HTML into individual lines (separated, for example, using carriage returns, links, or other information), trimming leading and trailing spaces (e.g. between lines), etc.

At (6) a search pipe is instantiated between the frame agent and MAIN 520. Thereafter, the file name or location of the stored document context may be passed (8) by the frame agent to the MAIN application 520. The MAIN application may then initiate (10) a search analysis procedure on the stored document context associated with the specified file name. According to a specific implementation, the search analysis procedure may be implemented using the Contextual Analysis Engine 522. During the search analysis procedure, the Contextual Analysis Engine searches for key terms in the document context using data downloaded campaign described previously in FIG. 4 of the drawings. Additionally, as described in greater detail below, the MAIN application 520 may periodically initiate a User Behavior Analysis Procedure (described, for example, in FIG. 12) for determining various aspects of the user's browsing and click behavior.

Once the CAE 522 has finished implementing the search analysis procedure for the identified document context, its signals (14) the frame agent that the search analysis has been completed. Thereafter, the frame agent 611 retrieves (16) the search results, and performs (18) a markup analysis on the search results to determine the appropriate document context to be marked up (e.g. markups, highlights, annotations, pop-ups, etc.).

Once the markup analysis has been completed, the frame agent may then implement (20a) markup of selected context within the identified document to produce the desired markups. In one implementation, the text marked up in accordance with the technique of the present invention may have a visually different appearance than ordinary or conventional links displayed within the document. Additionally, according to at least one embodiment, the markup information relating to a currently displayed document is non-permanent in that, once the user initiates a new page view, the markup information relating that document will be lost. If the user subsequently clicks the browser's BACK button in order to view the document again, the Search Analysis and Markup Procedures will be re-executed on the document in order to reproduce the markup information relating to that document.

Additionally, if desired, the frame agent may also initiate (20b) a pop-up advertisement based upon the context of the identified browser frame. Thus, for example, according to one implementation, the contextual pop-up advertisement may be based upon the context (e.g. textual context) within the identified browser frame. This technique defers from conventional pop-up advertisements which are typically initiated based solely upon a specified URL (e.g. the URL of the current web page or the URL of a selected link), and are not based upon the specific context included within a given web page.

According to a specific embodiment, the contextual pop-ups media feature is based on the ability to identify keywords on the page, classify them into categories, and using the category assign a matching category to a given page. In order to illustrate this aspect of the present invention, an example will now be described in which it is assumed that a document (e.g. web page) is displayed on the user's computer system which includes the following text: truck, car, vehicle, SUV, sport car. In this particular example, the document may be classified as a page corresponding to the category name "Auto". Accordingly, in one implementation, it will be appropriate to display information from the "Auto" category to the end user. In this way, the technique in the present invention provides a benefit of automatically displaying advertisements which match specific context of the page or documents displayed to the end user.

In a specific embodiment, the MAIN application 520 may be configured to analyze a selected document for keywords, categories and/or super categories in order to find a match for an appropriate pop-up advertisement or window to be displayed.

According to one implementation, a pop-up campaign may be defined as a campaign which includes a banner (image) that is served from a remote server into a browser window that opens on the user's machine. The client application (e.g. MAIN) determines if context of the document matches a topic of one or more campaigns. If there is a match, a browser window may automatically be opened and displayed on the client system. In one implementation, the context of the pop-up browser window may be provided by a remote server responsible for providing the banner image (e.g. advertisement).

According to a specific embodiment, one or more algorithms may be used for determining the most appropriate matching category for the selected document being analyzed. For example, in one algorithm, a variety of different parameters relating to the current document may be analyzed in order to determine the most appropriate matching category. For example, the current document may be analyzed and assigned a specific context score (CS) that is then compared with specific campaign requirement included in the campaign update files. If the context score is greater than or equal to a predetermined threshold value TH, then a pop-up ad (or other media type ads) may be displayed. According to one implementation, keywords which are identified in different elements of the document may be scored appropriately. The cumulative score of all the keywords that are found may be used to determine the CS value. If the identified keywords match a specific category of an ad campaign, and the cumulative CS value is above the threshold for that campaign, then a pop-up advertisement for that campaign may be displayed. Further, according to one implementation, different types of context within the document (e.g. document title, Meta keywords, Meta information, document text, etc.) may be weighted differently to emphasize each type's particular relevance. If more than one advertisement is associated with a particular campaign, selection of the appropriate advertisement may be based upon different mechanisms such as, for example, assigned priority, round robin, relative age, etc.

Additionally, as shown at 22 of FIG. 6, the frame agent may also maintain and log tracking information such as, for example, the number of impressions and/or pop-ups displayed on the client system, the number of markups displayed, the number and type of page views displayed, etc. In a preferred implementation, such tracking information does not include personal or private information relating to the end user, thereby assuring the user's privacy. According to a specific implementation, the tracking information may be stored locally on the client system. After a sufficient quantity of the tracking information has been collected (e.g. every 30-40 page views), the logged tracking information may be reported (24) at selected intervals to the MAIN application 520, which then forwards to (26) the logged tracking and/or reporting information to the EZ Server System 200 (FIG. 2).

It will be appreciated that, according to a specific embodiment, multiple threads of the flow diagram of FIG. 6 may be implemented for each frame identified in the browser window or other document window. Moreover, according to different embodiments, each thread may be implemented either serially or in parallel with each other. In this way, according to the latter embodiment, document context markup may be performed on a plurality of frames in the browser window simultaneously.

Figure 7:
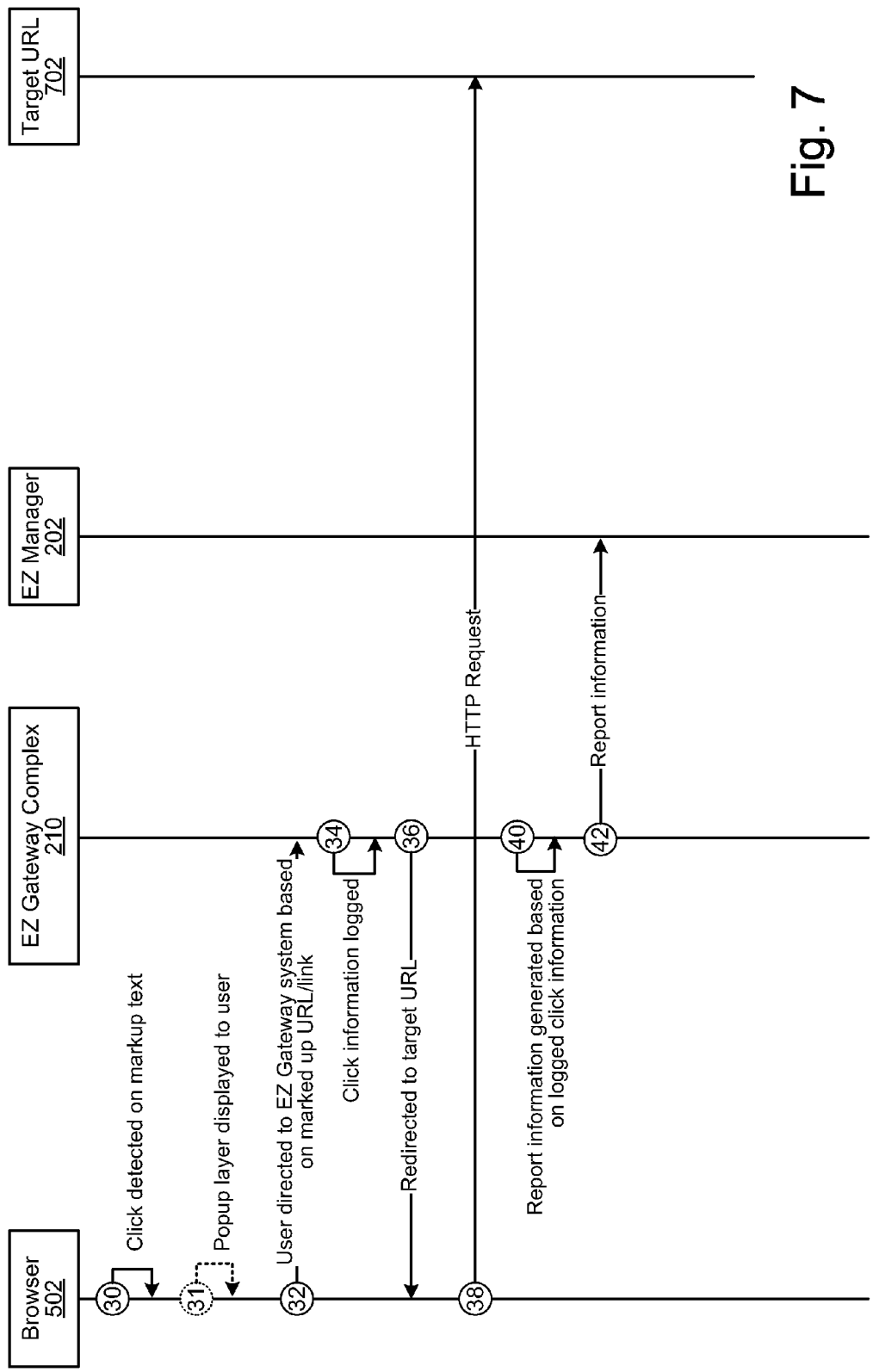
FIG. 7 shows a specific embodiment of a flow diagram illustrating how various information flows are passed between the client system and the server system of the present invention.
Figure 21:
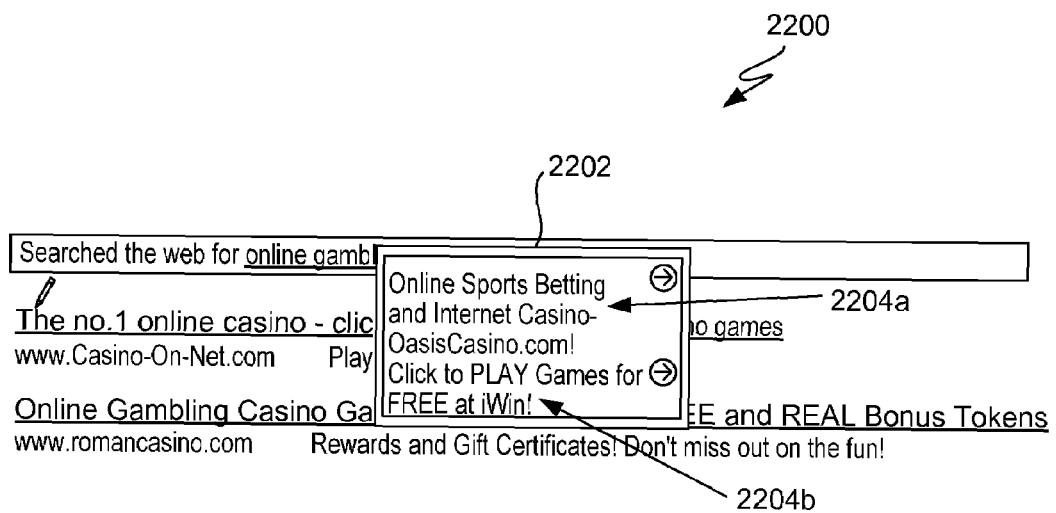
FIG. 21 is an example of one type of pop-up layer which may be displayed to the user in accordance with a specific embodiment of the present invention.

FIG. 7 shows a specific embodiment of a flow diagram illustrating how various information flows are passed between the client system and the server system of the present invention. Initially, at (30) it is assumed that the user has clicked or selected a particular portion of text which has been marked up in accordance with the technique of the present invention. According to at least one embodiment, when the user clicks on a particular portion of marked up text, a pop-up layer (e.g. dynamic browser control layer) may be displayed (31) to the user providing the user with additional information relating to the topic of the marked up text portion. An example of one type of pop-up layer is illustrated in FIG. 21 of the drawings. According to specific embodiments, the pop-up layer may include, for example, one or more links, audio information, video information, and/or textual information.

Assuming that the user selects to click on a mark up in accordance with the technique of the present invention, the user may then be directed (32) to the EZ Gateway Complex 210. During this process, information relating to the link/URL selected by the user (e.g. selected URL, keyword ID associated with the selected URL) may be passed to the EZ Gateway Complex 210. The EZ Gateway Complex logs (34) the click information, and provides (36) a redirect message to the user's browser, thereby redirecting the browser to the target URL. The browser then sends (38) an HTTP request to the target URL 702. Periodically (e.g. every 24 hours), the EZ Gateway Complex 210 will generate (40) report information based upon the logged click information. Thereafter, the report information is transmitted (42) from the EZ Gateway Complex 210 to the EZ Manager System 202.

FIGS. 8-10 illustrate specific embodiments of data structures which may be included in the campaign provider download component and/or campaign update files which are downloaded to the client system and used for implementing various aspects of the present invention. For example, as described previously, for example, in FIG. 4, the client system 410 periodically downloads update files which include new or updated campaign data. Additionally, as described in FIG. 6, the information included in the update files are used by the Contextual Analysis Engine 522 to determine specific document context which may be marked up in accordance with the techniques of the present invention.

According to a specific implementation, the update files which are periodically downloaded to the client system may include, for example, display string data structures, keyword data structures, and other data corresponding to one or more campaigns. According to one embodiment, the display string data structures may be characterized by their different types, which may include, for example, category display string data structures, key phrase display string data structures, title display string data structures, site display string data structures, etc. The update files which are downloaded to the client system may be stored locally such as, for example, in persistent memory and/or volatile (e.g. working) memory.

FIG. 8 shows an entry or record 800 corresponding to a category display string in accordance with a specific embodiment of the present invention. In the example of FIG. 8, the category display string record 800 includes a Category ID field 802, a Category Type field 804, a Max Number Of Underlines Field 806, a Category Priority field 808, a Category Name field 812, a Restricted Site ID field 814, a Restriction Indicator field 816, etc.

According to a specific embodiment, the Category ID field 802 may be used to identify a specific category (e.g. 304 of FIG. 3) associated with specific keywords, key phrases, or titles. In one implementation, the Category ID value may be represented as a 4-byte integer.

The Category Type field 804 may be used for describing the visual display characteristics associated with text or images relating to a particular category. For example, the category type may specify a particular color to be used for underlining marked up text, a particular color for highlighting marked up text, a particular image to be displayed near appropriate marked up text, etc.

The Max Number Of Underlines field 806 may be used to specify the maximum number of underlines or markups which may be performed on keywords associated with that category (e.g. per browser frame, per document, etc.) (e.g. max number of underlines for category=3).

The Category Priority field 808 may be used for prioritizing a particular category of words to increase the chances of those words being marked up using the technique of the present invention. According to a specific embodiment, the greater the category priority value, the greater the chances of words corresponding to that category being highlighted or marked up.

The Category Name field 812 may be used to describe a specific name associated with a particular category (e.g. "free stuff").

The Restricted Site ID field 814 may be used to identify specific Site IDs (e.g. domain names) or groupings of sites which have restrictions associated therewith. For example, the Restricted Site ID field 814 may include one or more Site ID values corresponding to specific web pages, and/or one or more Group ID values (where each Group ID represents a plurality of different web pages). The Site ID and Group ID parameters are described in greater detail with respect to FIG. 10.

The Restriction Indicator field 816 may be used for determining the type of restriction of associated with one or more restricted sites identified in the Restricted Site ID field 814. According to a specific implementation, the Restriction Indicator field may include either a positive value, a negative value, or no data. A negative value may be used to signify that keywords or key phrases associated with that particular Category ID are not to be marked up on web pages identified by the Restricted Site ID field 814. A positive value in the restriction indicator field may be used to signify that key phrases or keywords which are associated with the particular Category ID are to be marked up only on web pages identified in the Restricted Site ID field 814. Thus, for example, a negative value in the restriction indicator field may be viewed as a negative restriction, whereas a positive value in the restriction indicator field may be viewed as a positive restriction.

FIG. 10 shows an entry or record 1000 of a site display string data structure in accordance with a specific embodiment of the present invention. As shown in the example of FIG. 10, the site display string record 1000 includes a Site ID field 1002, a Site Name field 1004, and a Group ID field 1006. In a specific implementation, the Site ID field 1002 may be used to identify a particular domain name, or web page, and may be represented as a 4-byte integer. The Site Name field 1004 may be used to specify the particular domain name or site name associated with a particular Site ID. The Group ID field 1006 may be used to classify multiple sites into one or more groups. For example, all pornography web pages may be classified using the same Group ID value. Not all Site IDs may have a corresponding Group ID. According to a specific implementation, a negative Group ID value may be used to represent globally restricted sites in which no document context markup is to be performed. This feature is described in greater detail below with respect to FIG. 15.

FIG. 9A shows an example of a record or entry 900 in a key phrase or title display string data structure in accordance with a specific embodiment of the present invention. As shown in the example of FIG. 9A, the key phrase/title display string record 900 may include a plurality of different fields such as, for example, a Key Phrase or Title ID field 902, a Display String Type field 904, a Threshold Value field 906, a Match/Display Properties field 908, a Display String Text field 912, an Alternate Display String field 914, a Negative Words field 916, a Parent Category ID field 918, etc. According to a specific implementation, field 902 may be used for storing a Key Phrase ID or Title ID, depending upon whether the display string record 900 corresponds to a key phrase display string record or a title display string record. In one implementation, the identification of display string record 900 as either a key phrase display string record or title display string record may be determined by referencing information contained within the Match/Display Properties field 908 (described in greater detail below). For illustrative purposes, and in order to avoid confusion, it will be assumed that the displayed string record 900 of FIG. 9A corresponds to a key phrase display string record.

The Display String Type field 904 may be used to control the visual display of the title or key phrase associated with a particular display string record. The Threshold Value field 906 may be used for specifying a minimum threshold value (e.g. minimum threshold percentage value) to be used for fuzzy match analysis. For example, if a fuzzy match has been specified, then the value stored in the Threshold Value field may be used to determine the minimum percentage of matched words to be found in the document context in order to conclude that a match exists. This feature is described in greater detail below with respect to FIGS. 16A and 16B.

As shown in FIG. 9A, the display string record 900 may also include a Match/Display Properties field 908. In a specific implementation, the Match/Display Properties field may be implemented as an n-bit word which is used for determining various characteristics relating to the display string record. Such characteristics are described in greater detail below with respect to FIG. 9B of the drawings.

As shown in the example of FIG. 9A, the display string record 900 may also include a Display String Text field 912 which may be used for storing text (e.g. "credit card") relating to a particular key phrase or title. The Alternate Display String field 914 may be used for specifying alternate display strings associated with display string record 900. In a specific implementation, the alternate display string 914 may include one or more record identifiers (e.g. Key Phrase or Title IDs) associated with the display string record 900. For example, the alternate display string information may point to title display string records which may be used for describing the key phase associated with display string record 900.

The Negative Words field 916 may be used to specify one or more "negative" words which, if within a specified proximity to a matched display string in the document context, would negate markup (e.g. markup and/or highlighting) of the identified document context. This feature is described in greater detail with respect to FIGS. 16A and 16B of the drawings.

The Parent Category ID field 918 may be used for specifying the Category ID associated with the key phrase or title corresponding to that particular display string record (e.g. display string record 900).

FIG. 9B shows an example of various information which may be stored within the Match/Display Properties field 908, in accordance with a specific embodiment of the present invention. As shown in FIG. 9B, the Match/Display Properties field 908 may include a Record Classifier portion 908a, a Display portion 908b, a Case Sensitive portion 908c, a Match Type portion 908d, a For Append portion 908e, etc.

According to a specific implementation, the Record Classifier portion 908a may be used to specify whether the display string record 900 is to be treated as a key phase display string or a title display string. According to one implementation, key phrase display strings may be used when performing search analysis of the document context in order to generated markup text of highlighted text, whereas title display strings may be used, for example, for displaying additional information about a particular keyword or key phrase. According to a specific embodiment, display string text associated with a title display string record may be displayed in a pop-up layer (e.g. pop-up window, tool tips, etc.), which may be automatically displayed when the user's cursor moves over specific text and/or objects in the user's display.

The Case Sensitive portion 908c may be used for specifying whether a particular match requires case sensitivity. The Match Type portion 908d may be used to determine the type of match (e.g. exact or fuzzy) which is to be in effect for a particular display string record. According to a specific implementation, if the match type portion indicates that an exact match is required, it may be assumed that the threshold value for a match is 100%, regardless of the value within the threshold value field 906. Alternatively, if the match type portion 908d indicates that a fuzzy match is to be in effect, the value of the threshold value field 906 may be used for determining the minimum percent threshold value required for a "fuzzy" match.

Additionally, as shown in FIG. 9B, the Match/Display Properties field 908 may also include a For Append portion 908e which may be used to indicate that the title should be appended to the display string text, and the resulting string should be displayed in a pop-up layer or a tool tip.

FIG. 9C shows an example of an entry or record 950 which may be included in a keyword data structure in accordance with a specific embodiment of the present invention. According to a specific implementation, the keyword data structure may be implemented as a hash table, wherein the key is the keyword field 952. In the example of FIG. 9C, the keyword record 950 includes information relating to a particular keyword 952 and corresponding Key Phrase ID(s) associated with that particular key work. For example, the keyword field 952 may include a keyword text string such as, for example, "credit". Portion 954 of the keyword record may include information relating to one or more key phrases which include the keyword "credit". Each key phrase may be identified using its associated Key Phrase ID. Thus, for example, Key Phrase ID1 954a may correspond to the key phrase "credit card", Key Phrase ID2 954b may correspond to the key phrase "credit check", etc. According to a specific embodiment, the keyword data structure (which is stored locally on the client system) may include hundreds or even thousands of keyword entries.

It will be appreciated that the various data structures described in FIGS. 8-10 may include multiple records having a formats similar to those described in FIGS. 8-10. Further, it will be appreciated that in alternate embodiments, one or more of the data structure records may include additional fields for storing additional information, or may include fewer fields than those described in FIGS. 8-10.

Further description of the data structures described in FIGS. 8-10 are provided below with respect to FIGS. 14A-D, which provides an illustrative example of how the various data structures may be used for implementing the technique of the present invention.

Figure 11:
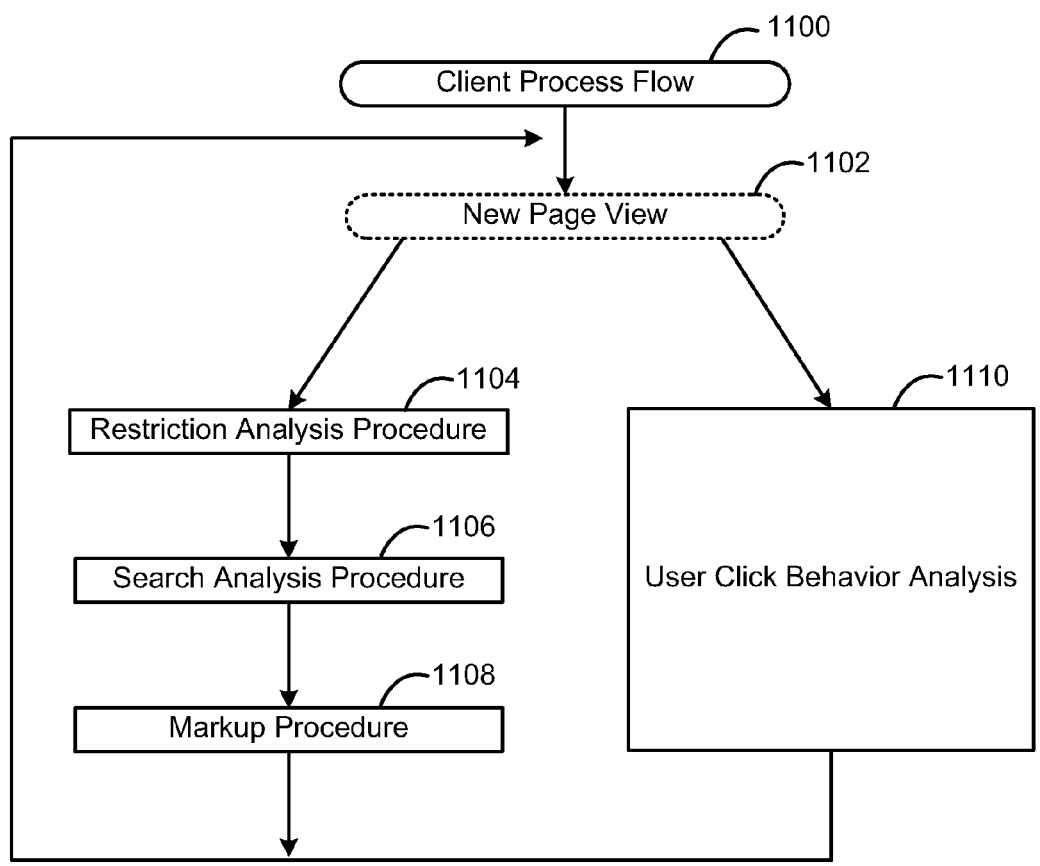
FIG. 11 shows a flow diagram of a Client Process Flow 1100 in accordance with a specific embodiment of the present invention.

FIG. 11 shows a flow diagram of a Client Process Flow 1100 in accordance with a specific embodiment of the present invention. More specifically, the client process flow 1100 illustrated in FIG. 11 provides a high level overview of the various events and/or procedures which occur during implementation of the document context markup technique of the present invention. The flow diagram of FIG. 11 will now be described in brief detail. In the example of FIG. 11, it is assumed that the client flow process 1100 is being implemented on a client system such as, for example, a computer system of an end user which is connected to the Internet.

At 1102, it is assumed that a new page view of a document is being displayed on the client system. In one implementation, the new page view may be displayed in an Internet browser window on the client system. In an alternate embodiment, the new page view may be displayed in a window which is managed by another application on the client computer system such as, for example, a word processing program, etc. Upon completing download of the new page, or upon completing the download of context in at least one frame of the new page, various procedures may be initiated in order to perform the document context markup technique of the present invention.

According to one implementation as shown, for example, in FIG. 11, a Restriction Analysis Procedure may be initiated (1104) in order to determine whether there are any restrictions on Marking up context contained in the new page/frame. Thereafter, if appropriate, a search analysis procedure may then be implemented (1106) in order to determine whether the context of the new page/frame includes selected keywords and/or phrases which have been predetermined by the campaign provider and/or advertiser. Thereafter, a markup procedure may be implemented (1108) for selecting and Marking up (e.g. markup/highlighting) selected text within the new page/frame. Additionally, as shown in FIG. 11, a User Click Behavior Analysis Procedure may be implemented (1110) in order to analyze specific browsing behavior patterns (e.g. click behavior) of the user, which may then be used to determine the degree of context markup to be implemented on the new page. According to a specific implementation, the User Click Behavior Analysis Procedure may be an ongoing process which runs concurrently with one or more of the other procedures shown in FIG. 11.

Figure 12:
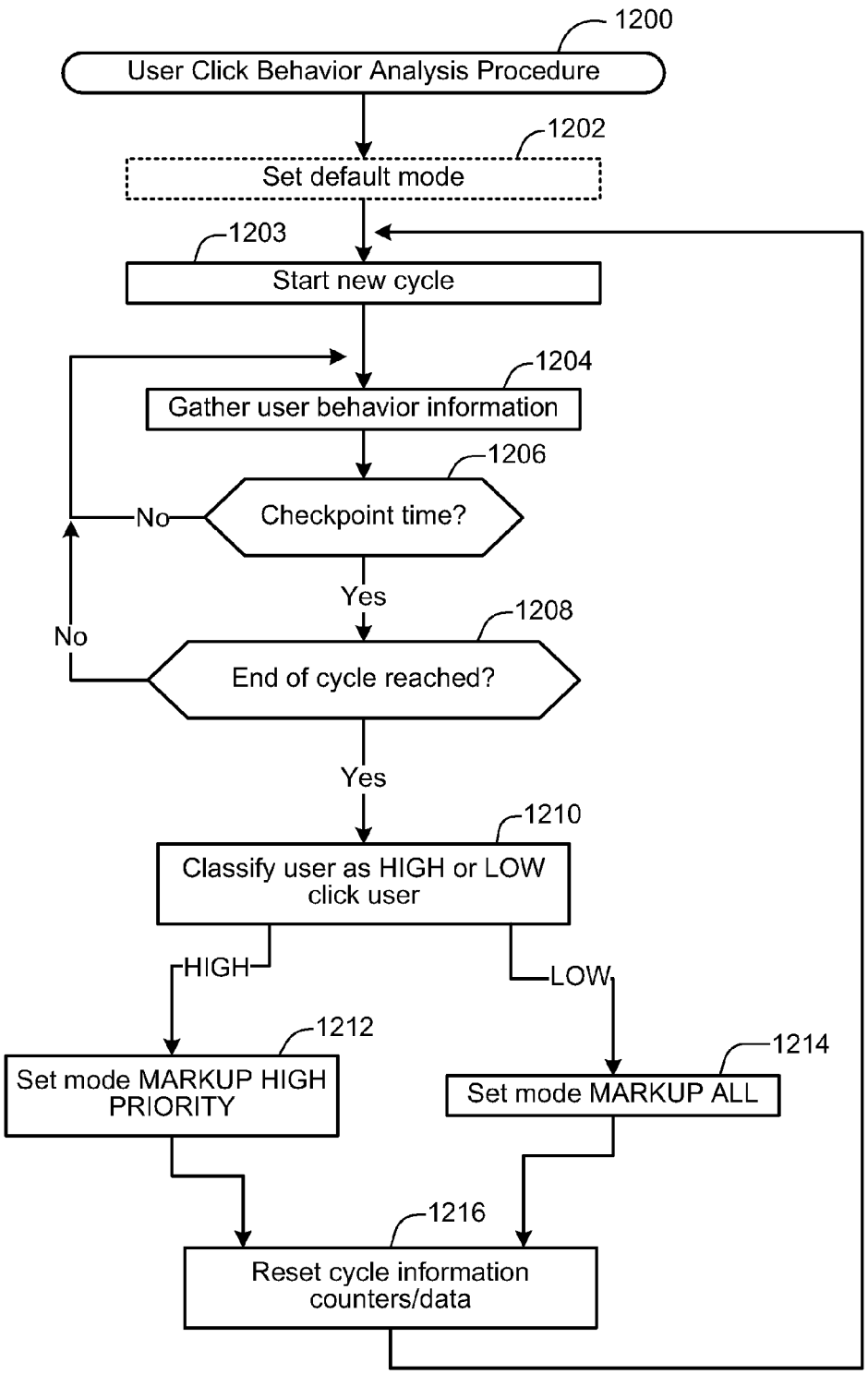
FIG. 12 shows a flow diagram of a User Click Behavior Analysis Procedure 1200 in accordance with a specific embodiment of the present invention

FIG. 12 shows a flow diagram of a User Click Behavior Analysis Procedure 1200 in accordance with a specific embodiment of the present invention. According to specific implementations, the User Click Behavior Analysis Procedure 1200 may be implemented by the User Behavior Analysis Component 526 of FIG. 5A. The User Behavior Analysis Component 526 may sometimes be referred to as a cycling component.

One function of the User Click Behavior Analysis Procedure 1200 is to analyze the end user's click behavior when browsing through web page context. For different types of user click behavior patterns, the technique of the present invention may be configured to react differently in terms of the keywords which are highlighted in the users' browser windows. For example, for user's which click relatively less frequently, a relatively greater number of keywords may be marked up or highlighted in order to elicit more clicks from that user. For user's which click relatively more frequently, fewer keywords may be highlighted/marked up, for example, in order to elicit higher returns for those keywords.

According to at least one implementation, the user's click behavior may be periodically monitored in cycles corresponding to different parameters. At the end of each cycle, the user's click behavior for that cycle is classified, and based upon this classification, a particular markup mode may be selected relating to the quantity or degree of marked up document context which will be implemented on text displayed on the user's computer system.

Initially, as shown at 1202 of FIG. 12, a default mode may be set when the User Click Behavior Analysis Procedure is initiated. In accordance with one embodiment, at least 2 context markup modes may be defined relating to document context markup. A first context markup mode may be referred to as MARKUP HIGH PRIORITY mode in which only high priority keywords are marked up on the user's display screen. A second mode may be defined as an MARKUP ALL mode in which all identified keywords are marked up/highlighted on the user's display screen. Thus, for example, at 1202, the default mode may be set to the MARKUP ALL mode. At 1203, the start of an analysis cycle is initiated. The User Click Behavior Analysis Procedure then gathers (1204) user behavior information such as, for example, the cycle start time, elapsed time since the start of the cycle, total page views presented (during that cycle), net page views presented (excluding restricted pages), total marked views (e.g. total page views with marked up context), etc. In a specific implementation, at least a portion of the collected user behavior information may be stored using hardware such as, for example, counters or registers.

At 1206, a determination is made as to whether a check point time has been reached. Periodically (e.g. every 30-45 page views), a check point time may occur in order to determine (1208) whether the end of the cycle has been reached. According to specific implementations, the end of the cycle may occur when at least one of the parameters associated with the user behavior information exceeds a predetermined limit value. For example, in one implementation, cycle limit values may be assigned to different parameters of the user behavior information, as shown in the following table:

| PARAMETER | CYCLE LIMIT VALUE |
|---|---|
| Total Page Views | 150 |
| Net Page Views | 100 |
| Total Marked Views | 150 |
| Cycle Start Time | 14 days |

According to a specific embodiment, the end of the cycle may occur when one or more of the above parameters meets or exceeds its associated cycle limit value. If it is determined that the end of the cycle has not been reached, then the User Click Behavior Analysis Procedure continues with gathering user behavior information for the current cycle.

Once it has been determined that the end of the cycle has been reached, the user's click information may then be used to classify (1210) the user as either a high or a low click user. According to a specific implementation, a high click user may be defined as a user who clicks at least n times during the cycle and a low click user may be defined as a user who clicks fewer than n times during the current cycle. In a specific implementation, only relevant click information (e.g. clicks on document context Marked Up in accordance with the technique of the present invention) is used when performing the user click behavior analysis. According to a specific implementation, the value n may be set equal to any integer greater than zero, such as, for example, n=1. It will be appreciated, however, that the definitions of a high click and low click user may vary depending upon desired design preferences and performance. Moreover, such variations will generally be known to one having ordinary skill in the relevant art. Additionally, according to a specific implementation, the value n may be a predetermined value, or may be dynamically determined based upon a specified formula (e.g. user's average number of clicks per cycle minus a predetermined constant).

As shown in the embodiment of FIG. 12, if it is determined that the user has been classified as a high click user, then the current mode may be set to MARKUP HIGH PRIORITY mode, wherein only high priority keywords are marked up/highlighted for display to the user. If, however, it is determined that the user has been classified as a low click user then, the current mode may be set to MARKUP ALL mode, wherein all appropriate keywords identified in the document context may be marked up/highlighted. Once the new context markup mode has been set, it will remain the active mode until the completion of the next cycle. Additionally, according to a specific implementation, changes of the context markup mode (over a selected time period) may also be tracked, recorded, and reported to the campaign provider for use in determining the effectiveness of the User Click Behavior Analysis Procedure and/or appropriate parameter values such as, for example, cycle limit parameter values, high click and low click user definitions, etc. Before the start of the next cycle, the user behavior information counters/registers may be reset (1216). Thereafter, the start of a new cycle may be initiated (1203).

In order to achieve a more thorough understanding of the various aspects of the present invention, the document context markup technique of the present invention will now be described by way of a specific example which is illustrated in FIGS. 13 and 14A-D of the drawings.

Figure 13:
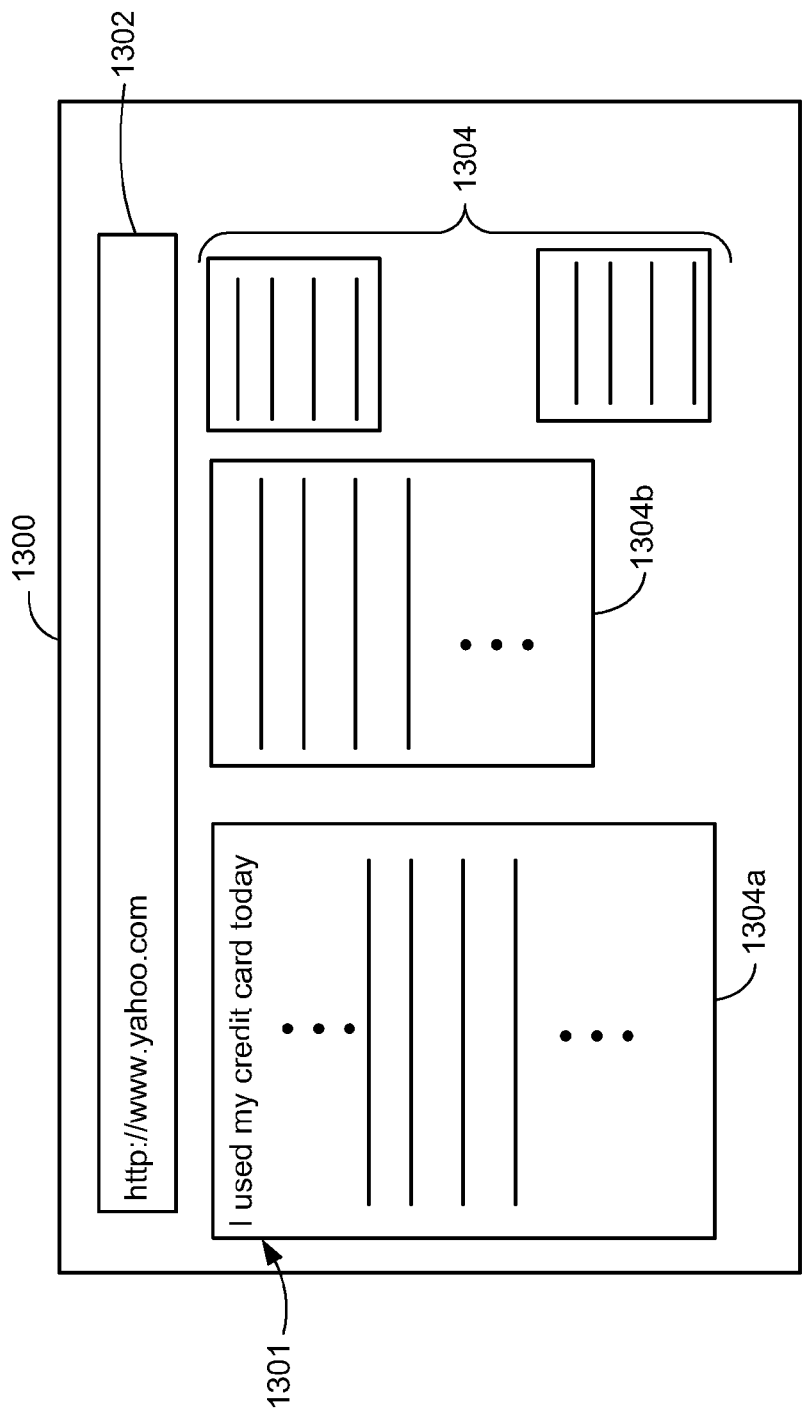
FIG. 13 shows an example of a browser window 1300 which may be used for illustrating various aspects and features of the present invention.

FIG. 13 shows an example of a browser window 1300 which may be used for illustrating various aspects and features of the present invention. As shown in the example of FIG. 13, the browser window 1300 includes a URL field 1302, and a plurality of tiled browser frames 1304. Each browser frame may include its own, respective context. For example, as shown in FIG. 13, browser frame 1304a includes a line of text which reads "I used my credit card today". As will be described in greater detail below, the context of browser frame 1304a (namely the line "I used my credit card today") will be analyzed for keywords and/or key phrases and marked up (e.g. marked up, highlighted, and/or annotated) in accordance with the technique of the present invention.

In order to perform the keyword search analysis and document context markup aspects of the present invention, it is assumed that the campaign provider download component and campaign update files have been downloaded and installed on the user's computer system (herein referred to as "the client system").

FIGS. 14A-D illustrate a specific example of various data structures and information provided in campaign update files which have been downloaded to a client system such as that shown, for example, in FIG. 5A. In a specific embodiment, the data structures of FIGS. 14A-D may be implemented as hash tables which may be stored within the memory of the client system.

It will be appreciated that the information illustrated in the data structures of FIGS. 14A-D represents examples of the various types of campaign data which may be downloaded to the client system. Further, it will be appreciated that the information shown in FIGS. 14A-D has been edited to omit confusing information (which may also be stored within the various data structures). The data structures of FIGS. 14A-D may include additional information not illustrated in FIGS. 14A-D.

Figures 14A, 14B, 14C, 14D:
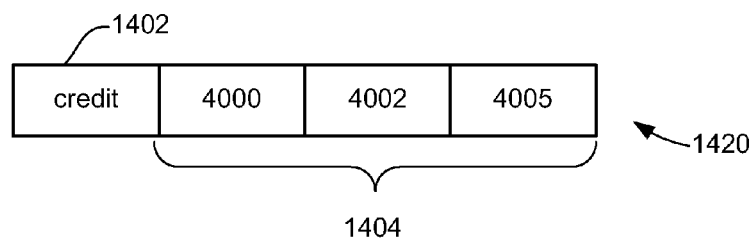
FIGS. 14A-D illustrate a specific example of various data structures and information provided in campaign update files which have been downloaded to a client system.

FIG. 14A shows an example of an entry 1420 included in a Keyword Hash Table that has been stored on the client system. In the example of FIG. 14A, the Keyword Hash Table entry 1420 includes information specifying a particular keyword 1402 (e.g. "credit"), and associated Key Phrase/Title ID values 1404 (corresponding to entries in the Title/Key Phrase Hash Table of FIG. 14B). Additional elements relating to Keyword Hash Table entries have been described previously with respect to FIG. 9C of the drawings.

FIG. 14B shows an example of information which may be included within a Title/Key Phrase Hash Table 1440. Each entry (e.g. 1442, 1444, 1446) in the Title/Key Phrase Hash Table 1440 may correspond to a display string entry or record described previously with respect to FIG. 9A. However, for purposes of illustration, and in order to avoid confusion, only a portion of the information included within each title/key phrase display string record is shown in FIG. 14B.

FIG. 14C shows a specific example of a Site Hash Table 1460 which may be used for illustrating various aspects of the present invention. Each entry (e.g. 1462, 1464) in the Site Hash Table 1460 may correspond to a site display string record described previously with respect to FIG. 10.

FIG. 14D shows an example of a record 1480 included in a Category Hash Table of the present invention. According to a specific embodiment, the Category Hash Table record 1480 may correspond to a category display string record described previously with respect to FIG. 8. However, for purposes of illustration and in order to avoid confusion, portions of information typically included in the category display string record of FIG. 8 have been omitted from the record 1480 illustrated in FIG. 14D.

Figure 15:
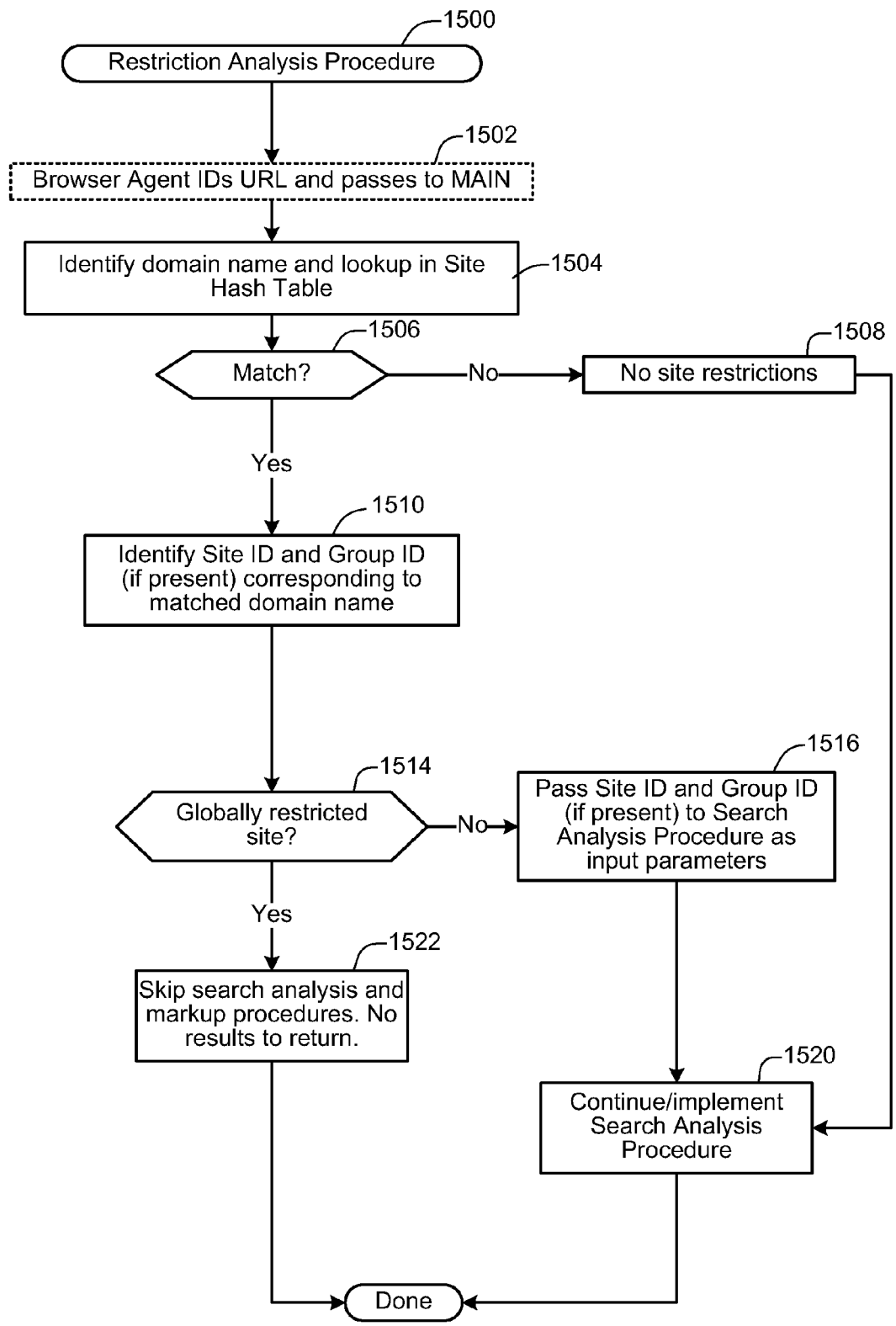
FIG. 15 shows a flow diagram of a Restriction Analysis Procedure 1500 in accordance with a specific embodiment of the present invention.

FIG. 15 shows a flow diagram of a Restriction Analysis Procedure 1500 in accordance with a specific embodiment of the present invention. In a specific implementation, the Restriction Analysis Procedure 1500 may be implemented and managed by the Contextual Analysis Engine 522 of FIG. 5A. One function of the Restriction Analysis Procedure is to determine whether a particular document or web page (which is being displayed on the user's computer system) is restricted for purposes of markup.

Initially, as shown at 1502, when a new document (e.g. web page) is displayed in the browser window of the client system, the browser agent (506, FIG. 5A) identifies the WEB PAGE associated with the new document, and passes the identified WEB PAGE to MAIN 520. In the present example (illustrated in FIGS. 13 and 14A-D), it is assumed that the WEB PAGE of the document being displayed in the browser window 1300 of the client system corresponds to "http://www.yahoo.com". When MAIN receives the WEB PAGE information, it identifies the domain name (e.g. "www.yahoo.com") from the WEB PAGE and performs a look up (1504) of the WEB PAGE, the identified domain name and/or a portion of the identified domain name (e.g. "yahoo.com") in the Site Hash Table (e.g. 1460, FIG. 14C). At 1506, a determination is made as to whether there is a match of the identified WEB PAGE in the Site Hash Table. If it is determined that there is no match, then it may be concluded that no site restrictions apply to that particular WEB PAGE. Accordingly, a search analysis procedure (such as that shown, for example, in FIGS. 16A-B of the drawings) may then be implemented (1520).

In the present example, the identified domain name "www.yahoo.com" matches entry 1462 of the Site Hash Table shown in FIG. 14C. Accordingly, upon detecting a match in the Site Hash Table, the Site ID and Group ID (if present) corresponding to the matched domain name are identified (1510) by referencing the appropriate information in the Site Hash Table 1460.

At 1514, a determination is made as to whether the identified Site ID corresponds to a globally restricted site. According to a specific implementation, a globally restricted site may be identified by referring to information within the Group ID field associated with that particular site. A negative Group ID value may be used to indicate a global restriction for that particular web page or domain name. If it is determined that the current WEB PAGE corresponds to a globally restricted site, then additional procedures for performing context markup on the current web page may be skipped (1522). If it is determined that the identified Site ID does not correspond to a globally restricted site, then the identified Site ID and its associated Group ID (if present) are passed (1516) to the search analysis procedure as input parameters.

In the present example, Group ID value (i.e. 2) associated with Site ID 5001 indicates that the site "www.yahoo.com" is not a globally restricted site. Accordingly, the Site ID=5001 and Group ID=2 parameters will be passed to the search analysis procedure for further processing. Thereafter, a search analysis procedure such as that shown, for example, in FIGS. 16A-B of the drawings, may be initiated (1520).

Figure 16A:
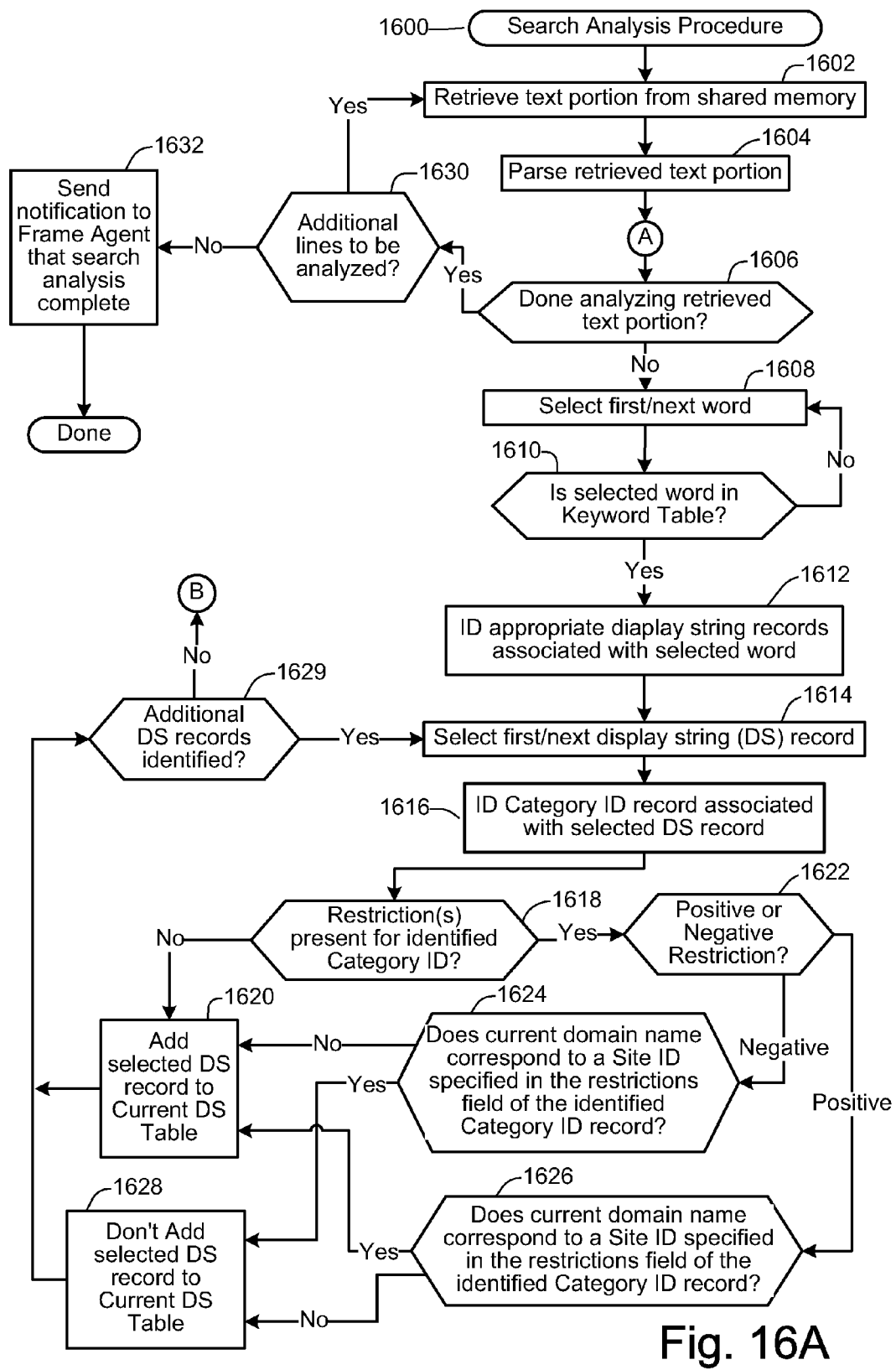
FIGS. 16A and 16B illustrate flow diagrams relating to a Search Analysis Procedure 1600 in accordance with a specific embodiment of the present invention.
Figure 16B:
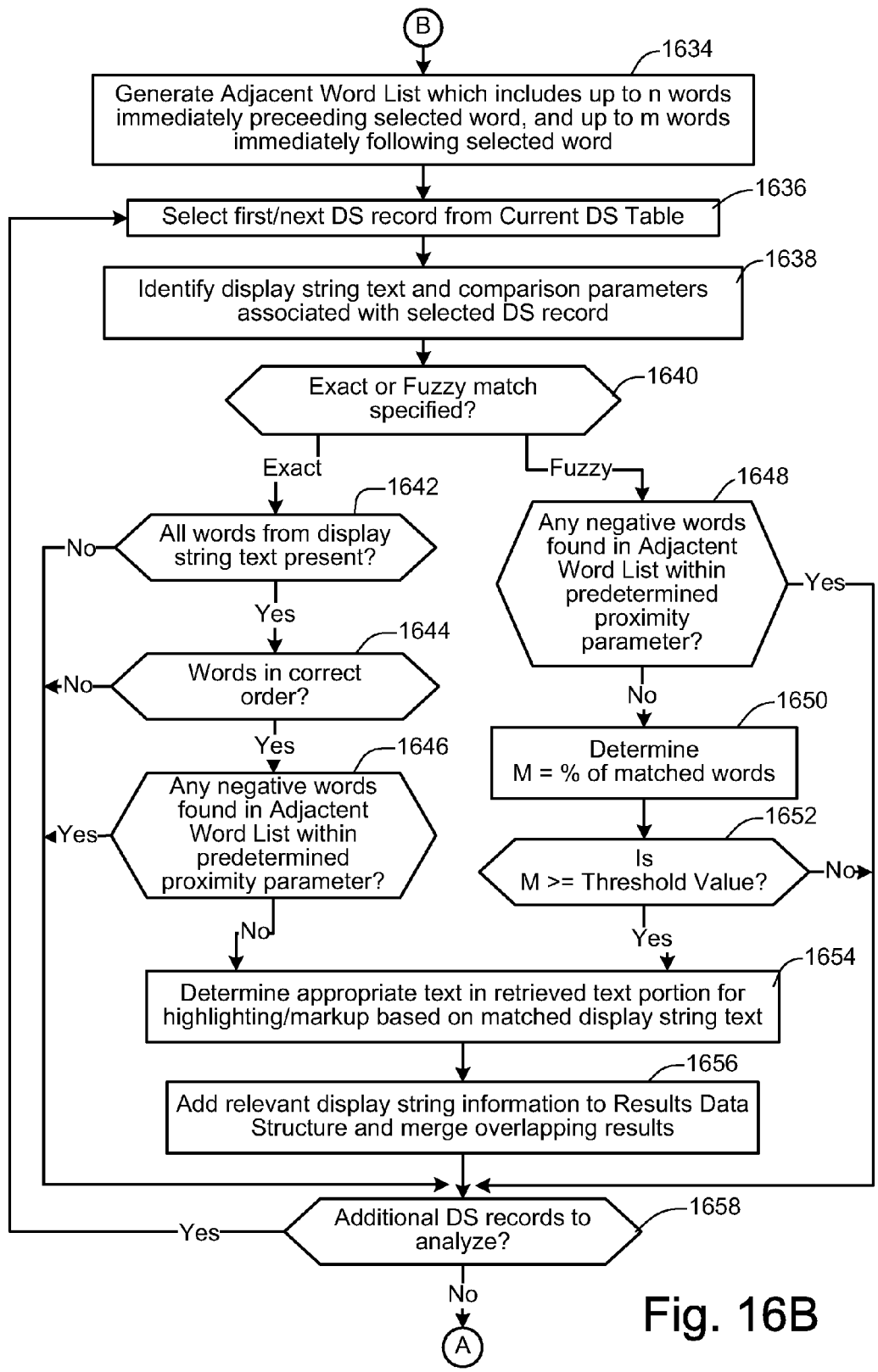

FIGS. 16A and 16B illustrate flow diagrams relating to a Search Analysis Procedure 1600 in accordance with a specific embodiment of the present invention. Although the flow diagrams of FIGS. 16A and 16B are illustrated on separate pages, they may be treated as one continuous flow which may be referred to as the Search Analysis Procedure. In a specific embodiment, the Search Analysis Procedure may be implemented and managed by the Contextual Analysis Engine 522 of FIG. 5A. As described in greater detail below, one function of the Search Analysis Procedure is to identify keywords and/or key phrases which exist within document context displayed on the client system such as, for example, the context displayed within browser frames 1304 of FIG. 13. According to a specific embodiment, any property of a selected document may be used for performing search analysis. For example, the search engine can search the document text, WEB PAGE, title, Meta tags, etc.

As described previously, when the browser agent (506) detects a document complete event for a selected frame (e.g. frame 1304a of FIG. 13), the browser agent instantiates a frame agent for the identified frame. The frame agent then processes the text within the identified frame, for example, by extracting the text out of the HTML, breaking the text into separate lines using various tags (e.g. carriage returns, line breaks, links, etc.), trimming leading and trailing spaces between lines, etc. Once the text has been processed, the frame agent stores the processed text in a file in the shared memory, and passes the name/location of the processes text file to the Contextual Analysis Engine for search analysis processing. Additionally, the frame agent may also pass other characteristics or parameters to the Contextual Analysis Engine such as, for example, a source tag, the location of the text portion within the frame, etc. In an alternate embodiment, such additional information may be stored within the processed text file in the shared memory.

As shown at 1602, the Contextual Analysis Engine retrieves a first text portion of the processed browser frame context from the shared memory for search analysis processing. In the present example, it is assumed that the text portion which has been retrieved corresponds to line 1301 of browser frame 1304a, which reads, "I used my credit card today".

Additionally, according to a specific implementation, the Search Analysis Procedure may receive a variety of additional input parameters including, for example, a WEB PAGE of the current page or document, restricted Site IDs and or Group IDs (if any), etc.

The retrieved text portion is then parsed (1604) into separate words. According to one implementation, the parsing of the retrieved text portion may include, for example, determining the position, length, and tag type of selected words in the retrieved text portion. A first word is then selected (1608). In the present example, the first word selected is "I". A determination is then made 1610 as to whether the selected word is within the keyword table (e.g. the Keyword Hash Table 1420 of FIG. 14A). In the present example, the selected word is not within the Keyword Hash Table.

According to a specific implementation, if the selected word is not found in the Keyword Hash Table, then stemming procedures may be performed and the search repeated. Such stemming procedures may include, for example, adding an "s" to the end of the selected word, removing an "s" from the end of the selected word (if present), removing all occurrences of "-" from the selected word (if present), etc.

If it is determined that the selected word is not found in the Keyword Hash Table, a next word from the retrieved text portion (e.g. "used") is selected, and looked up in the Keyword Hash Table. In the present example, the word "used" is not found within the Keyword Hash Table. Accordingly, the next word "my" is selected and looked up in the Keyword Hash Table. Since there is no matching entry for word "my" in the Keyword Hash Table, the next word "credit" is selected and looked up in the Keyword Hash Table.

In the present example, an entry for the keyword "credit" is located in the Keyword Hash Table. Accordingly, the display string records associated with the identified keyword (e.g. "credit") are identified (1612) using the information portion 1404 from the Keyword Hash Table record 1420. In the present example, Key Phrase IDs 4000, 4002, 4005 are identified from the "credit" keyword record 1420 of FIG. 14A. These display string records (4000, 4002, 4005) correspond to Key Phase IDs which may be found in the Title/Key Phrase Hash Table 1440 of FIG. 14B. Referring to FIG. 14B, it can be seen that each of the Key Phrase IDs 4000, 4002, 4005 include the word "credit" in their respective display string text fields.

Once the appropriate display string records associated with the identified keyword have been identified, a first display string record (e.g. display string record 1442 of FIG. 14B) is selected (1614), and the Category ID (e.g. 9000) associated with the selected display string record is identified (1616).

At 1618 a determination is made as to whether the identified Category ID (e.g. 9000) has any associated restrictions. According to a specific implementation, this determination may be made by referencing information in the Category Hash Table of FIG. 14D. If there are no restrictions to the identified Category ID, then the selected display string record may be added (1620) to a Current Display String Table, such as that shown, for example in FIG. 17E of the drawings.

If, however, it is determined that the identified Category ID has restrictions associated with it, a determination may then be made (1622) as to whether the associated restrictions are positive or negative restrictions. According to a specific implementation, the existence and/or type of restrictions (e.g. positive restrictions or negative restrictions) for a particular Category ID may be determined by referencing the Restriction Indicator field of the entry in the Category Hash Table matching that particular Category ID. In the present example, the identified Category ID is 9000, which corresponds to entry 1480 of the hash table illustrated in FIG. 14D. As shown in the example of FIG. 14D, the restriction indicator field of category display string 9000 has a value of (−). According to a specific embodiment, a negative value in the restriction indicator field may signify a negative restriction, and a positive value in the restriction indicator field may signify a positive restriction. In the present example, a negative restriction is in effect for keywords associated with Category ID=9000 on web pages associated with restricted Site ID 5002 (which, according to the Site Hash Table of FIG. 14C, corresponds to the domain "www.cnn.com").

Returning to FIG. 16A, if it is determined that the identified Category ID is associated with a negative restriction, then a determination may be made (1624) as to whether the domain name of the current WEB PAGE corresponds to a Site ID specified in the restrictions field of the identified Category ID record. If so, the selected display string record is not added (1628) to the current display string record. If not, the selected display string record is added (1620) to the Current Display String Table.

In the present example, the domain name associated with the current WEB PAGE (displayed in browser widow 1300) is "www.yahoo.com", which is associated with Site ID 5001 in the Site Hash Table of FIG. 14C. However, as shown in FIG. 14D, Category ID 9000 has a negative restriction associated with Site ID=5002, which corresponds to "www.cnn.com". If the current web page displayed in browser window 1300 were associated with the domain "www.cnn.com", then the selected display string record (e.g. display string record 1442 of FIG. 14B) would not be added (1628) to the Current Display String Table. However, since the domain name of the current web page does not correspond to Site ID 5002, the selected display string record 1442 may be added (1620) to the Current Display String Table. Alternatively, if it is determined that the identified Category ID is associated with a positive restriction, then the selected display string record may be added to the Current Display String Table only if the domain name associated with the current WEB PAGE corresponds to a Site ID specified in the restrictions field of the identified Category ID record. As explained in greater detail below, information from the Current Display String Table will be used in performing match analysis of key phrases or keywords in the retrieved text portion.

At 1629, a determination is made as to whether there are additional identified display string records (e.g. associated with the keyword "credit") which are to be analyzed for restriction analysis. If, it is determined that there are additional identified display string records to be analyzed, then a next display string record is selected (1614) and analyzed for restrictions in order to determine whether to add the selected display string record to the Current Display String Table. Once it is determined that there are no additional display string records to be analyzed, flow of the Search Analysis Procedure may continue at reference point B, which is illustrated in FIG. 16B of the drawings.

In the present example, each of the display strings 1442, 1444, 1446 shown in FIG. 14B will be analyzed by the Search Analysis Procedure, and as a result of the analysis, will be added to the Current Display String Table, thereby resulting in the Current Display String Table 1770 of FIG. 17E. FIG. 17E shows an example of a Current Display String Table 1770 in accordance with a specific embodiment of the present invention.

As shown in FIG. 16B, flow of the Search Analysis Procedure 1600 continues from reference point B. At 1634, an Adjacent Word List is generated which includes j words immediately proceeding the selected word (e.g. "credit"), and k words immediately following the selected word. The values for j, k may vary depending upon design criteria and performance. In a specific implementation, j=4 and k=5.

Thus, in the present example, an Adjacent Word List is generated which includes up to four words immediately proceeding the currently selected word (e.g. credit"), and five words immediately following the current selected word. An example of an Adjacent Word List is shown in FIG. 17A.

FIG. 17A shows an example of an Adjacent Word List 1710 in accordance with a specific embodiment of the present invention. In the embodiment of FIG. 17A, the Adjacent Word List 1710 may be implemented as a table or other data structure which includes a plurality of fields. For example, a first field 1712 may include specific text relating to the words adjacent to the currently selected word (e.g. "credit"), and a second field 1714 may include information relating to start positions of each word in the Adjacent Word List. According to different embodiments, the currently selected word may be included in the Adjacent Word List, or may be omitted.

After the Adjacent Word List has been constructed for the currently selected word, a first display string record may be selected (1636) from the Current Display String Table. In the present example, as shown, for example, in FIG. 17E, the Current Display String Table includes three display string records, namely 1772, 1774, and 1776. Accordingly, a first display string record (e.g. record 1772) is selected for analysis.

At 1638 the display string text and comparison parameters of the selected display string record are identified. In the present example, the display string text associated with record 1772 is "credit card", and the comparison parameters specify an exact match, and a negative word restriction which includes the word "check".

At 1640 a determination is made as to whether an exact or fuzzy match is specified for the display string text associated with the selected display string record. In the present example, display string record 1772 specifies an exact match. Accordingly, the retrieved text line (e.g. "I used my credit card today") is analyzed for an exact match of the display string text "credit card". In a specific implementation, the match analysis may be performed using the Adjacent Word List 1710. Additionally, according to a specific implementation, an exact match may result when it is determined that all words from the display string text are identified (1642) in the retrieved text portion, and that each of the identified words are in the correct order (1644).

According to a specific embodiment, a match helper may be used to determine whether an exact or fuzzy match occurs. Examples of match helpers are shown in FIGS. 17B-D of the drawings. For example, shown in FIG. 17B, all words for the display string text "credit card" have been found to be present and in the correct order. Therefore, it may be concluded that an exact match has occurred.

If it has been determined that an exact match has occurred, a determination may then be made (1646) as to whether there are any negative words found in the Adjacent Word List within a predetermined proximity parameter P to the currently selected word. In the specific implementation, the value P may be set equal to any integer value greater than zero, such as, for example, P=2 words. If one or more specified negative words are found within P words of the currently selected word, the exact match occurrence will be ignored. For example, as shown in FIG. 17E, display string record 1772 includes a negative word "check". Thus, assuming P=2, if the word "check" appears within two words of the word "credit", the exact match for "credit card" will be ignored, and a next display string record will be selected from the Current Display String Table.

According to a specific implementation, match analysis for a selected display string may also be aborted if it is determined that a search maximum has been reached for selected keywords associated with the current web page or document.

Figure 18:
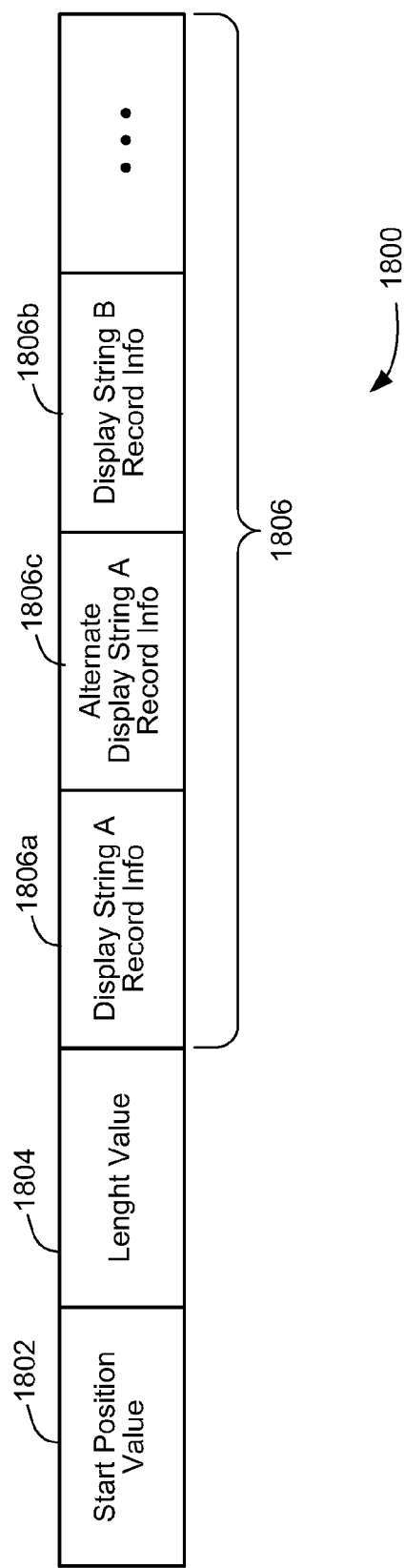
FIG. 18 shows a block diagram of a Results Data Structure entry 1800 in accordance with a specific embodiment of the present invention.

Assuming that an exact match has been found to occur, and that there are no negative words identified in proximity to the currently selected word, the matched display string text may then be used to determine (1654) the appropriate text in the retrieved text portion which may be marked up or highlighted in accordance with the technique of the present invention. During this determination, the start position where the highlighting/markup should begin may be determined using, for example, the word position information included in the Adjacent Word List 1710. According to one implementation, if an exact match has been identified, the corresponding matched text in the retrieved text portion may be identified for markup and/or highlighting. Thereafter, the relevant markup and display string information may be added (1656) to a Results Data Structure, and merged with overlapping results. An example of a Results Data Structure is shown in FIG. 18 of the drawings.

At 1658, a determination is made as to whether there are additional display string records in the Current Display String Table to be analyzed for match analysis. If so, a next display string record (e.g. display string record 1774 of FIG. 17E) is selected (1636) from the Current Display String Table, and a match analysis is then performed using the display string text associated with the newly selected display string record.

In the present example, the next display string record 1774 selected for analysis specifies a display string text of "credit check", and specifies an exact match type with no negative word restrictions. Since the Adjacent Word List 1710 does not include an exact match for "credit check" (as illustrated, for example, in the match helper diagram of FIG. 17C), the Search Analysis Procedure will conclude that an exact match for "credit check" does not occur in the retrieved text portion. Accordingly, a next display string record (e.g. display string record 1776 of FIG. 17E) may be selected from the Current Display String Table for display string text match analysis.

As shown in FIG. 17E, display string record 1776 specifies a display string text of "credit card APR", specifies a fuzzy match type and a match threshold value of 60%, meaning that at least 2 of the 3 words in the display string text should preferably be found in the retrieved text portion. Record 1776 also specifies a negative word limitation which includes the word "used".

As shown in the embodiment of FIG. 16B, during a fuzzy match analysis, the retrieved text portion may first be analyzed (1648) for negative words which are within a predetermined proximity parameter P (e.g. P=2) to the currently selected word. In the present example, display string record 1776 includes a negative word "used". Since, in the current example, the word "used" is within 2 words of the currently selected word "credit", the Search Analysis Procedure may terminate the fuzzy match analysis, and proceed directly to operation 1658.

If, however, it is determined that there are no negative words within P words of the currently selected word, the percentage of matched words (M) identified in the retrieved text portion may than be calculated or determined (1650). In the present example, as shown, for example, in FIG. 17D, 2 of the 3 display string words have been identified in the Adjacent Word List, thereby resulting in the calculation of M=66%. A determination may then be made (1652) as to whether the value M is greater than or equal to the threshold match value associated with the selected display string entry (e.g. 60%).

If it is determined that the value M is greater than or equal to the match threshold value, then the matched display string text may then be used to determine (1654) the appropriate text in the retrieved text portion which may be marked up or highlighted in accordance with the technique of the present invention. According to one implementation, if a fuzzy match has been identified, an algorithm may be used to select the appropriate text in the retrieved text portion to be marked up and/or highlighted. According to a specific embodiment, the determination of the position and length of context to be marked up is determined, for example, by the position of the first word in the text portion that was found in the display string text, and the length may be determined by location of the last matched word. For example if the text portion in the document being analyzed was "My APR for credit is 0.9%", and the display string is "Credit card APR", then the, according to a specific implementation, the markup text will be "APR for credit". Thereafter, the relevant markup and display string information may be added (1656) to a Results Data Structure, and merged with overlapping results.

According to a specific embodiment, noise words such as, for example, "of", "the", "a", "and", etc. may be ignored when performing match analysis. Additionally, stemming may also be performed during the match analysis of a particular display string text in order to increase the chances of finding a match.

After each of the display string records in the Current Display String Table have been analyzed, flow of the Search Analysis Procedure may continue at reference point A of FIG. 16A of the drawings.

Continuing at reference point A of FIG. 16A, at 1606 a determination is made as to whether the retrieved text portion has finished being analyzed. If there are additional words in the retrieved text portion which have not yet been analyzed, a next word is selected (1608) and analyzed as described above.

After all of the words in the retrieved text portion have been analyzed, a determination may then be made (1630) as to whether there are additional text portions in the shared memory file to be analyzed. If so, according to one implementation, the Contextual Analysis Engine may signal the frame agent to send a next text portion of the browser frame to be analyzed by the Search Analysis Procedure. In an alternate embodiment, the Contextual Analysis Engine may retrieve a next text portion of the browser frame context from the data file which has been previously processed by the frame agent and stored in the shared memory.

After all of the relevant text portions of the browser frame context have been analyzed by the Search Analysis Procedure, notification of the completion of the Search Analysis Procedure may then be sent (1632) to the frame agent. Thereafter, the frame agent may retrieve information from the Results Data Structure information and use the retrieved information to perform a markup analysis and implementation in accordance with a specific embodiment of the present invention.

FIG. 18 shows a block diagram of a Results Data Structure entry 1800 in accordance with a specific embodiment of the present invention. In one implementation, the Results Data Structure may be managed by the Contextual Analysis Engine 522 and populated during implementation of the Search Analysis Procedure 1600. As shown in the embodiment of FIG. 18, each record or entry in the Results Data Structure may include information relating to specific text which are candidates for context markup in a selected document, in accordance with the technique of the present invention.

As shown in the embodiment of FIG. 18, each entry in the Results Data Structure may include information relating to a start position (1802) in the selected document where context markup is to occur, a length (1804) of the region to be marked up/highlighted. Additionally each entry in the Results Data Structure may also include display string record data structures 1806 which include various information such as, for example, display string text, display string IDs, match properties, Category IDs, display string types, etc. For example, as shown in FIG. 18, entry 1800 includes a data structure 1806a which includes display string A record information, a data structure 1806c which includes alternate display string A record information, a data structure 1806b which includes display string B record information, etc. In a specific implementation, the display string A data structure and display string B data structure may correspond to different links which will be displayed in a pop-up layer (to the user) when the user selects or clicks on specific document context which has been marked up in accordance with the technique in the present invention. Additionally, in one embodiment, the display string A record information may relate to a key phrase, and the alternate display string A record information may relate to a title associated with that key phrase. The alternate display string information may be derived from the information contained within an Alternate Display String field 914, described previously in FIG. 9A.

Figure 19:
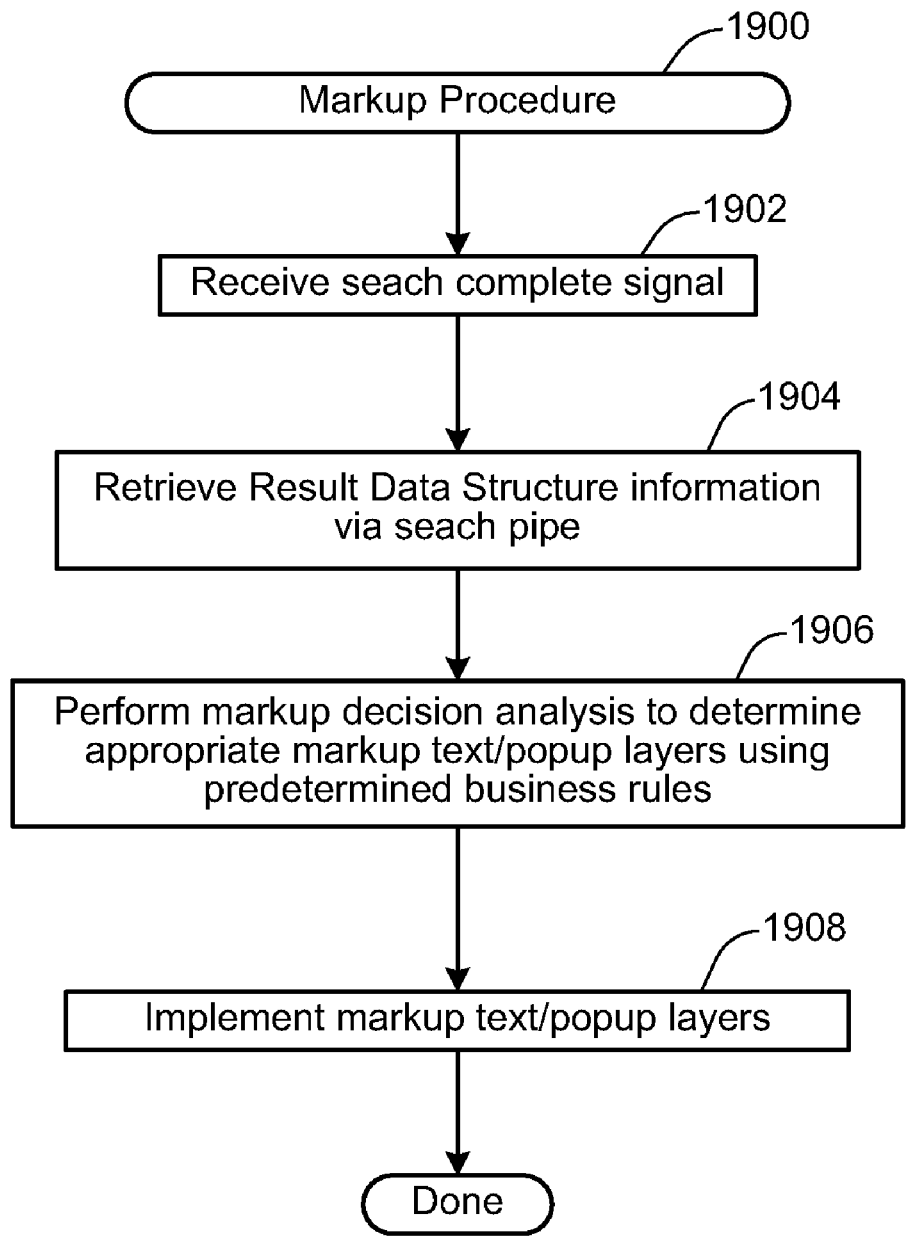
FIG. 19 shows a flow diagram of a Markup Procedure 1900 in accordance with a specific embodiment of the present invention.

FIG. 19 shows a flow diagram of a Markup Procedure 1900 in accordance with a specific embodiment of the present invention. According to a specific implementation, the Markup Procedure may be implemented by a frame agent. In the embodiment of FIG. 19, the Markup Procedure may be used to selected appropriate document context for markup/highlighting, and for implementing markup of the selected document context.

Initially, as shown at 1902, the frame agent receives a search complete signal such as that provided, for example, by the Contextual Analysis Engine. The frame agent then retrieves (1904) information from the Results Data Structure via its associated search pipe. Using the retrieved Results Data Structure information, markup decision analysis may then be performed (1906) using predetermined business rules in order to determine appropriate markup text and/or pop-up layers to be marked up in the document context.

According to a specific embodiment, the predetermined business rules may set forth specific criteria for the selection of specific document context which is to be marked up in accordance with the technique of the present invention. For example, priority of markup selection (of specific document context) may be based upon the following priority factors: highest priority is given to text, followed by links, followed by repetitive display strings, followed by DIVs. Additionally, other business rules may be applied for the selection of a appropriate document context for markup such as, for example, the number of markups per page may not exceed a predetermined "per page limit" value (e.g. no more than 10 markups per page); markups on the same word may not be repeated more than a "per repeat limit" value (e.g. repeat words may not be marked up more than twice); higher priority is given for markups of text within bigger size frames over small size frames; etc.

Determination of the appropriate markups to be implemented in a particular document/frame may also be based upon other criteria such as, for example, limits based upon each unique display string, limits for each category (described, for example in field 806 of FIG. 8), etc. Additionally, the current markup mode (e.g. MARKUP HIGH PRIORITY mode or MARKUP ALL mode—relating to the user's click behavior) may also be used to determine appropriate document context for markup.

After the appropriate document context has been selected for markup, markup of the selected document context may then be performed (1908) in order to implement the desired text markups (e.g. marked up/highlighted text and/or pop up layers). According to a specific implementation, markup of selected document context may be achieved by temporarily annotating selected DOMs in the document that was retrieved to the user Personal computer and was parsed by the User's browser.

Figure 20:
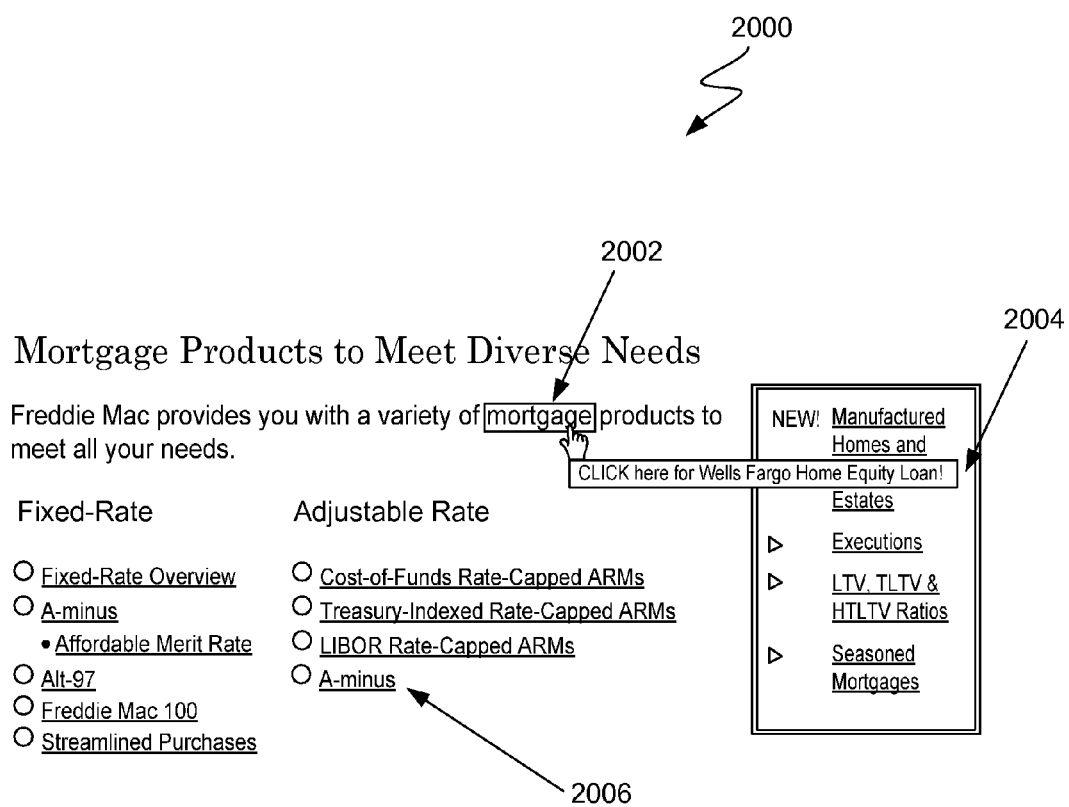
FIG. 20 shows a portion of a web page 2000 which has been Marked Up in accordance with the technique of the present invention.

An example of marked up document text implemented in accordance with a specific embodiment of the present invention is shown in FIG. 20 of the drawings. FIG. 20 shows a portion of a web page 2000 which has been marked up in accordance with the technique of the present invention. An ordinary link is identified at 2006, whereas context which has been marked up in accordance with the present invention is identified by portions 2002 and 2004 of FIG. 20. As shown at 2002, the word "mortgage" has been marked up to include highlighting and double underlining. Additionally, when the user passes the cursor over the marked up portion 2002, additional information 2004 may be displayed to the user which was not initially parsed by the user's browser. In the example of FIG. 20, the word "mortgage" at 2002 has been converted from ordinary text into a highlighted link which is visually different than conventional links displayed by the browser application such as link 2006. Moreover, it will be appreciated that the markup of text portions 2002 and 2004 have been automatically implemented at the client system based upon information provided by an advertiser and/or web site, and not by the end user.

Figure 22:
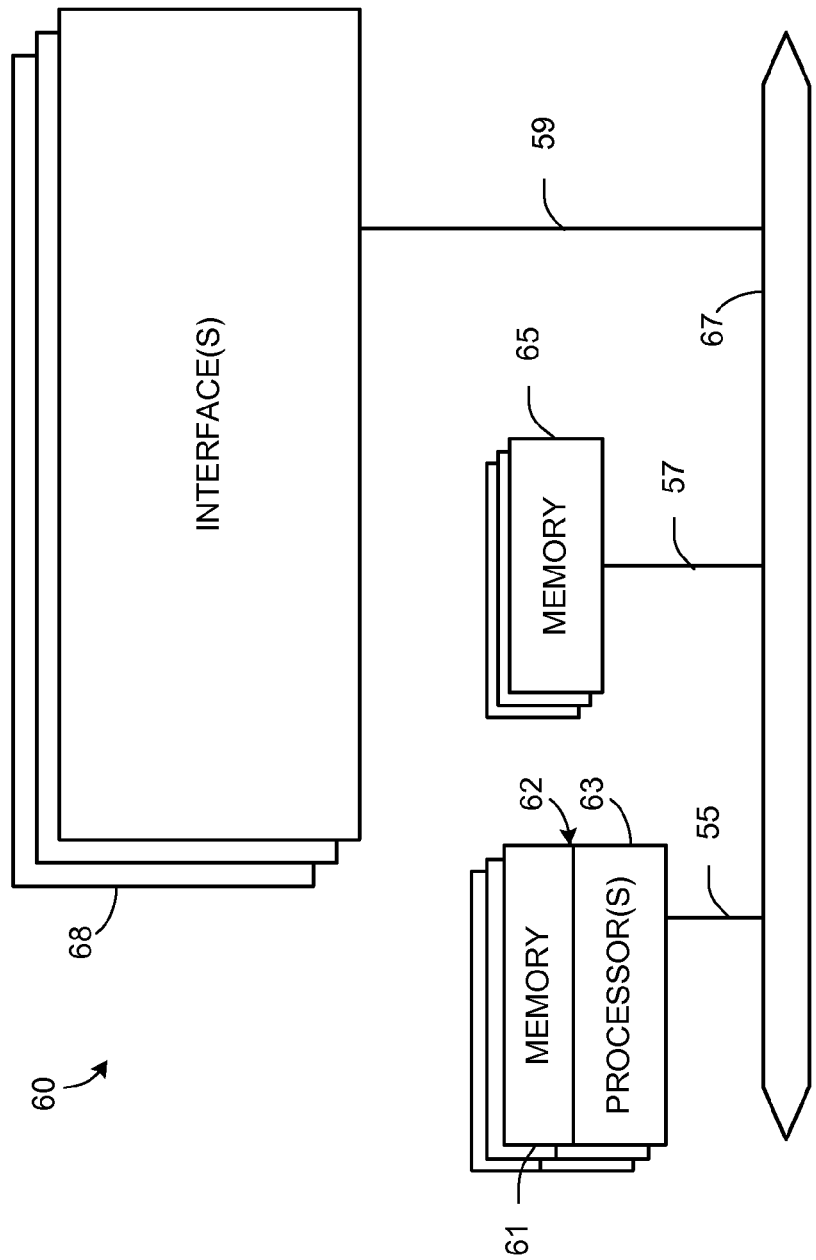
FIG. 22 illustrates a network device 60 suitable for implementing various aspects of the present invention.

FIG. 22 illustrate examples of different pop-up layers which may be displayed to the user in accordance with a specific embodiment of the present invention.

FIG. 21 shows an alternate embodiment of a pop-up layer 2202. In the example of FIG. 21, it is assumed that the user has clicked on a keyword which was marked up or highlighted in accordance with the technique of the present invention. As shown in the example of FIG. 21, a pop-up layer 2202 is displayed to the user, offering the user one or more links (e.g. 2204a, 2204b) to one or more destinations (e.g. associated with selected information provider or advertisers). Thus it will be appreciated that, using the technique of the present invention, advertisers are able to proactively communicate with (e.g. reach, serve, interact, sell, make offers, etc.) end users who are navigating outside the advertisers' web domain (e.g. web page, tool bar, email, etc.).

It will be appreciated that the technique of the present invention enables businesses and advertisers to proactively interact with existing and potential on-line customers by marking up (e.g. underlining, highlighting, displaying additional text, graphics, and/or sound) selected keywords or phrases on any document, web page or web page which is currently being displayed on the user's computer system. In this way, static HTML pages may be converted at the user's computer system into customized, dynamic information which provides the ability for businesses and advertisers to proactively deliver dynamic, targeted and customized service to the end users via additional information.

Additionally, the technique of the present invention may be used to enhance a business's proactive presence with existing and potential on-line customers. In one implementation, proactive presence may be defined as the volume of on-line contact points which may be used by a business to proactively reach, serve, sell and/or make offers to customers in a customized, personalized and targeted manner via the Internet or World Wide Web. The technique of the present invention allows such businesses to enhance their proactive presence, thereby resulting in greater web-based revenues, market share and/or lower overhead, and additionally improves the flow of services along the value chain.

It will be appreciated that the technique of the present invention offers a variety of advantages over conventional on-line advertising and markup techniques. For example, the document markup technique of the present invention may be implemented on relatively long web pages using relatively long keyword lists without the end user experiencing system performance degradation. Additionally, the technique of the present invention facilitates understanding and interpretation of selected words in the context of their surrounding text through negative keyword analysis. Further, the technique of the present invention provides novel prioritization algorithms, wherein preferred keywords are determined and selected for markup based upon a variety of statically and dynamically determined criteria. The technique of the present invention also offers support for multiple browser environments such as, for example, Internet Explorer, AOL, Juno, Netscape, etc.

The technique of the present invention also offers excellent scalability. For example, since the software components of the present invention which are implemented on a client system form an integrated system with its own updateable data storage, the technique of the present invention is able to be scaled to server millions of users with relatively minimal investments of server farms. Additionally, the technique of the present invention provides for a variety of limits and restrictions to be implemented when performing document markup. Limits may be based on per word, per page, per category, etc. Restrictions on markup may also be based on the WEB PAGEs of a specific document, negative words, etc. Additionally, unlike conventional markup techniques, the technique of the present invention offers a fuzzy search mode wherein specific document context may be marked up despite lack of an exact match of the search criteria.

It will be appreciated that the technique of the present invention also offers a variety of advantages from the perspective of the web site. For example, the web site maintainer is able to maintain full control over the software components of the present invention which have been installed on the client systems. Additionally, using data which is collected from selected client systems, (e.g. user click behavior data), a campaign provider is able to calculate an estimate of the probable clicks which will be generated for selected keywords associated with a given category. Moreover, the estimated click information may be used to facilitate campaign sales to advertisers or other entities. Additionally, using the technique of the present invention, the campaign provider is able to collect a variety of information from the client systems relating to keywords, categories, page views, marked up views, and other information relating to existing campaigns.

It will be appreciated that the technique of the present invention also offers a number of advantages to advertisers or other business entities. For example, a business entity is able to book, maintain, and bill for campaigns that are based on keywords and categories of keywords. This unique method of implementing an online campaign is not provided by conventional online campaign technology. A business entity is also able to manage keyword inventories. For example, advertising sales managers may be provided with future click inventory information which may be used as a basis for projecting sales and/or for implementing future campaigns. Additionally, business entities are able to be provided with unique reporting information which heretofore has been unable to be provided to business entities using conventional techniques. For example, business entities are provided with information relating to the number of page views displayed to selected users, keywords highlighted to selected users, clicks implemented by selected users, and information relating to the source of the document pages associated with each of the users' clicks.

Other Embodiments

Generally, the various techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the various technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the devices of this invention may be implemented on specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the various technique of this invention may be implemented on a general-purpose network host machine such as a personal computer or workstation. Further, the invention may be at least partially implemented on a card (e.g., an interface card) for a network device or a general-purpose computing device.

Referring now to FIG. 22, a network device 60 suitable for implementing the various techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a network device, the CPU 62 may be responsible for analyzing packets, encapsulating packets, forwarding packets to appropriate network devices, performing keyword searching and markup analysis, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 22 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the various techniques described herein. The program instructions may control the operation of an operating system and/or one or more applications, for example. The memory or memories may also be configured to store data structures, display stings, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended cl It is claimed:

1. A method for implementing an information distribution campaign for delivering advertising to end users of a data network, the data network including at least one server system, and including at least one client system associated with an end user, the method comprising:

identifying keywords relating to a first information distribution campaign;

determining campaign information which includes the identified keywords, the campaign information being provided by an entity other than the end user of the client system;

identifying a first document, the first document including a first portion of content for display on a client system;

selecting, using the campaign information, specific original content of the first portion of content of the first document to be converted to one or more links to one or more uniform resource locators (URLs), the specific original content including one or more words of text matching at least one keyword from the campaign information;

performing markup operations on a first portion of specific original content to thereby convert the first portion of specific original content into a first link to a first URL, the first link including a first portion of marked up content;

displaying the first link at the client system, wherein the display of the first link includes display of the first portion of marked up content;

detecting an occurrence of a first event associated with a location of a cursor at the client system being positioned over a portion of the displayed first link; and automatically displaying, in response to detection of the first event, a first overlay advertising impression at the client system, the first overlay advertising impression including advertising information comprising a second portion of displayed content which is different from the first portion of displayed marked up content.

2. The method of claim 1 further comprising:

detecting an occurrence of a second event relating to a cursor click on a portion of the displayed first link; and initiating, in response to detection of the second event, a request for accessing information associated with the first URL.

3. The method of claim 1 wherein the first event relates to a cursor click on a portion of the displayed first link.

4. The method of claim 1 wherein the first event relates to a cursor hovering over a portion of the displayed first link.

5. The method of claim 1:

wherein the first portion of specific original content includes a first word of text;

wherein the first portion of displayed marked up content includes the first word of text.

6. The method of claim 1:

wherein the first portion of specific original content includes a first word of text, the first word of text being associated with a first original display format;

wherein the first portion of displayed marked up content includes the first word of text which has been modified for display in accordance with a second display format which has a different visual appearance than the first original display format.

7. The method of claim 1:

wherein the first portion of specific original content includes a first string of text, the first string of text being associated with a first original display format;

wherein the first portion of displayed marked up content includes the first string of text which has been modified for display in accordance with a second display format which has a different visual appearance than the first original display format.

8. The method of claim 1:

wherein the first portion of specific original content includes a first string of text, the first string of text being associated with a first original display format;

wherein the first portion of displayed marked up content includes the first string of text which has been modified for display in accordance with a second display format which has a different visual appearance than the first original display format; and wherein the first string of text includes at least one identified keyword and at least one word that does not correspond to an identified keyword.

9. The method of claim 1 wherein the displayed advertising information includes at least a portion of additional content which is not included in the first portion of displayed marked up content.

10. The method of claim 1 wherein the displayed advertising information includes at least a portion of additional content which is not included in the first portion of displayed marked up content; and wherein the at least a portion of additional content includes audio content.

11. The method of claim 1 wherein the displayed advertising information includes at least a portion of additional content which is not included in the first portion of displayed marked up content; and wherein the at least a portion of additional content includes video content.

12. The method of claim 1 wherein the displayed advertising information includes at least a portion of additional content which is not included in the first portion of displayed marked up content; and wherein the at least a portion of additional content includes text content obtained from the campaign information.

13. The method of claim 1 wherein the advertising information displayed in the first overlay advertising impression includes a second link to a second URL.

14. The method of claim 1 wherein the advertising information displayed in the first overlay advertising impression includes a second link to a second URL different from the first URL.

15. The method of claim 1:
wherein the advertising information displayed in the first overlay advertising impression includes a second link to a second URL; and
wherein the advertising information displayed in the first overlay advertising impression includes a third link to a third URL different from the second URL.

16. The method of claim 1 wherein the advertising information displayed in the first overlay advertising impression is devoid of a link to a URL.

17. The method of claim 1 wherein the advertising information displayed in the first overlay advertising impression is devoid of a link to the first URL.

18. The method of claim 1 wherein the second portion of displayed content includes additional descriptive information relating to the displayed first link.

19. The method of claim 1:
wherein the second portion of displayed content includes additional descriptive information relating to the displayed first link; and
wherein the second portion of displayed content is not configured as a link to a URL.

20. The method of claim 1:
wherein the second portion of displayed content includes additional descriptive information relating to the displayed first link;
wherein the second portion of displayed content is not configured as a link to a URL;
wherein the campaign information includes a first text string provided by the entity; and
wherein the second portion of displayed content includes the first text string.

21. The method of claim 1:
wherein the second portion of displayed content is configured as a link to a second URL; and
wherein the advertising information displayed in the first overlay advertising impression further includes additional advertising content different from the first portion of displayed marked up content and different from the second portion of displayed content.

22. The method of claim 1:
wherein the second portion of displayed content is not configured as a link to the first URL.

23. The method of claim 1:
wherein the second portion of displayed content is not structured as a hyperlink to a URL.

24. The method of claim 1 further comprising:
identifying, using information associated with the first information distribution campaign, advertising content which is contextually related to the first portion of marked up content; and
dynamically generating the advertising information displayed in the first overlay advertising impression to include at least a portion of the identified advertising content.

25. The method of claim 1 further comprising:
identifying, using information associated with the first information distribution campaign, advertising content which is contextually related to the first portion of marked up content;
dynamically generating the advertising information displayed in the first overlay advertising impression to include at least a portion of the identified advertising content;
wherein the campaign information includes a first text string provided by the entity; and
wherein the second portion of displayed content includes the first text string.

26. The method of claim 1:
wherein the specific original content includes at least one original link including a first original link to a specific URL, the first original link having associated therewith a first set of original display format characteristics for use in causing a displayed appearance of the first original link to be in accordance with a first display format; and
wherein the first link has associated therewith a second set of original display format characteristics for use in causing a displayed appearance of the first link to be in accordance with a second display format different from the first display format.

27. The method of claim 1, wherein the specific original content includes at least one original link including a first original link to a specific URL, the method further comprising:
displaying the first original link at the client system in accordance with a first display format; and
displaying the first link at the client system in accordance with a second display format different from the first display format;
wherein a visual appearance of the displayed formatting of the first link is different from a visual appearance of the displayed formatting of the first original link.

28. The method of claim 1:
wherein the specific original content includes at least one original link including a first original link to a specific URL, the first original link having associated therewith a first set of original display format characteristics for use in causing a displayed appearance of the first original link to be in accordance with a first display format corresponding to a single underline formatting style; and
wherein the first link has associated therewith a second set of original display format characteristics for use in causing a displayed appearance of the first link to be in accordance with a second display format corresponding to a double underline formatting style.

29. The method of claim 1 wherein the specific original content includes at least one original link including a first original link to a specific URL, the method further comprising:
displaying the first original links using single underline formatting
displaying marked-up links using double under formatting.

30. The method of claim 1 wherein the displayed first overlay advertising impression is displayed via a pop-up window.

31. The method of claim 1 wherein the displayed first overlay advertising impression is displayed via a pop-up layer.

32. The method of claim 1 wherein displayed first overlay advertising impression is displayed via a tool-tip layer.

33. The method of claim 1 wherein displayed first overlay advertising impression is displayed via a cursor hover-over layer.

34. The method of claim 1 wherein the advertising information displayed in the first overlay advertising impression includes dynamically served advertising information.

35. The method of claim 1:
wherein the specific original content includes at least one original link including a first original link to a specific URL, the first original link having associated therewith a first set of original display format characteristics for use in causing a displayed appearance of the first original link to be in accordance with a first display format;
wherein the first link has associated therewith a second set of original display format characteristics for use in causing a displayed appearance of the first link to be in accordance with a second display format different from the first display format; and
wherein the advertising information displayed in the first overlay advertising impression includes dynamically served advertising information.

36. The method of claim 1 wherein the advertising information displayed in the first overlay advertising impression includes dynamically served advertising information contextually related to the first portion of displayed marked up content.

37. The method of claim 1 further comprising:
generating dynamically served advertising information to be included in the first overlay advertising impression.

38. The method of claim 1 further comprising:
generating dynamically served advertising information for display in the first overlay advertising impression; and
displaying at least a portion of the dynamically served advertising information in the display of the first overlay advertising impression.

39. The method of claim 1 wherein the additional advertising information includes a dynamically served banner ad.

40. The method of claim 1 wherein the displayed first overlay advertising impression corresponds to a pop-up layer which includes dynamically served advertising content.

41. The method of claim 1 wherein the displayed first overlay advertising impression corresponds to a pop-up layer which includes promotional advertising information and further includes a plurality of links to multiple destination.

42. The method of claim 1 wherein the advertising information includes at least a portion of content obtained from the campaign information.

43. The method of claim 1 wherein the second portion of displayed content includes at least a portion of the campaign information.

44. The method of claim 1:
wherein the campaign information includes a first text string provided by the entity; and
wherein the second portion of displayed content includes the first text string.

45. The method of claim 1:
wherein the first portion of specific original content includes a first word of text, the first word of text being associated with a first original display format;
wherein the first portion of displayed marked up content includes the first word of text which has been modified for display in accordance with a second display format which has a different visual appearance than the original display format;
wherein the campaign information includes a first text string provided by the entity; and
wherein the second portion of displayed content includes the first text string.

46. The method of claim 1:
wherein the campaign information includes a first text string provided by the entity, the first text string being devoid of any of the identified keywords; and
wherein the second portion of displayed content includes the first text string.

47. The method of claim 1:
wherein the campaign information includes a first text string provided by the entity, the first text string includes text which is different from the identified keywords;
wherein the second portion of displayed content includes the first text string;
wherein the displayed first overlay advertising impression corresponds to a pop-up layer; and
wherein the displaying of the first overlay advertising impression at the client system includes displaying the first text string and displaying at least one identified keyword which matches at least one of the one or more words of text of the specific original content.

48. The method of claim 1:
wherein the campaign information includes a first text string provided by the entity, the first text string includes text which is different from the identified keywords;
wherein the second portion of displayed content includes the first text string;
wherein the displayed first overlay advertising impression corresponds to a pop-up layer;
wherein the displaying of the first overlay advertising impression at the client system includes displaying the first text string and displaying at least one keyword which matches at least one of the one or more words of text of the specific original content; and
wherein the first portion of displayed marked up content includes at least one identified keyword and at least one word that does not correspond to an identified keyword.

49. The method of claim 1 further comprising:
tracking information relating to identities of one or more words of text of the original content which have been converted into marked-up content and displayed at the client system.

50. The method of claim 1 further comprising:
tracking information relating to occurrences of cursor clicks on marked up content displayed at the client system.

51. The method of claim 1 further comprising:
tracking information relating to overlay advertising impressions displayed at the client system.

52. The method of claim 48 further comprising:
tracking information relating to overlay advertising impressions displayed at the client system.

53. The method of claim 1 further comprising:
tracking information relating to occurrences of overlay advertising impressions displayed at the client system in response to user activities at the client system.

54. A system for implementing an information distribution campaign for delivering advertising to end users of a data network, the data network including at least one client system associated with an end user, the system comprising:
at least one processor;
at least one interface operable to provide a communication link to at least one network device; and
memory;
the system being operable to:
identify keywords relating to a first information distribution campaign;
determine campaign information which includes the identified keywords, the campaign information being provided by an entity other than the end user of the client system;
identify a first document, the first document including a first portion of content for display on a client system;

select, using the campaign information, specific original content of the first portion of content of the first document to be converted to one or more links to one or more uniform resource locators (URLs), the specific original content including one or more words of text matching at least one keyword from the campaign information;

perform markup operations on a first portion of specific original content to thereby convert the first portion of specific original content into a first link to a first URL, the first link including a first portion of marked up content;

display the first link at the client system, wherein the display of the first link includes display of the first portion of marked up content;

detect an occurrence of a first event associated with a location of a cursor at the client system being positioned over a portion of the displayed first link; and automatically display, in response to detection of the first event, a first overlay advertising impression at the client system, the first overlay advertising impression including advertising information comprising a second portion of displayed content which is different from the first portion of displayed marked up content.

55. The system of claim 54 being further operable to:
detect an occurrence of a second event relating to a cursor click on a portion of the displayed first link; and
initiate, in response to detection of the second event, a request for accessing information associated with the first URL.

56. The system of claim 54 wherein the first event relates to a cursor click on a portion of the displayed first link.

57. The system of claim 54 wherein the first event relates to a cursor hovering over a portion of the displayed first link.

58. The system of claim 54:
wherein the first portion of specific original content includes a first word of text;
wherein the first portion of displayed marked up content includes the first word of text.

59. The system of claim 54:
wherein the first portion of specific original content includes a first word of text, the first word of text being associated with a first original display format;
wherein the first portion of displayed marked up content includes the first word of text which has been modified for display in accordance with a second display format which has a different visual appearance than the first original display format.

60. The system of claim 54:
wherein the first portion of specific original content includes a first string of text, the first string of text being associated with a first original display format;
wherein the first portion of displayed marked up content includes the first string of text which has been modified for display in accordance with a second display format which has a different visual appearance than the first original display format.

61. The system of claim 54:
wherein the first portion of specific original content includes a first string of text, the first string of text being associated with a first original display format;
wherein the first portion of displayed marked up content includes the first string of text which has been modified for display in accordance with a second display format which has a different visual appearance than the first original display format; and wherein the first string of text includes at least one identified keyword and at least one word that does not correspond to an identified keyword.

62. The system of claim 54 wherein the displayed advertising information includes at least a portion of additional content which is not included in the first portion of displayed marked up content.

63. The system of claim 54 wherein the displayed advertising information includes at least a portion of additional content which is not included in the first portion of displayed marked up content; and
wherein the at least a portion of additional content includes audio content.

64. The system of claim 54 wherein the displayed advertising information includes at least a portion of additional content which is not included in the first portion of displayed marked up content; and
wherein the at least a portion of additional content includes video content.

65. The system of claim 54 wherein the displayed advertising information includes at least a portion of additional content which is not included in the first portion of displayed marked up content; and
wherein the at least a portion of additional content includes text content obtained from the campaign information.

66. The system of claim 54 wherein the advertising information displayed in the first overlay advertising impression includes a second link to a second URL.

67. The system of claim 54 wherein the advertising information displayed in the first overlay advertising impression includes a second link to a second URL different from the first URL.

68. The system of claim 54:
wherein the advertising information displayed in the first overlay advertising impression includes a second link to a second URL; and
wherein the advertising information displayed in the first overlay advertising impression includes a third link to a third URL different from the second URL.

69. The system of claim 54 wherein the advertising information displayed in the first overlay advertising impression is devoid of a link to a URL.

70. The system of claim 54 wherein the advertising information displayed in the first overlay advertising impression is devoid of a link to the first URL.

71. The system of claim 54 wherein the second portion of displayed content includes additional descriptive information relating to the displayed first link.

72. The system of claim 54:
wherein the second portion of displayed content includes additional descriptive information relating to the displayed first link; and
wherein the second portion of displayed content is not configured as a link to a URL.

73. The system of claim 54:
wherein the second portion of displayed content includes additional descriptive information relating to the displayed first link;
wherein the second portion of displayed content is not configured as a link to a URL;
wherein the campaign information includes a first text string provided by the entity; and
wherein the second portion of displayed content includes the first text string.

74. The system of claim 54:
wherein the second portion of displayed content is configured as a link to a second URL; and wherein the advertising information displayed in the first overlay advertising impression further includes additional advertising content different from the first portion of displayed marked up content and different from the second portion of displayed content.

75. The system of claim 54:
wherein the second portion of displayed content is not configured as a link to the first URL.

76. The system of claim 54:
wherein the second portion of displayed content is not structured as a hyperlink to a URL.

77. The system of claim 54 being further operable to:
identify, using information associated with the first information distribution campaign, advertising content which is contextually related to the first portion of marked up content; and
dynamically generate the advertising information displayed in the first overlay advertising impression to include at least a portion of the identified advertising content.

78. The system of claim 54 being further operable to:
identify, using information associated with the first information distribution campaign, advertising content which is contextually related to the first portion of marked up content;
dynamically generate the advertising information displayed in the first overlay advertising impression to include at least a portion of the identified advertising content;
wherein the campaign information includes a first text string provided by the entity; and
wherein the second portion of displayed content includes the first text string.

79. The system of claim 54:
wherein the specific original content includes at least one original link including a first original link to a specific URL, the first original link having associated therewith a first set of original display format characteristics for use in causing a displayed appearance of the first original link to be in accordance with a first display format; and
wherein the first link has associated therewith a second set of original display format characteristics for use in causing a displayed appearance of the first link to be in accordance with a second display format different from the first display format.

80. The system of claim 54, wherein the specific original content includes at least one original link including a first original link to a specific URL, the system being further operable to:
display the first original link at the client system in accordance with a first display format; and
display the first link at the client system in accordance with a second display format different from the first display format;
wherein a visual appearance of the displayed formatting of the first link is different from a visual appearance of the displayed formatting of the first original link.

81. The system of claim 54:
wherein the specific original content includes at least one original link including a first original link to a specific URL, the first original link having associated therewith a first set of original display format characteristics for use in causing a displayed appearance of the first original link to be in accordance with a first display format corresponding to a single underline formatting style; and wherein the first link has associated therewith a second set of original display format characteristics for use in causing a displayed appearance of the first link to be in accordance with a second display format corresponding to a double underline formatting style.

82. The system of claim 54 wherein the specific original content includes at least one original link including a first original link to a specific URL, the system being further operable to:
display the first original links using single underline formatting
display marked-up links using double under formatting.

83. The system of claim 54 wherein the displayed first overlay advertising impression is displayed via a pop-up window.

84. The system of claim 54 wherein the displayed first overlay advertising impression is displayed via a pop-up layer.

85. The system of claim 54 wherein displayed first overlay advertising impression is displayed via a tool-tip layer.

86. The system of claim 54 wherein displayed first overlay advertising impression is displayed via a cursor hover-over layer.

87. The system of claim 54 wherein the advertising information displayed in the first overlay advertising impression includes dynamically served advertising information.

88. The system of claim 54:
wherein the specific original content includes at least one original link including a first original link to a specific URL, the first original link having associated therewith a first set of original display format characteristics for use in causing a displayed appearance of the first original link to be in accordance with a first display format;
wherein the first link has associated therewith a second set of original display format characteristics for use in causing a displayed appearance of the first link to be in accordance with a second display format different from the first display format; and
wherein the advertising information displayed in the first overlay advertising impression includes dynamically served advertising information.

89. The system of claim 54 wherein the advertising information displayed in the first overlay advertising impression includes dynamically served advertising information contextually related to the first portion of displayed marked up content.

90. The system of claim 54 being further operable to:
generate dynamically served advertising information to be included in the first overlay advertising impression.

91. The system of claim 54 being further operable to:
generate dynamically served advertising information for display in the first overlay advertising impression; and
display at least a portion of the dynamically served advertising information in the display of the first overlay advertising impression.

92. The system of claim 54 wherein the additional advertising information includes a dynamically served banner ad.

93. The system of claim 54 wherein the displayed first overlay advertising impression corresponds to a pop-up layer which includes dynamically served advertising content.

94. The system of claim 54 wherein the displayed first overlay advertising impression corresponds to a pop-up layer which includes promotional advertising information and further includes a plurality of links to multiple destination.

95. The system of claim 54 wherein the advertising information includes at least a portion of content obtained from the campaign information.

96. The system of claim 54 wherein the second portion of displayed content includes at least a portion of the campaign information.

97. The system of claim 54:
wherein the campaign information includes a first text string provided by the entity; and
wherein the second portion of displayed content includes the first text string.

98. The system of claim 54:
wherein the first portion of specific original content includes a first word of text, the first word of text being associated with a first original display format;
wherein the first portion of displayed marked up content includes the first word of text which has been modified for display in accordance with a second display format which has a different visual appearance than the original display format;
wherein the campaign information includes a first text string provided by the entity; and
wherein the second portion of displayed content includes the first text string.

99. The system of claim 54:
wherein the campaign information includes a first text string provided by the entity, the first text string being devoid of any of the identified keywords; and
wherein the second portion of displayed content includes the first text string.

100. The system of claim 54:
wherein the campaign information includes a first text string provided by the entity, the first text string includes text which is different from the identified keywords;
wherein the second portion of displayed content includes the first text string;
wherein the displayed first overlay advertising impression corresponds to a pop-up layer; and
wherein the displaying of the first overlay advertising impression at the client system includes displaying the first text string and displaying at least one identified keyword which matches at least one of the one or more words of text of the specific original content.

101. The system of claim 54:
wherein the campaign information includes a first text string provided by the entity, the first text string includes text which is different from the identified keywords;
wherein the second portion of displayed content includes the first text string;
wherein the displayed first overlay advertising impression corresponds to a pop-up layer;
wherein the displaying of the first overlay advertising impression at the client system includes displaying the first text string and displaying at least one keyword which matches at least one of the one or more words of text of the specific original content; and
wherein the first portion of displayed marked up content includes at least one identified keyword and at least one word that does not correspond to an identified keyword.

102. The system of claim 54 being further operable to:
track information relating to identities of one or more words of text of the original content which have been converted into marked-up content and displayed at the client system.

103. The system of claim 54 being further operable to:
track information relating to occurrences of cursor clicks on marked up content displayed at the client system.

104. The system of claim 54 being further operable to:
track information relating to overlay advertising impressions displayed at the client system.

105. The system of claim 101 being further operable to:
track information relating to overlay advertising impressions displayed at the client system.

106. The system of claim 54 being further operable to:
track information relating to occurrences of overlay advertising impressions displayed at the client system in response to user activities at the client system.

107. A system for implementing an information distribution campaign for delivering advertising to end users of a data network, the data network including at least one client system associated with an end user, the system comprising:
means for identifying keywords relating to a first information distribution campaign;
means for determining campaign information which includes the identified keywords, the campaign information being provided by an entity other than the end user of the client system;
means for identifying a first document, the first document including a first portion of content for display on a client system;
means for selecting, using the campaign information, specific original content of the first portion of content of the first document to be converted to one or more links to one or more uniform resource locators (URLs), the specific original content including one or more words of text matching at least one keyword from the campaign information;
means for performing markup operations on a first portion of specific original content to thereby convert the first portion of specific original content into a first link to a first URL, the first link including a first portion of marked up content;
means for displaying the first link at the client system, wherein the display of the first link includes display of the first portion of marked up content;
means for detecting an occurrence of a first event associated with a location of a cursor at the client system being positioned over a portion of the displayed first link; and
means for automatically displaying, in response to detection of the first event, a first overlay advertising impression at the client system, the first overlay advertising impression including advertising information comprising a second portion of displayed content which is different from the first portion of displayed marked up content;
wherein the specific original content includes at least one original link including a first original link to a specific URL, the first original link having associated therewith a first set of original display format characteristics for use in causing a displayed appearance of the first original link to be in accordance with a first display format;
wherein the first link has associated therewith a second set of original display format characteristics for use in causing a displayed appearance of the first link to be in accordance with a second display format different from the first display format.

* * * * *